United States Patent
Tadigadapa et al.

(10) Patent No.: US 10,184,845 B2
(45) Date of Patent: Jan. 22, 2019

(54) METHODS AND APPARATUS FOR ULTRA-SENSITIVE TEMPERATURE DETECTION USING RESONANT DEVICES

(71) Applicant: THE PENN STATE RESEARCH FOUNDATION, University Park, PA (US)

(72) Inventors: Srinivas A. Tadigadapa, State College, PA (US); Marcelo B. Pisani, Sao Paulo (BR)

(73) Assignee: The Penn State Research Foundation, University Park, PA (US)

( * ) Notice: Subject to any disclaimer, the term of this patent is extended or adjusted under 35 U.S.C. 154(b) by 437 days.

(21) Appl. No.: 14/802,127

(22) Filed: Jul. 17, 2015

(65) Prior Publication Data
US 2016/0033341 A1   Feb. 4, 2016

Related U.S. Application Data

(63) Continuation of application No. 13/049,632, filed on Mar. 16, 2011, now Pat. No. 9,121,771.

(Continued)

(51) Int. Cl.
*G01K 7/32* (2006.01)
*G01K 17/00* (2006.01)
*G01K 13/00* (2006.01)

(52) U.S. Cl.
CPC ............. *G01K 17/006* (2013.01); *G01K 7/32* (2013.01); *Y10T 29/42* (2015.01); *Y10T 29/49002* (2015.01)

(58) Field of Classification Search
CPC ........ G01K 7/32; G01K 17/006; G01K 17/00; G01K 17/04; G01N 25/482; G01N 33/497;
(Continued)

(56) References Cited

U.S. PATENT DOCUMENTS

| 3,964,062 A | 6/1976 | Flagg et al. |
| 4,079,280 A * | 3/1978 | Kusters .................... G01K 7/32 |
| | | 310/318 |

(Continued)

FOREIGN PATENT DOCUMENTS

| CA | 2442851 A1 | 10/2002 |
| EP | 0069647 B1 | 1/1983 |

(Continued)

OTHER PUBLICATIONS

Kao, Ping et al., "Micromachined quartz resonator based infrared detector array" Sensors and Actuators A149 (2009), 189-192.

(Continued)

*Primary Examiner* — Gail Kaplan Verbitsky
(74) *Attorney, Agent, or Firm* — Dinsmore & Shohl LLP

(57) ABSTRACT

Methods, apparatus, and systems to improve thermal sensitivity of resonant circuits. One aspect utilizes tracking near-resonance complex impedance for a quartz resonator based calorimeter sensor to derive ultra-sensitive temperature measurement from the sensor. Another aspect includes a quartz resonant or -based calorimetric sensor placed close to but not touching the analyte being measured to eliminate mass loading effect on the temperature measurement.

23 Claims, 35 Drawing Sheets

Related U.S. Application Data

(60) Provisional application No. 61/340,360, filed on Mar. 16, 2010.

(58) Field of Classification Search
CPC ....... G01N 2035/00356; G01N 21/171; G01N 2291/02881; G01N 29/036; G01N 2291/014; G01H 13/00; Y10T 29/42; Y10T 29/490002
USPC ............ 374/29–39, 117–119, 183–185, 141, 374/10–12; 426/147; 422/51; 324/376, 324/49; 331/154, 155, 158, 162
See application file for complete search history.

(56) References Cited

U.S. PATENT DOCUMENTS

| | | | |
|---|---|---|---|
| 4,472,656 A | 9/1984 | Franx | |
| 4,509,204 A * | 4/1985 | Wile | H03J 7/18 455/155.1 |
| 4,509,360 A | 4/1985 | Erwin et al. | |
| 4,876,892 A * | 10/1989 | Arabia | G01L 9/125 331/65 |
| 4,878,226 A | 10/1989 | McQuoid et al. | |
| 4,986,670 A * | 1/1991 | Uchiyama | G01K 7/32 310/318 |
| 5,198,716 A | 3/1993 | Godshall et al. | |
| 5,214,668 A | 5/1993 | Satou et al. | |
| 5,339,051 A | 8/1994 | Koehler et al. | |
| 5,686,779 A | 11/1997 | Vig | |
| 5,744,902 A | 4/1998 | Vig | |
| 6,157,804 A | 12/2000 | Richmond et al. | |
| 6,191,392 B1 | 2/2001 | Hauf et al. | |
| 6,369,363 B2 | 4/2002 | Hauf et al. | |
| 6,885,298 B2 | 4/2005 | Everson et al. | |
| 6,955,787 B1 | 10/2005 | Hanson | |
| 7,109,828 B2 | 9/2006 | Takayama et al. | |
| 7,187,241 B2 * | 3/2007 | Hein | H03L 1/022 331/16 |
| 7,459,099 B2 | 12/2008 | Kubena et al. | |
| 7,541,004 B2 | 6/2009 | Niksa et al. | |
| 7,549,791 B2 | 6/2009 | Penavaire et al. | |
| 7,569,971 B2 | 8/2009 | Andle et al. | |
| 7,633,206 B2 | 12/2009 | Andle et al. | |
| 7,667,369 B2 | 2/2010 | Haskell et al. | |
| 7,812,692 B2 | 10/2010 | Ayazi et al. | |
| 7,872,541 B2 | 1/2011 | McCorquodale et al. | |
| 8,076,151 B2 * | 12/2011 | Larson | G01N 25/48 422/50 |
| 8,215,171 B1 * | 7/2012 | Smith | G01N 29/022 310/313 R |
| 8,770,836 B2 | 7/2014 | Burgard | |
| 9,121,771 B2 * | 9/2015 | Tadigadapa | G01K 7/32 |
| 2005/0158905 A1 | 7/2005 | Kubena et al. | |
| 2005/0213634 A1 | 9/2005 | Sadeh | |
| 2007/0122312 A1 | 5/2007 | Chojnacki et al. | |
| 2007/0247173 A1 | 10/2007 | Tai et al. | |
| 2008/0100176 A1 | 5/2008 | Haskell et al. | |
| 2008/0183095 A1 * | 7/2008 | Austin | A61B 5/0809 600/534 |
| 2008/0259995 A1 | 10/2008 | Kuhn | |
| 2008/0264934 A1 | 10/2008 | Moreira et al. | |
| 2008/0297281 A1 | 12/2008 | Ayazi et al. | |
| 2009/0033462 A1 | 2/2009 | Kitayoshi et al. | |
| 2009/0085430 A1 | 4/2009 | Andle et al. | |
| 2009/0120169 A1 | 5/2009 | Chandler, Jr. et al. | |
| 2009/0167444 A1 | 7/2009 | McCorquodale et al. | |
| 2009/0175313 A1 | 7/2009 | Kordic et al. | |
| 2009/0295509 A1 * | 12/2009 | Master | H01P 7/06 333/219.1 |
| 2010/0164488 A1 | 7/2010 | Lowe et al. | |

FOREIGN PATENT DOCUMENTS

| | | |
|---|---|---|
| EP | 0395149 A1 | 10/1990 |
| EP | 0924500 B1 | 6/1999 |
| EP | 1732238 A1 | 12/2006 |
| EP | 1985359 A1 | 10/2008 |
| JP | 02049131 A * | 2/1990 |
| JP | 09500726 | 1/1997 |
| JP | 20002071500 A * | 1/2002 |
| SU | 414900 A | 11/1976 |
| WO | 90/13042 A1 | 11/1990 |
| WO | 2006/064211 A1 | 6/2006 |

OTHER PUBLICATIONS

Pisani, Marcelo B. et al., "Application of micromachiend Y-Cut-Quartz Bulk Acoustic Wave Resonator for Infrared Sensing", Journal of Microelectromechanical Systems, vol. 20, No. 1, Feb. 2011, 288-296.

Goyal, A. Zhang and Tadigadapa, S., "Y-cut quartz resonator based calorimetric sensor", Sensors 2005, IEEE (Oct. 30, 2005-Nov. 3, 2005), Abstract, 1 page.

The Penn State Research Foundation et al., PCT/US2011/028702, "Notification of Transmittal of The International Search Report and The Written Opinion of the International Searching Authority, or the Declaration", 13 pages, dated Dec. 15, 2011.

* cited by examiner

METHODS AND APPARATUS FOR ULTRA-SENSITIVE TEMPERATURE DETECTION USING RESONANT DEVICES

CROSS-REFERENCE TO RELATED APPLICATIONS

This is a Continuation Application of U.S. Ser. No. 13/049,632 filed Mar. 16, 2011, which claims priority under 35 U.S.C. § 119 to provisional application U.S. Ser. No. 61/340,360 filed Mar. 16, 2010, all of which are herein incorporated by reference in their entirety.

I. GRANT REFERENCE

This invention was made with government support under Grant No. ECCS0925438, awarded by the National Institutes of Health and under Contract No. W911NF-07-1-0327, awarded by the Army Research Office. The government has certain rights in the invention.

II. BACKGROUND OF THE INVENTION

A. Field of the Invention

The present invention relates to use of resonant devices to measure temperature and, in particular, to fabrication and use of such devices for improved performance and versatility for a wide variety of applications.

B. Related Art

Use of resonant devices to transduce temperature is well-known. Certain crystal cuts can provide high temperature dependence on the resonant frequency of the crystal. See, e.g., Goyal, A., Zhang, Y., and Tadigadapa, S., "*Y-Cut Quartz Resonator Based calorimetric Sensor*", SENSORS, 2005 IEEE (Oct. 30, 2005-Nov. 3, 2005) incorporated by reference herein.

However, it has been discovered that conventional uses and modes of operation of such sensors present certain limitations in, inter alia, their use, accuracy, and applications. For example, current conventional configurations of such sensors raise the following issues:
  a. Response times. Limitations on response times tend to limit usefulness of the sensors.
  b. High cost. Cost can affect practical applicability.
  c. Cumbersome nature/complexity. Such factors can also affect practical applicability.
  d. Mass loading effect. This can confound temperature-related frequency shift with simultaneous mass loading effects.
  e. Size. Even though current configurations are quite small, their form factor presents limitations (e.g. limits the number that can be fabricated on a given chip area).
  f. Sensitivity. It has been discovered that the well-known relationship between resonant frequency of the resonator and temperature leaves room for improvement in sensitivity of the sensor.

Thus, room for improvement exists in this technical field.

III. SUMMARY OF THE INVENTION

A. Objects, Features, Aspects, or Advantages

It is a principle object, feature, aspect, or advantage of the present invention to provide methods, apparatus, and systems which improve over or solve certain problems and deficiencies in the state of the art.

Another object, feature, aspect, or advantage of the present invention is an improved sensitivity quartz resonator temperature sensor and method.

Another object, feature, aspect or advantage of the present invention is a quartz resonator temperature sensor and method which deters mass loading effect.

Other objects, features, aspects, and advantages of the present invention will become apparent with reference to the accompanying specification.

B. Methods

In one aspect of the invention, ultra-sensitive temperature measurement is accomplished by placing a quartz resonator-based calorimetric sensor at or near a measurement location, such as might be defined by a reactor chamber or other vessel or location at which temperature is to be monitored during some event or time period. One of the components of the complex impedance (modulus or phase, or real or imaginary parts) at or near resonance of the sensor is tracked at a fixed given frequency. This has been discovered to result in better temperature sensitivity than the conventional tracking of frequency of the sensor.

In another aspect of the invention, a quartz resonator-based calorimetric sensor is placed very near the measuring location, but not in contact with any reaction chamber or vessel containing the event and not in contact with the analyte. Radiative and gas-conduction coupling of heat of reaction between the event at the measuring location and the sensor occurs without direct conductive coupling or mass loading factor between the sensor and chamber or event for maximum measurement sensitivity.

In another aspect of the invention, an ultra-sensitive temperature measurement array can be fabricated by any of a variety of known micro- and nano-scale fabrication processes. Examples include but are not limited to photolithography, solder bonding, etching, nano scale self-assembly technique, or micro machining.

In another aspect of the invention, the quartz element of the quartz resonator-based calorimetric resonator is fabricated to have significantly smaller thermal mass than conventional quartz resonator-based calorimetric sensors. One example is processing the quartz element to a much smaller thickness than is conventional. This can produce not only higher sensitivity, but can allow greater density of sensors per area, such as on an integrated circuit chip at micro- or nano-scale. For example, arrays of resonators of this type could be integrated with one reaction chamber or an array of reaction chambers for concurrent, multiplexed monitoring of temperature from the plural sensors. The fabrication could comprise integration of the sensors with CMOS-based integrated circuits for fabrication of a complete integrated device.

In another aspect of the invention, any of the above-described methods could be combined.

C. Apparatus

Other aspects of the invention comprise apparatus that can be used for one or more of the above-described methods.

One aspect is an apparatus for ultra-sensitive temperature measurement comprising a quartz resonator-based calorimetric sensor but substituting an impedance/admittance measurement circuit for a frequency measurement circuit and converting frequency-related effects into the impedance/admittance domain for tracking temperature.

In another aspect of the invention, the sensor is fabricated to a relatively small size (micro- or nano-scale), including using a very thin quartz element or wafer.

In another aspect of the invention, a reaction chamber is fabricated such that the quartz element or wafer can be brought very close to the reaction chamber but neither in contact with it or the analyte that might be placed in it so that radiative and gas-conduction coupling of heat or reaction between the event in the chamber and the sensor occurs without direct conductive coupling or mass loading factor between the sensor and chamber or event for maximum sensitivity.

In another aspect of the invention, an array of such sensors is produced by micro- or nano-scale fabrication techniques. The array can be used with one reaction chamber or with a plurality of chambers. The geometry of the array of sensors and the chamber(s) can be configured to align the sensors with the same, as well as position them in close proximity.

In another aspect of the invention, an apparatus comprises an array of sensors which are free-standing, thermally insulated, thin structures with good thermal contact to a semiconductor substrate, and thus adapted for use in infra-red image rating and low noise applications.

D. Systems

Other aspects of the invention include utilizing methods and/or apparatus as above-described in a variety of combinations or systems for different applications.

IV. BRIEF DESCRIPTION OF THE DRAWINGS

Aspects of the invention will be illustrated in several exemplary embodiments. The following appended drawings will be referred to in the descriptions of those exemplary embodiments.

A. Exemplary Embodiment 1 (General Method, Apparatus and System)

B. Exemplary Embodiment 2 (Quartz Resonator Array for Calorimetric (Bio)Chemical Sensing Applications)

Figure 2A:
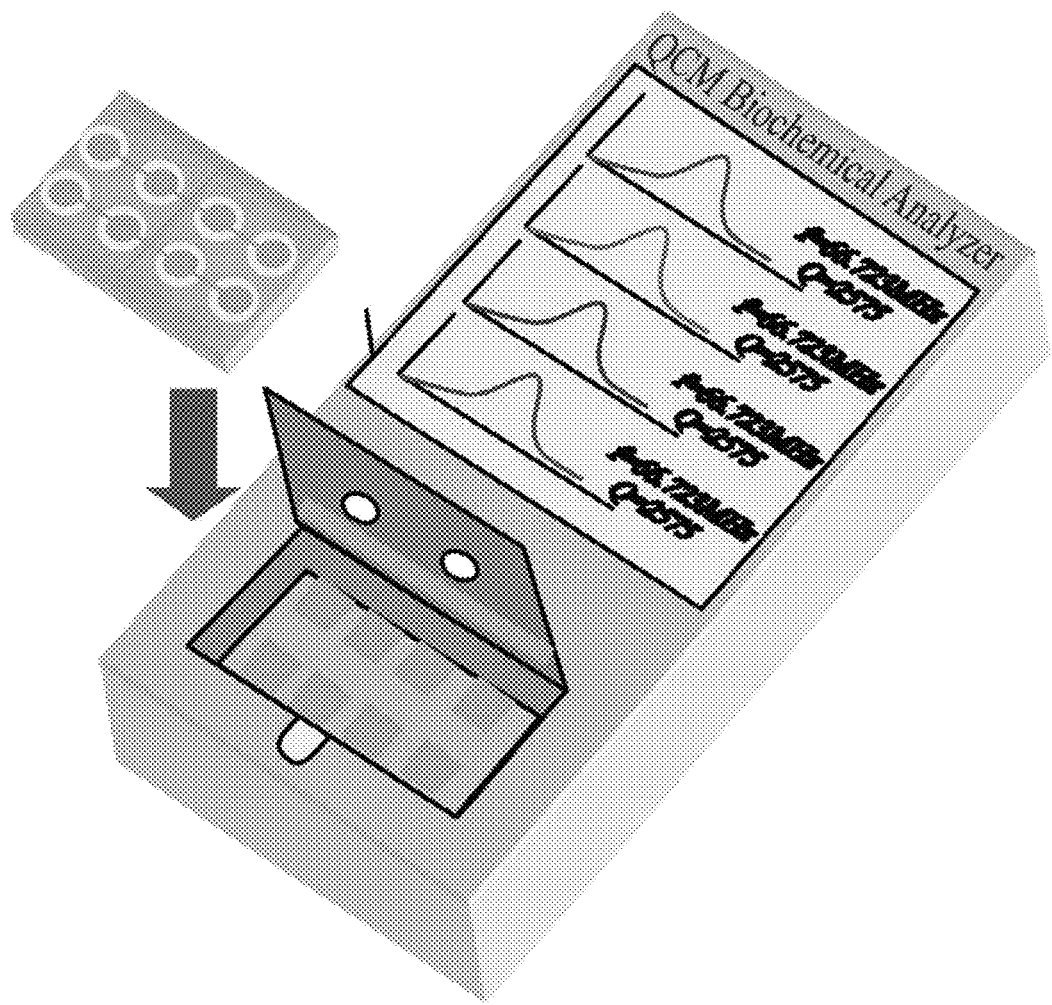

FIG. 2A is a perspective diagrammatic view of an instrument with multi-analyte (BIO) chemical assay system according to another exemplary embodiment of the present invention.

Figure 2B:
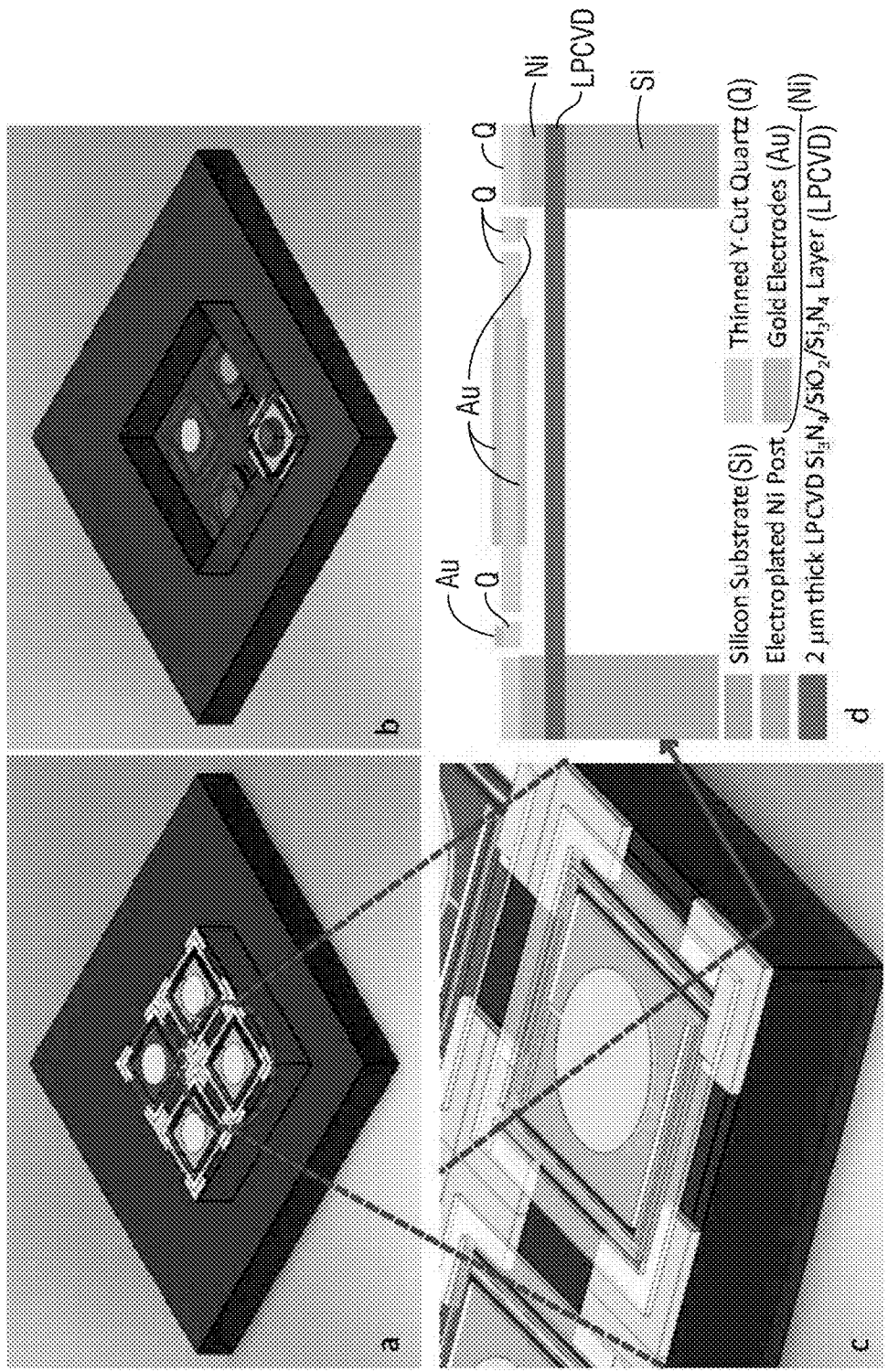

FIG. 2B is diagrammatic depictions of the reaction chamber and sensor combination of FIG. 2A. Top right view (a) is a plurality of sensors in 2×2 quartz resonator array. Bottom view (b) shows a silicon nitride membrane, the four circles schematically represent four different functionalizations placed right above the four pixels of view (a). The bottom left view is an enlarged view of a single quartz resonator showing the free standing quartz resonator with the top and bottom electrodes running along the suspension arms. The bottom right view is a cross-sectional diagrammatic schematic view of an individual pixel showing the silicon nitride reaction chamber (facing down) and the quartz resonator above it separated by a nickel spacer post.

Figure 2C:
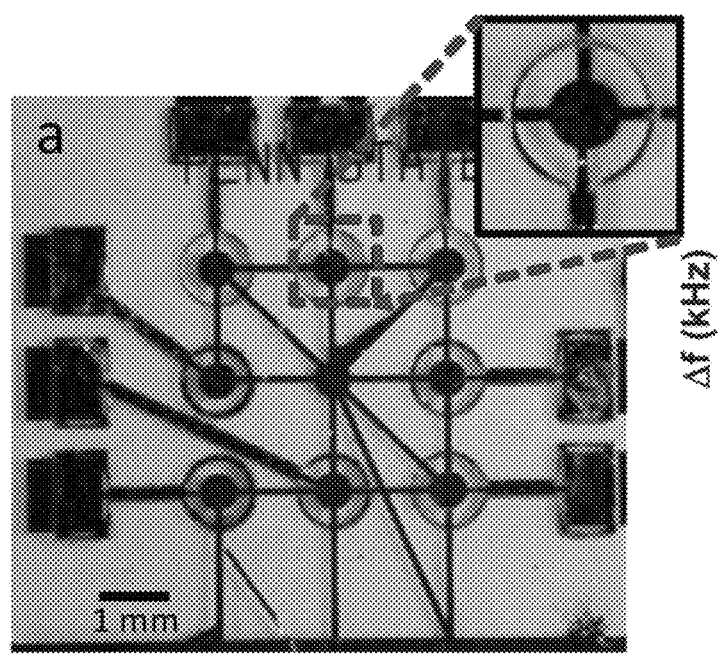

FIG. 2C is a photograph (left) of a fabricated quartz crystal resonator array with 8 resonators per chip (inset shows an enlarged view of one of the pixels).

Figure 2D:
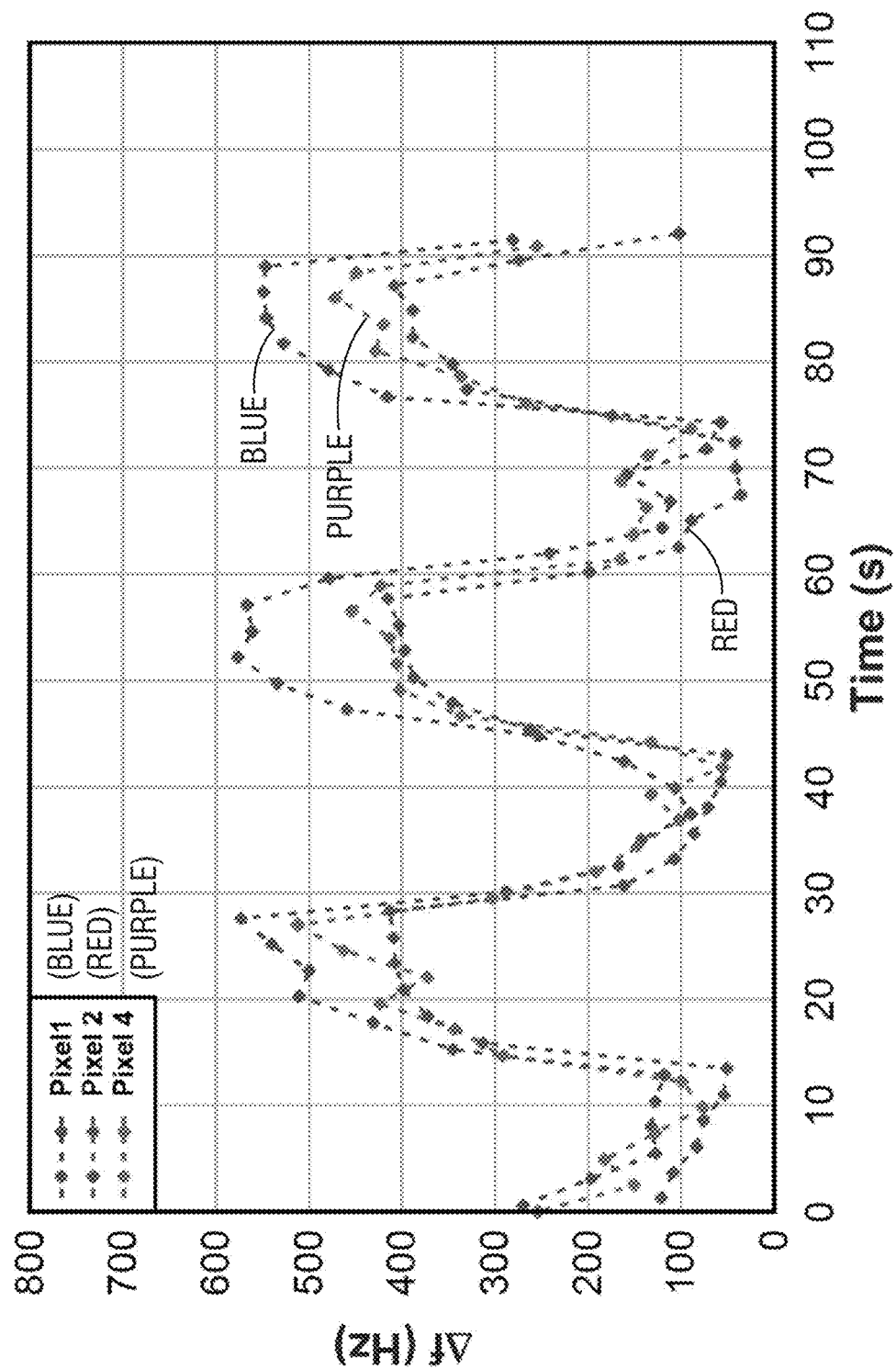

FIG. 2D is a graph showing simultaneous response of three quartz resonator pixels upon absorption of infrared radiation from a broad band lamp source modulated at a frequency of 33 MHz.

Figure 2E:
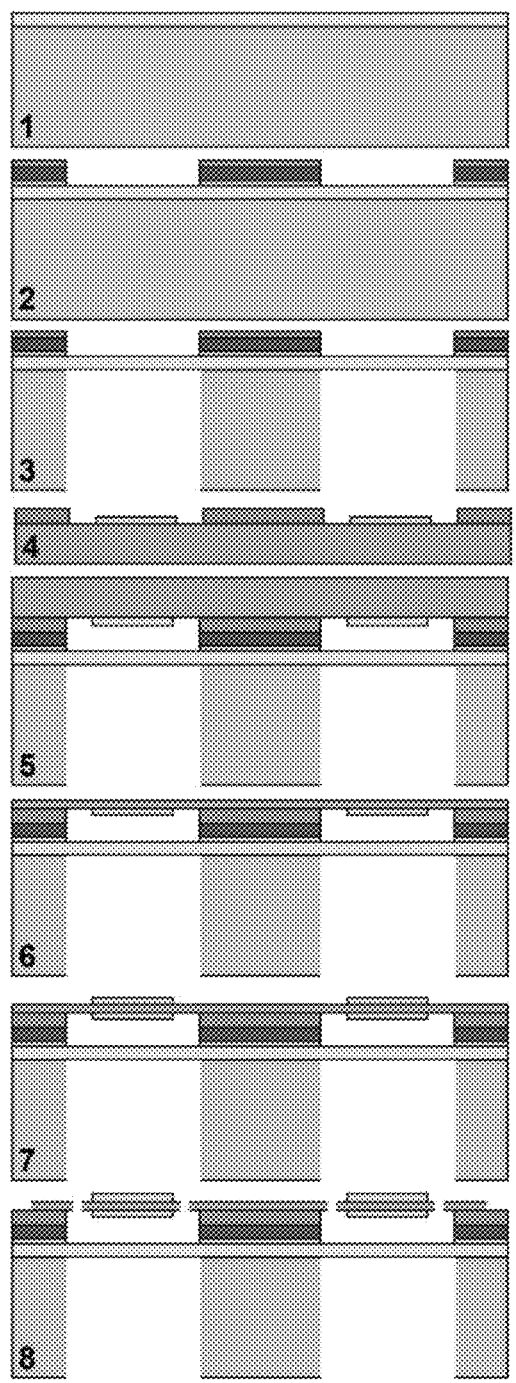

FIG. 2E is a schematic diagrammatic depiction of a sequence of a fabrication process flow to manufacture a sensor according to an aspect of the invention. Step 1 comprises $Si_3N_4/SiO_2/Si_3N_4$ deposited Si wafer. Step 2—2 mm Indium is plated on top of 2-3 mm thick electro plated Nickel posts. Step 3—Si wafer is etched from back side. Step 4-100 mm thick polished Y-cut quartz wafer is patterned with gold and plated with in solder. Step 5—Quartz wafer is aligned and solder bonded to the Si substrate wafer. Step 6—Quartz is thinned to 10 mm via polish etching in ICP RIE. Step 7—top gold electro is deposited and patterned. Step 8—Quartz is patterned and etched to create the thermally isolated pixels as shown in FIG. 2B using plasma etching and opening up bottom contact.

C. Exemplary Embodiment 3 (Room Temperature Infrared Imaging Array Fabricated Using Multi-Materials Integration Methods)

Figure 3A:
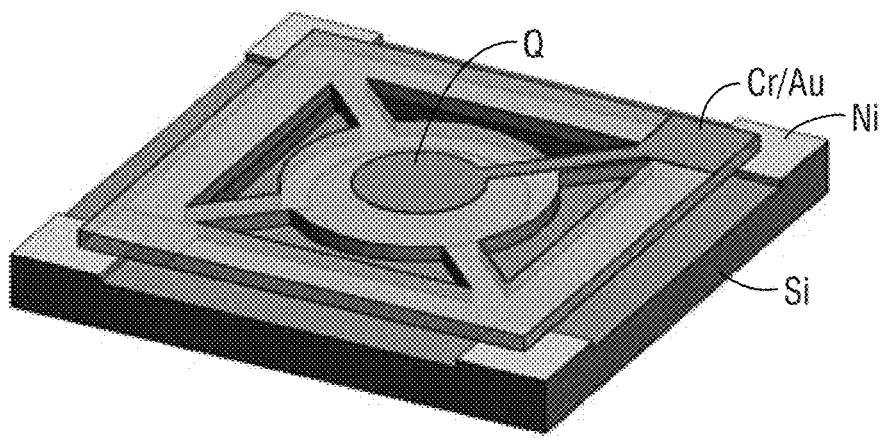

FIG. 3A is a perspective schematic illustration of an IR sensor pixel according to another embodiment of the invention. The free-standing pixel is fabricated by heterogeneous integration on a silicon substrate.

Figure 3B:
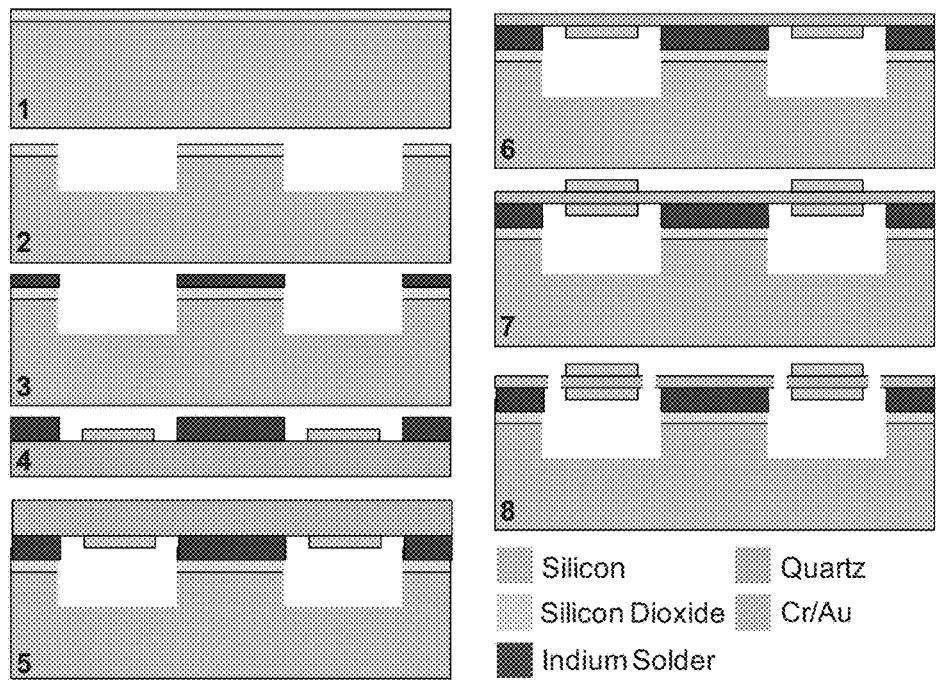

FIG. 3B is a schematic diagrammatic cross-section view of a fabrication process for the pixel of FIG. 3A.

Figure 3C:
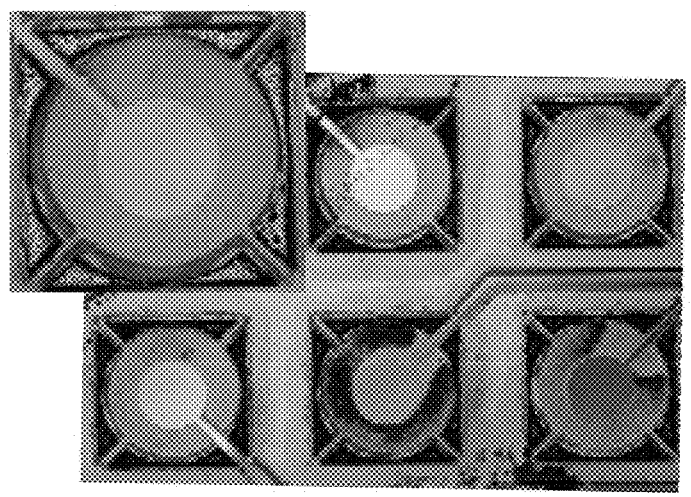

FIG. 3C is a photograph of the fabricated resonator array of multiple pixels of FIG. 3A. The insets show the close-up view of one pixel. The central resonator disk is free standing and is anchored at the four corners where electrical contacts are also taken. Top electrode is 200 µm in diameter.

Figure 3D:
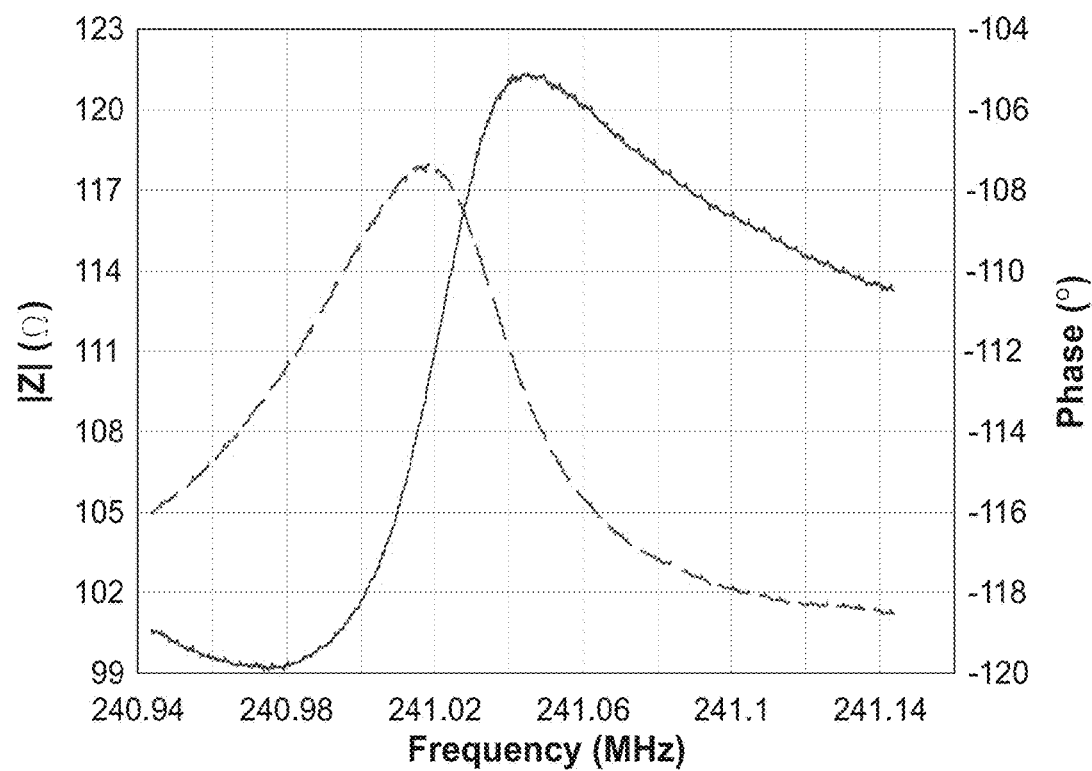

FIG. 3D is a graph of a resonance curve showing |Z| (continuous) and phase (dashed). Quality factor is 4200 at 241 MHz.

Figure 3E:
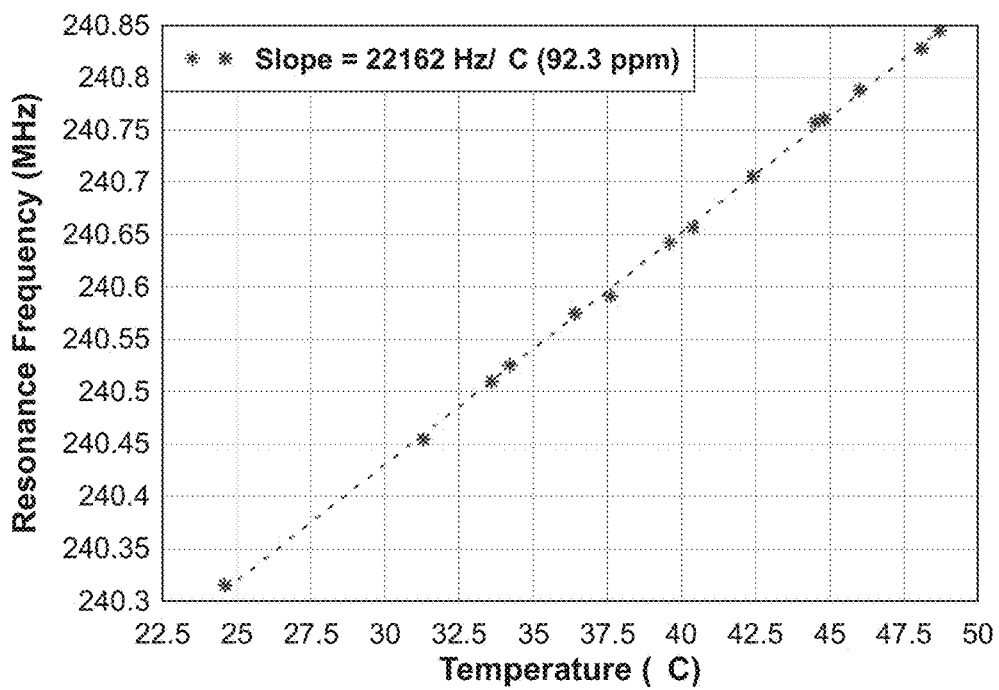

FIG. 3E is a graph of experimentally measured temperature dependence of the resonance frequency for the fabricated resonators of FIG. 3A.

Figure 3F:
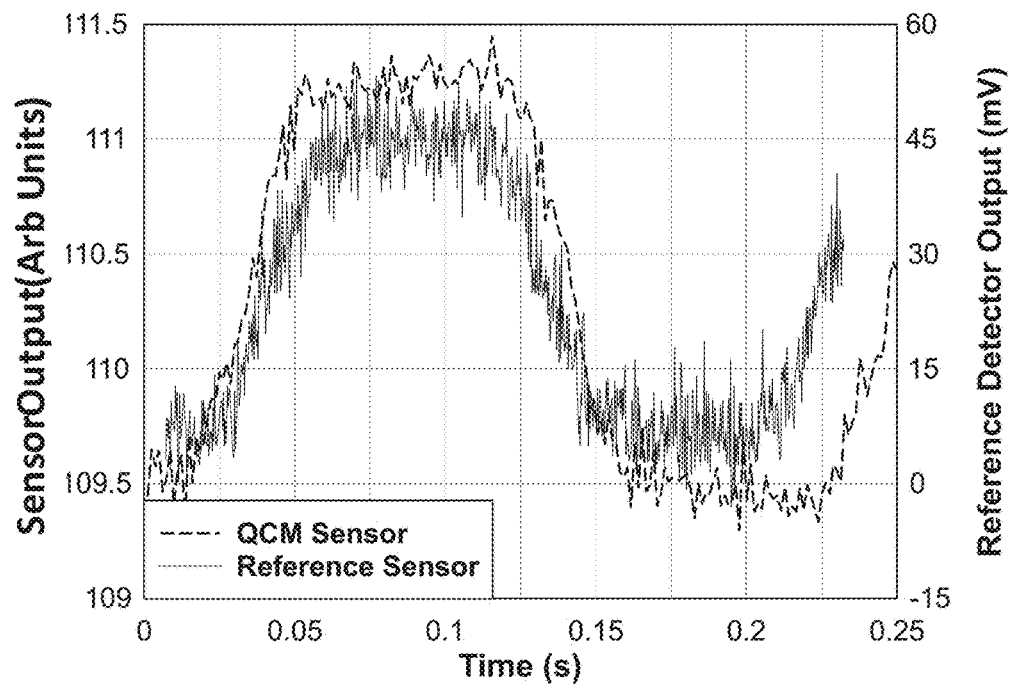

FIG. 3F is a graph of IR response of the quartz resonator pixel of FIG. 3A as compared to a reference sensor at 5 Hz modulation. Noise equivalent power NEP of 2.8 nW\Hz$^{1\backslash 2}$ and a detectivity D* of 1.79×10$^7$ cmHz$^{1/2}$\W were measured.

Figure 3G:
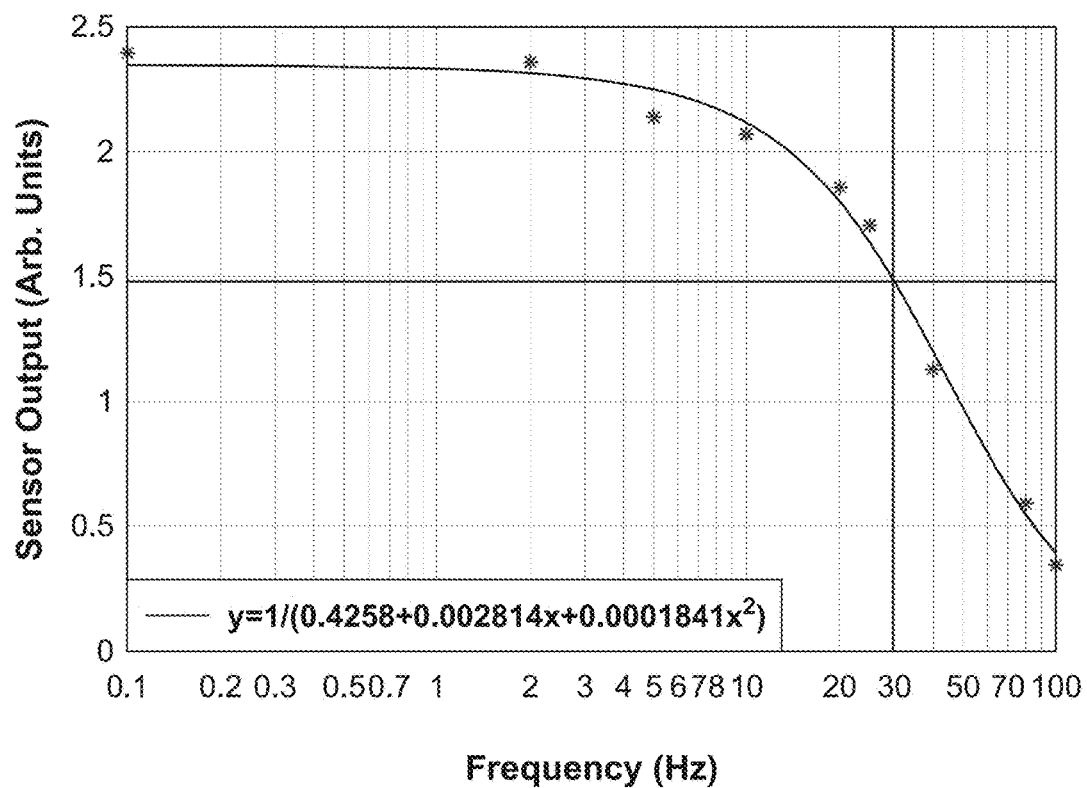

FIG. 3G is a graph of measured thermal frequency response of a detector of FIG. 3A. The graph implies a time-constant of approximately 30 ms.

D. Exemplary Embodiment 4 (Application of Micromachined Y-Cut-Quartz Bulk Acoustic Wave Resonator for Infrared Sensing, JMS, VoL 20, No. 1)

Figure 4A:
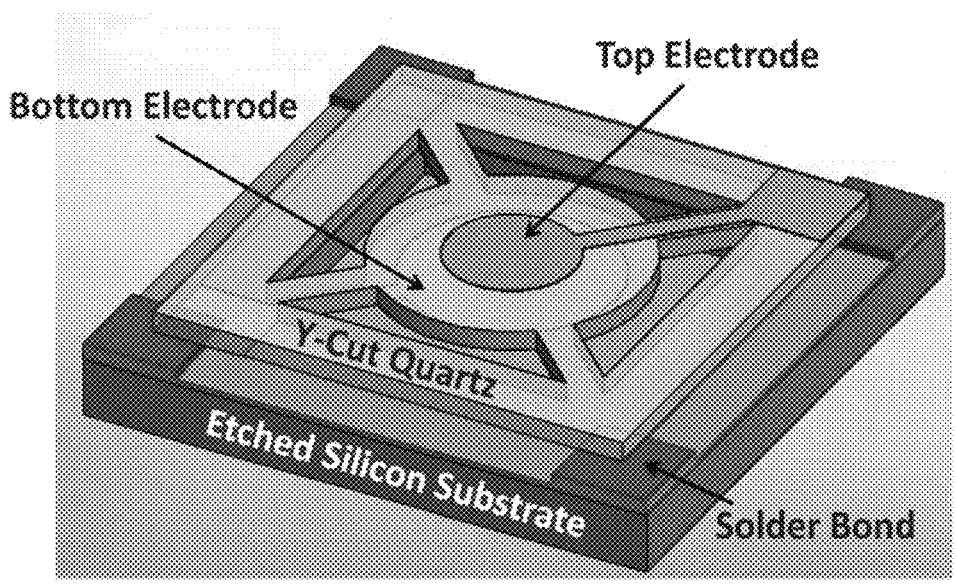

FIG. 4A is a schematic illustration of an IR sensor pixel design according to another exemplary embodiment of the present invention. The free-standing pixel is supported through the four legs mechanically which also thermally connect the pixel to the heat sink (substrate).

Figure 4B:
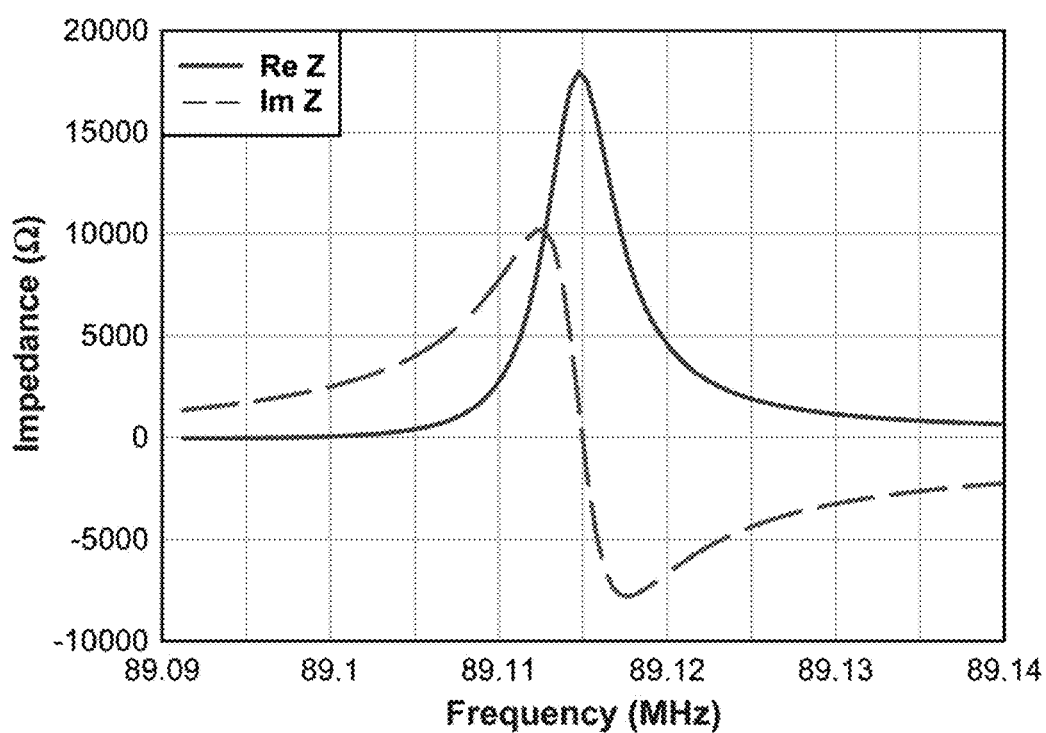

FIG. 4B is a graph of real and imaginary components of the impedance of a micro machined 89-MHz quartz resonator according to FIG. 4A.

Figure 4C:
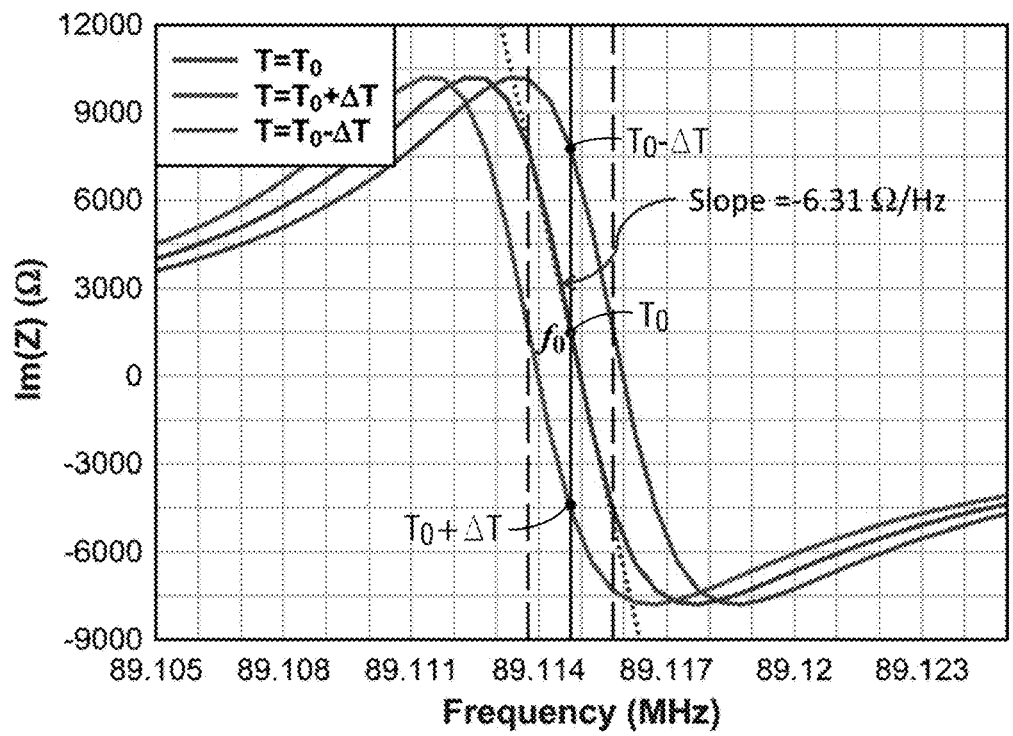

FIG. 4C is a graph showing frequency dependence of the imaginary part of the impedance for three different temperatures for a sensor of the type of FIG. 4A. In the small-signal approximation, this linearized method offers an additional gain when monitoring impedance about the quiescent frequency.

Figure 4D:
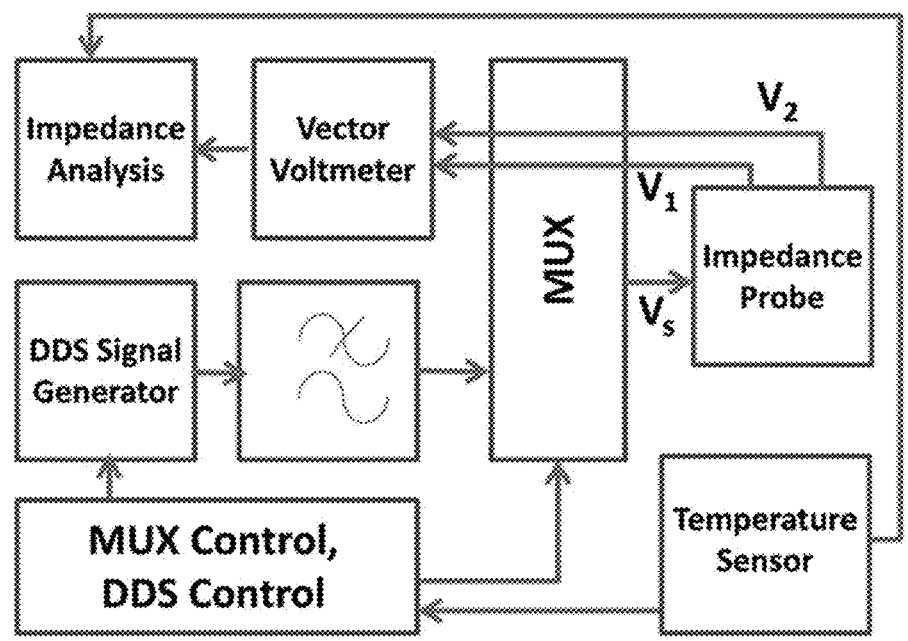

FIG. 4D is a schematic diagram of an electronic interface for real-time impedance tracking of the IR sensor array of pixels of FIG. 4A.

Figure 4E:
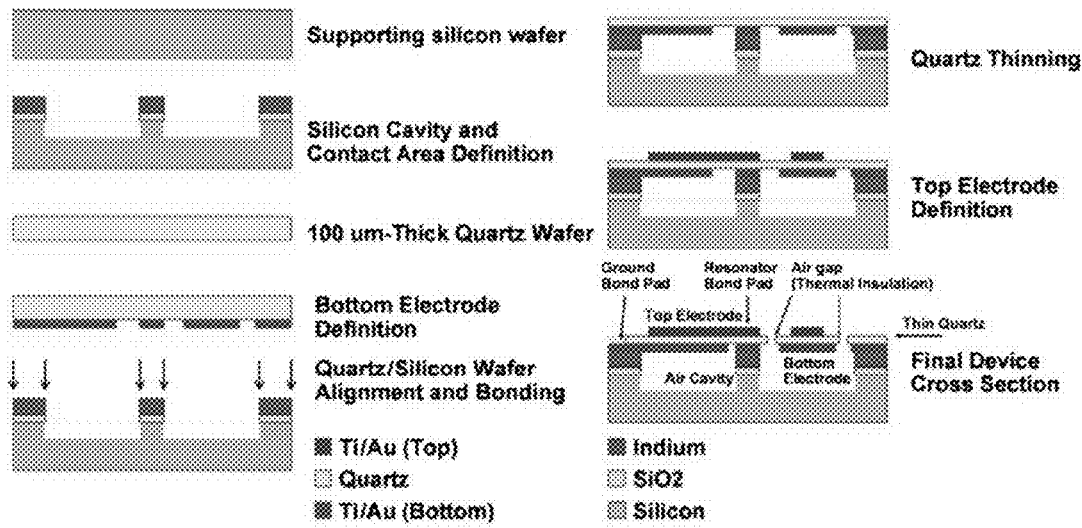

FIG. 4E is a schematic cross-sectional view of the quartz-silicon co-integrated micro electrical mechanical systems resonator fabrication process according to an aspect of the invention.

Figure 4F:
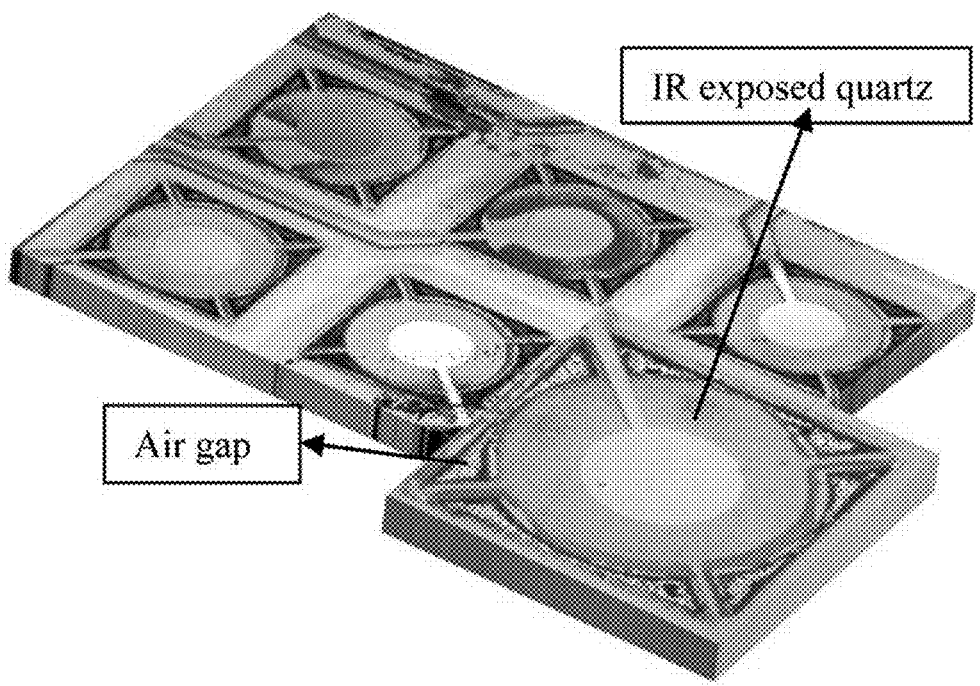

FIG. 4F is an optical image of a fabricated quarts resonator-based IR detector array according to pixels of FIG. 4A. The central resonator disk is free standing and is anchored at the four corners where electrical contacts are routed. The top electrode is 200 μm in diameter.

Figure 4G:
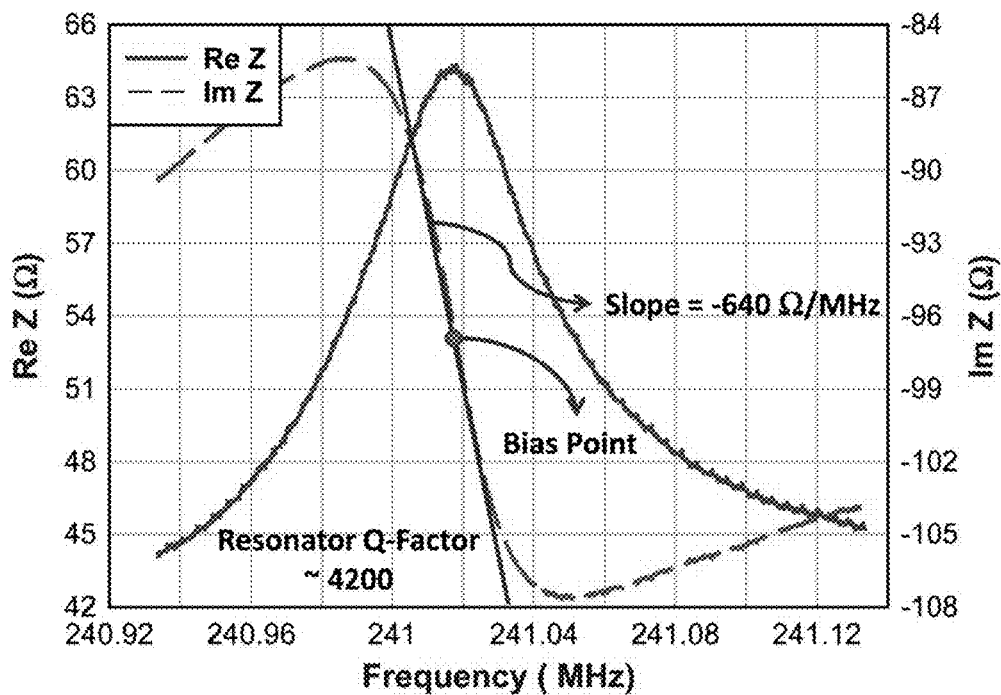

FIG. 4G is a graph of resonance characteristics of the micro machine quartz resonator of the type of FIG. 4A integrated on a silicon substrate. Mechanical losses at the anchors and acoustic losses in the clamped regions arising from the parasitic capacitance due to the silicon substrate have degraded the overall quality factor of the resonator.

Figure 4H:
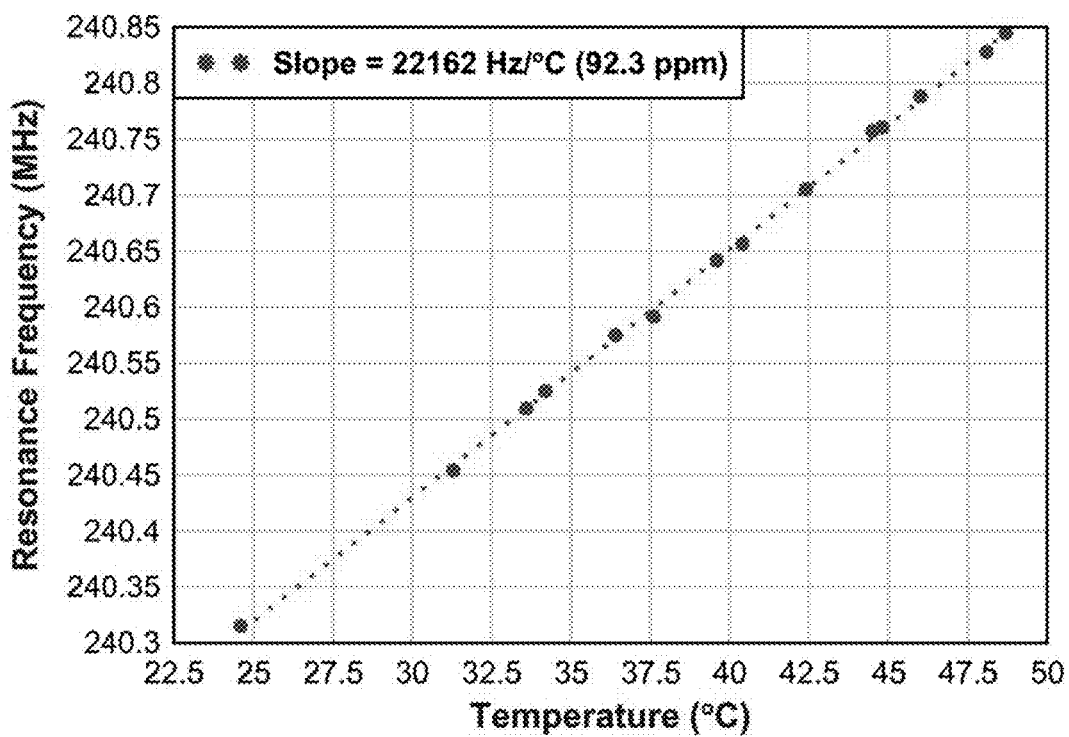

FIG. 4H is a graph of experimentally measured variation of the resonance frequency with temperature for a 241 MHz resonator of the type of FIG. 4A.

Figure 4I:
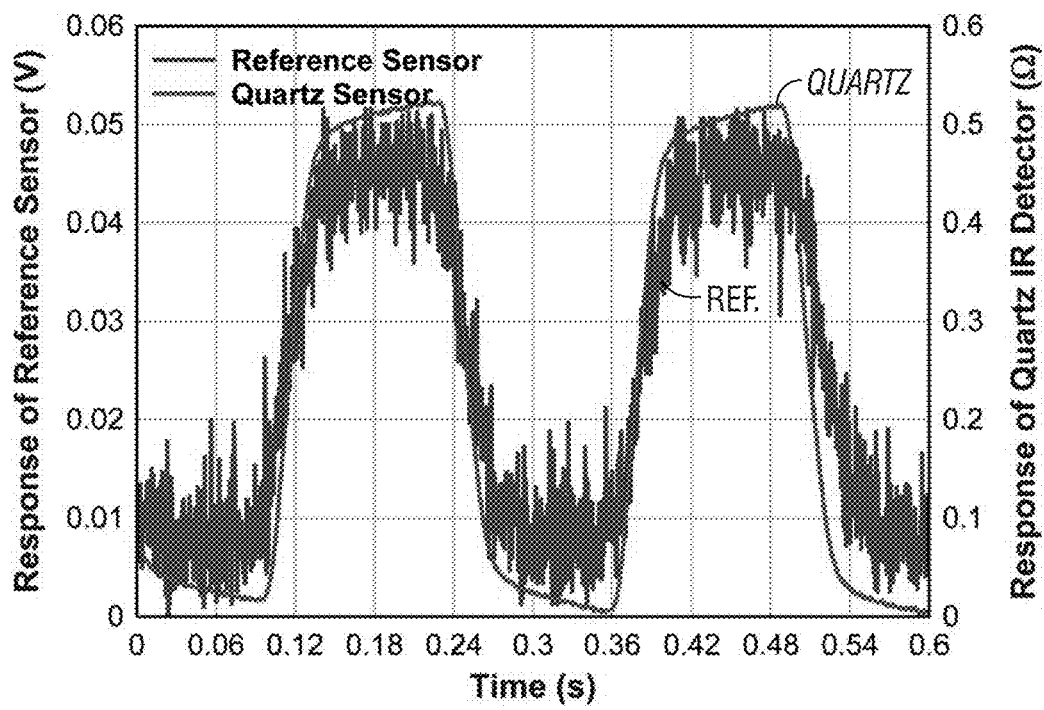

FIG. 4I is a graph of response of a quartz IR detector of the type of FIG. 4A for the same input IR power and modulation frequency.

Figure 4J:
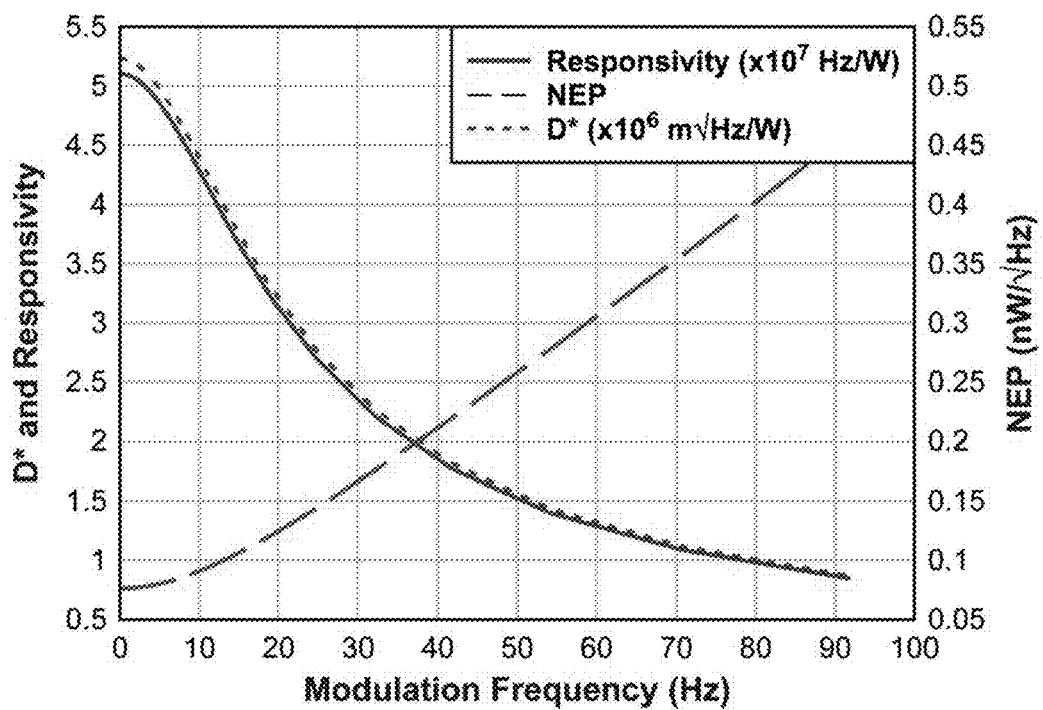

FIG. 4J is a graph of calculated values of the IR responsivity, NEP, and D* for the 241-MHz micro machine quartz resonator. The calculator values are an order of magnitude of higher than the respected measured values.

Figure 4K:
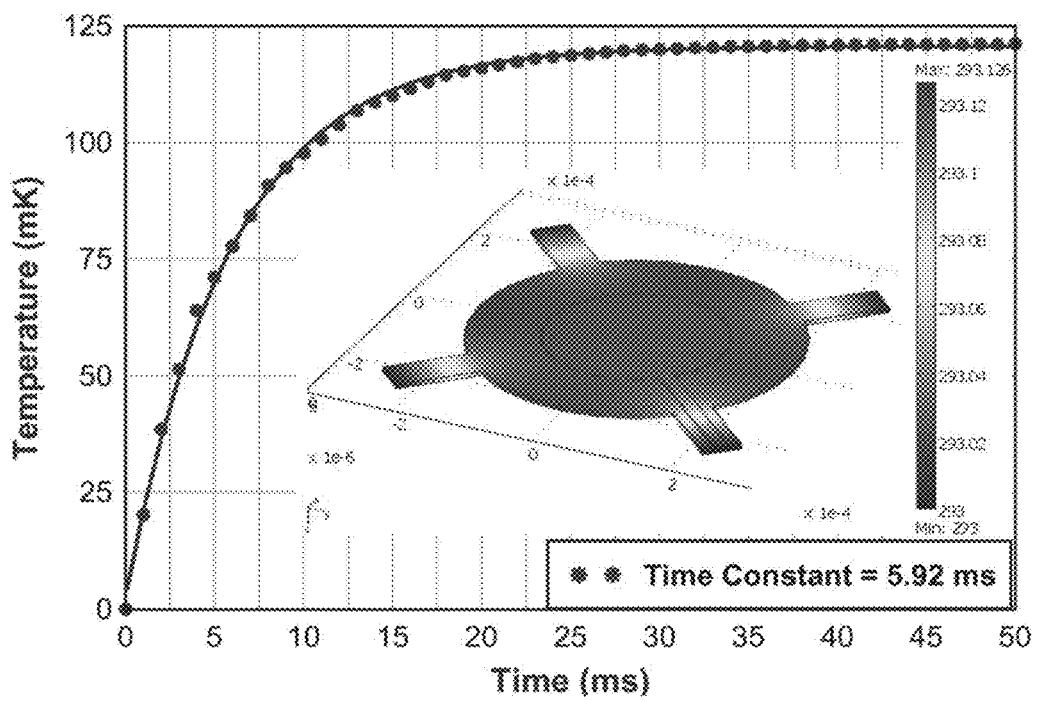

FIG. 4K is a graphic representation of NETD due to flicker and thermal fluctuation noise components clearly shows that the thermal component entirely dominates the performance of the device.

Figure 4L:
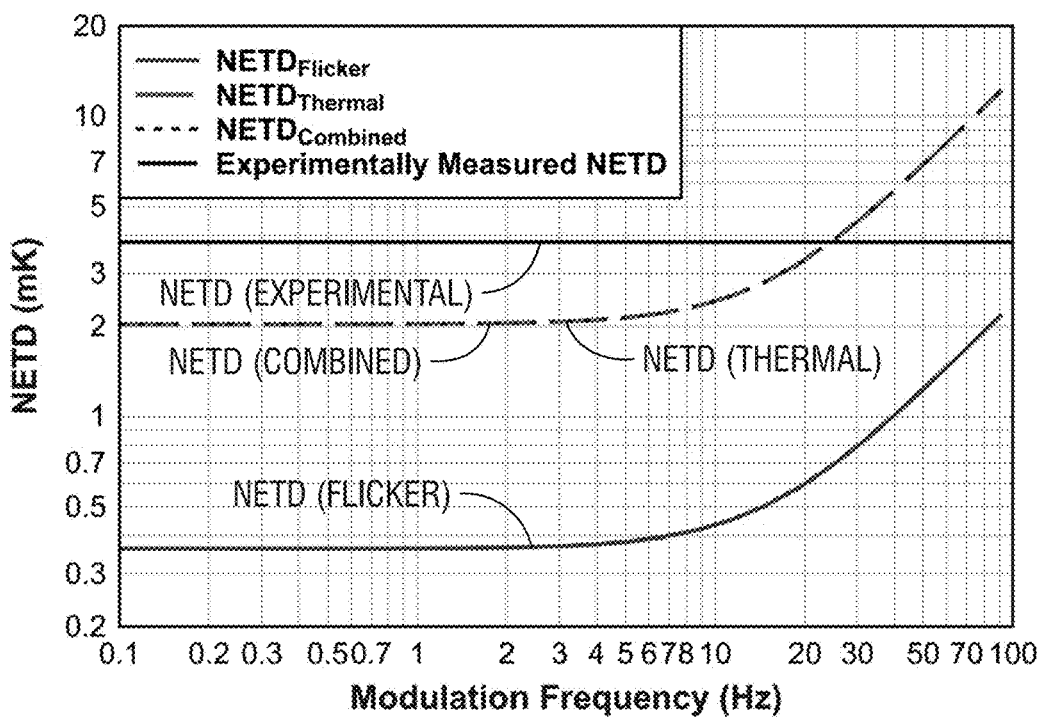

FIG. 4L is a graphic depiction of a simulation of temporal evolution of the temperature profile at the midpoint of an IR sensor pixel of the type of FIG. 4A in response to a step function of incident radiation. The inset shows the spatial distribution of the temperature profile of the pixel in steady state. The values of the incident power density were taken from the experimental measurements.

Figure 4M:
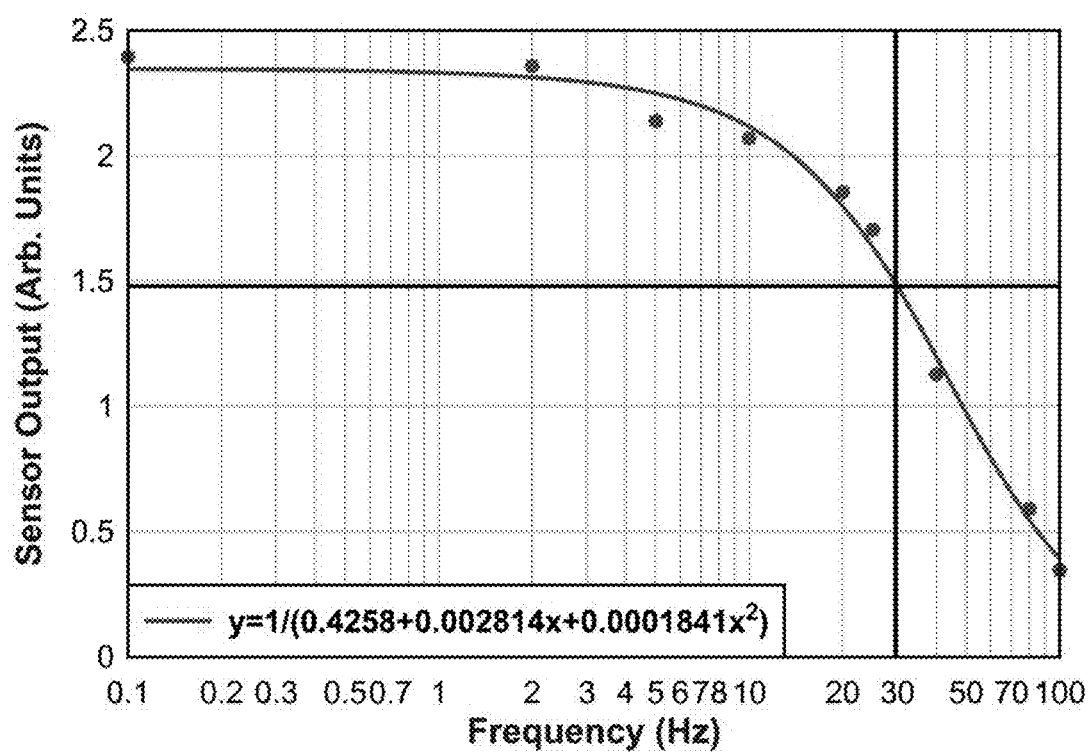

FIG. 4M is a graphic illustration of output of the sensor of FIG. 4A as function of the modulation frequency and shows a low-past thermal behavior. The time constant based on the three dB cutoff criteria gives a time constant of 30 ms. However, this time constant is limited by the optical chopper used in this work.

E. Exemplary Embodiment 5 (Micromachined Quartz Resonator-Based High Performance Thermal Sensors)

Figure 5A:
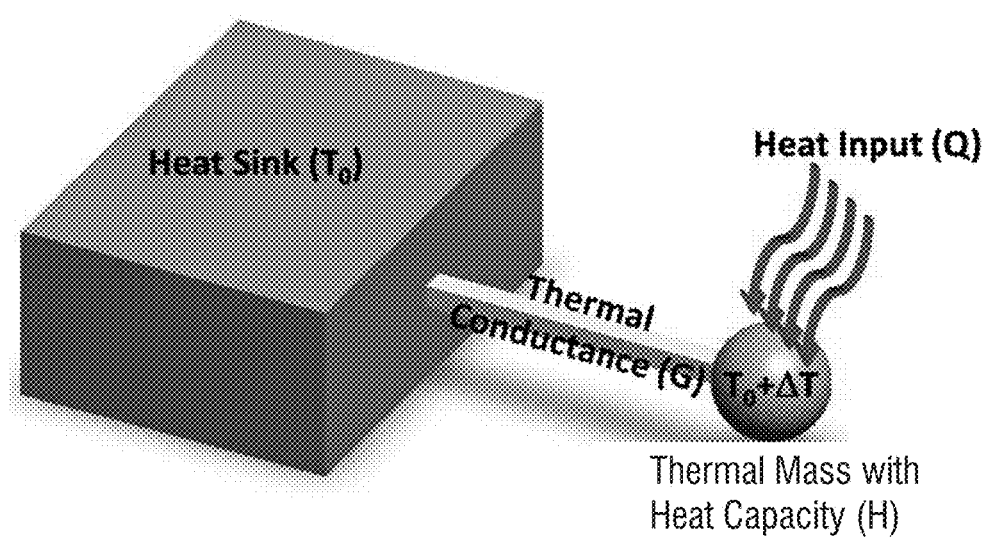

FIG. 5A is schematic perspective illustration of a thermal detector according to another exemplary embodiment of the present invention.

Figure 5B:
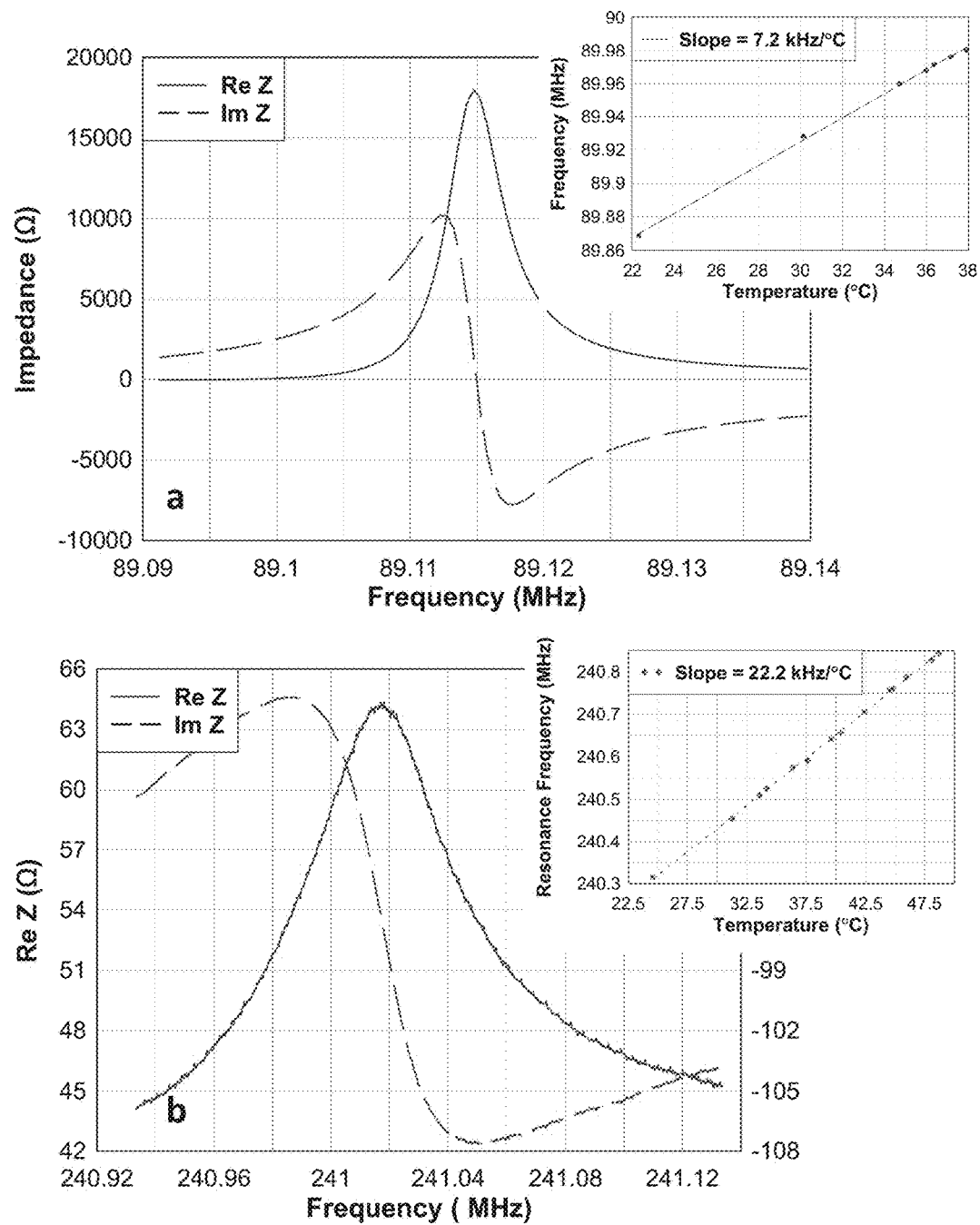

FIG. 5B is graphs illustrating (a) real and imaginary impedance spectrum at resonance for an 18 μm thick Y-cut resonator of the type of FIG. 5A (see top graph the Q-factor is approximately 115000; and (b) real and imaginary impedance spectrum at resonance for a 6.9 μm thick Y-cut resonator (see bottom graph, the Q-factor is approximately 4200). Insets in each case show the temperature sensitivity of the resonance frequency.

Figure 5C:
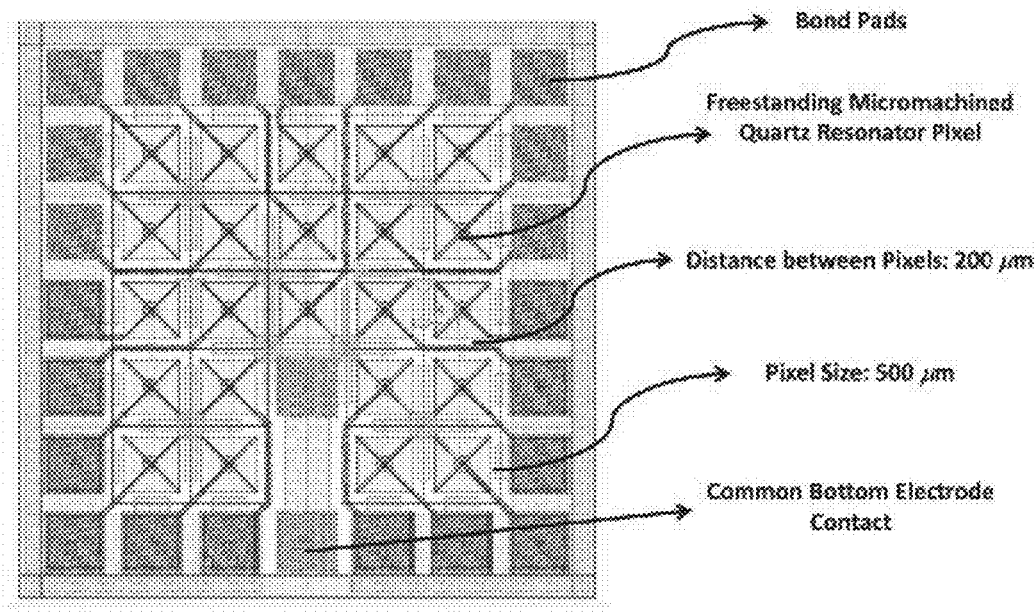

FIG. 5C is a plan view of a mask layout of an IR sensor array chip with plural resonators of the type of FIG. 5A. Each pixel is a 500 μm square with the central suspended resonator disk diameter varying from 200 μm to 450 μm. The top and bottom electrodes are laid out to minimize overlap and avoid parasitic capacitive coupling in the sensor array.

Figure 5D:
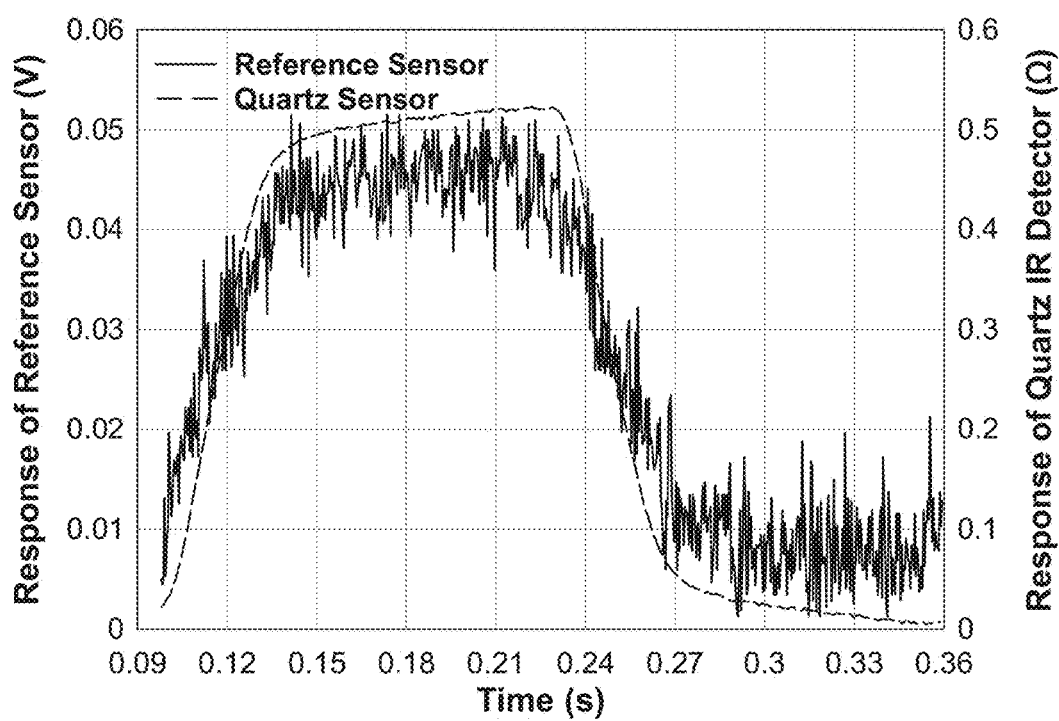

FIG. 5D is a graph of a response of a reference detector (jagged line) and the Y-cut quartz detector (smoother line) to modulated input radiation from a broad band IR lamp.

Figure 5E:
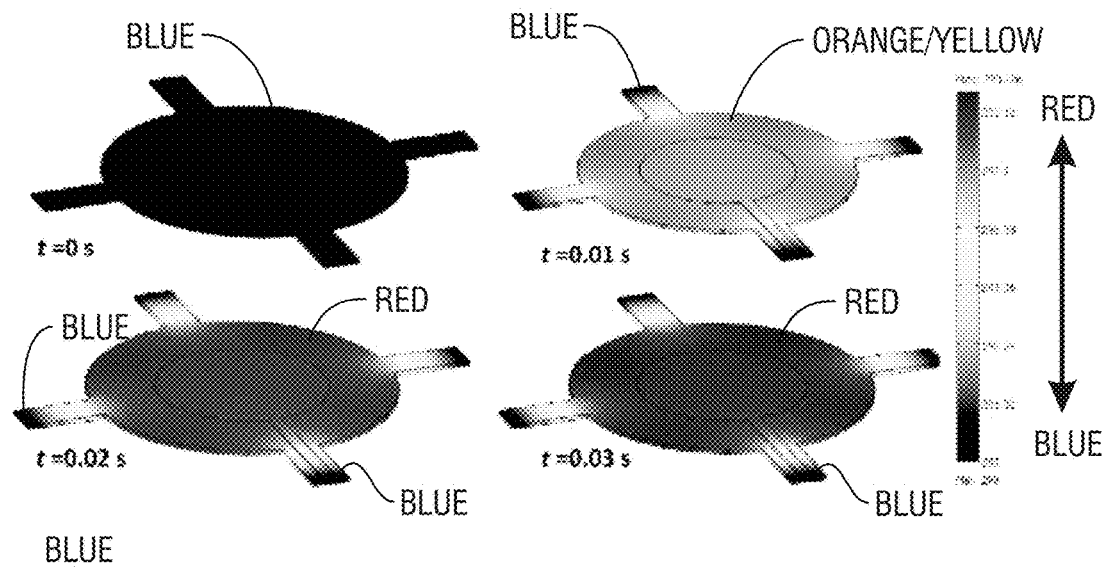

FIG. 5E is simulated temperature profiles of an IR sensor pixel of the type of FIG. 5A for input radiation corresponding to the settings used in the calibration experiment at four different times, as indicated. The maximum temperature change of 126 mK is predicted at a time constant of 6 ms through these simulations.

Figure 5F:
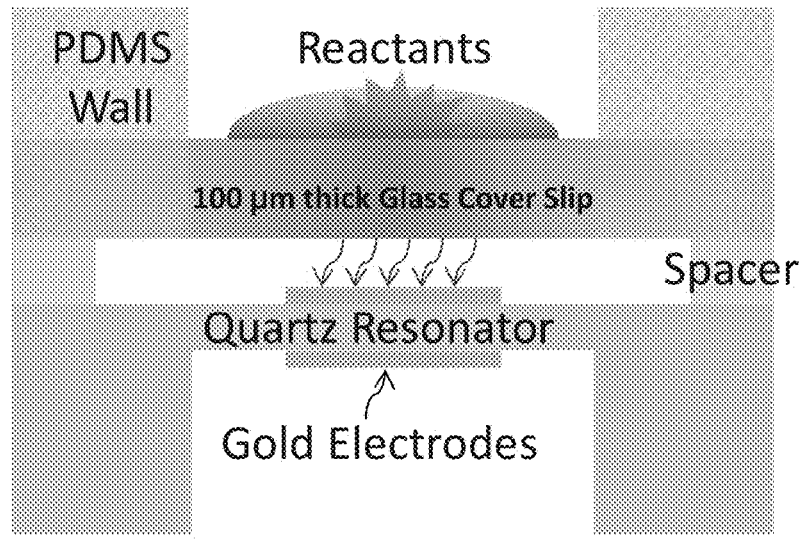

FIG. 5F is a schematic cross-section illustration of a sensor configuration of the type of FIG. 5A showing a reaction chamber which is placed in close proximity to the quartz resonator thermometer with a distance of 10-100 μm. The figure is not to scale.

Figure 5G:
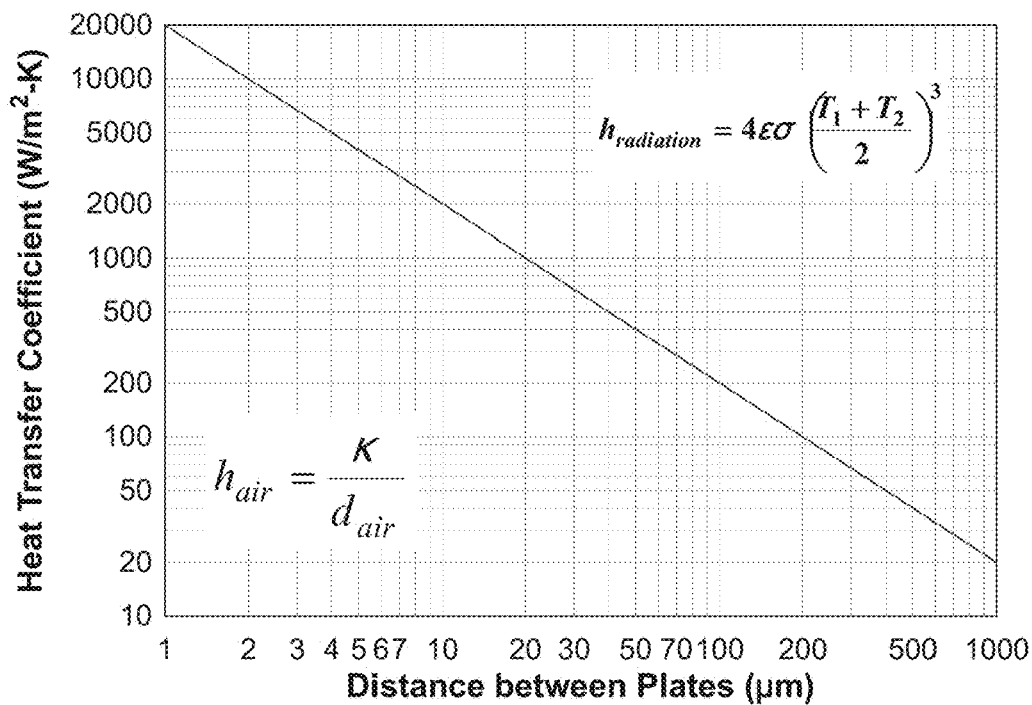

FIG. 5G is a graph illustrating effective heat transfer coefficient plotted as a function of a distance between a sensor and the reaction chamber spacing of the type of FIG. 5F. The above heat transfer coefficient includes both radiative and conduction heat transfer through the confined air between the sensor and the reaction chamber.

Figure 5H:
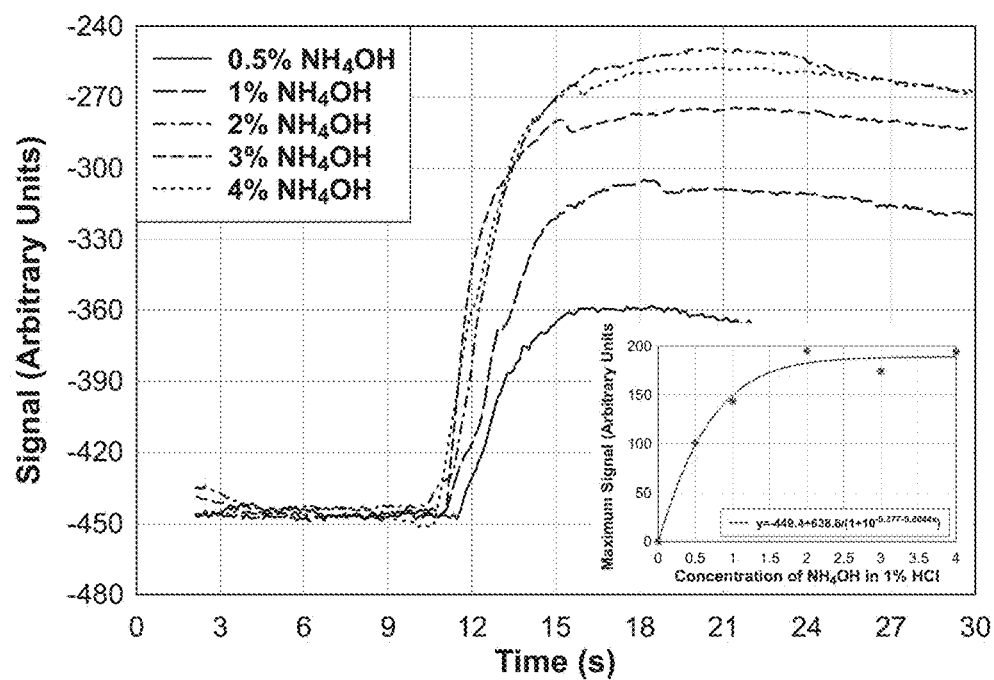

FIG. 5H is a graph of output of the sensor for a reaction of 1% HCl with various concentration NH$_4$OH. Since the concentration of HCl was fixed, the heat output begins to saturate for higher concentration of NH$_4$OH (inset) since the reaction requires 1:1 molar concentration.

F. Exemplary Embodiment 6 (Monitoring Biochemical Reactions Using Y-Cut Quartz Thermal Sensors)

Figure 6A:
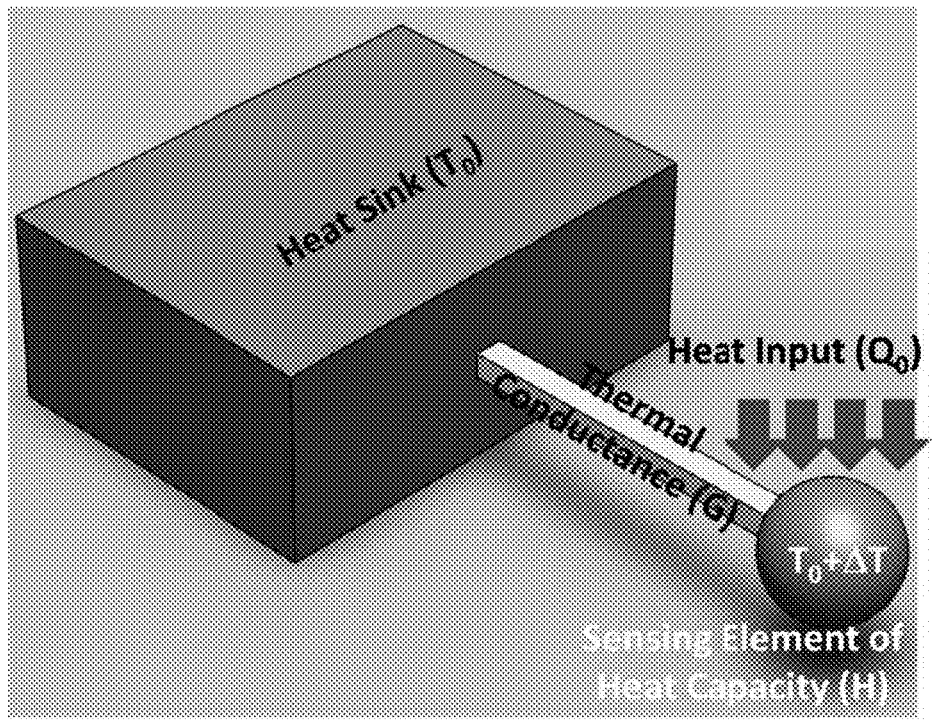

FIG. 6A is a schematic illustration of a thermal detector according to another exemplary embodiment of the present invention.

Figure 6B:
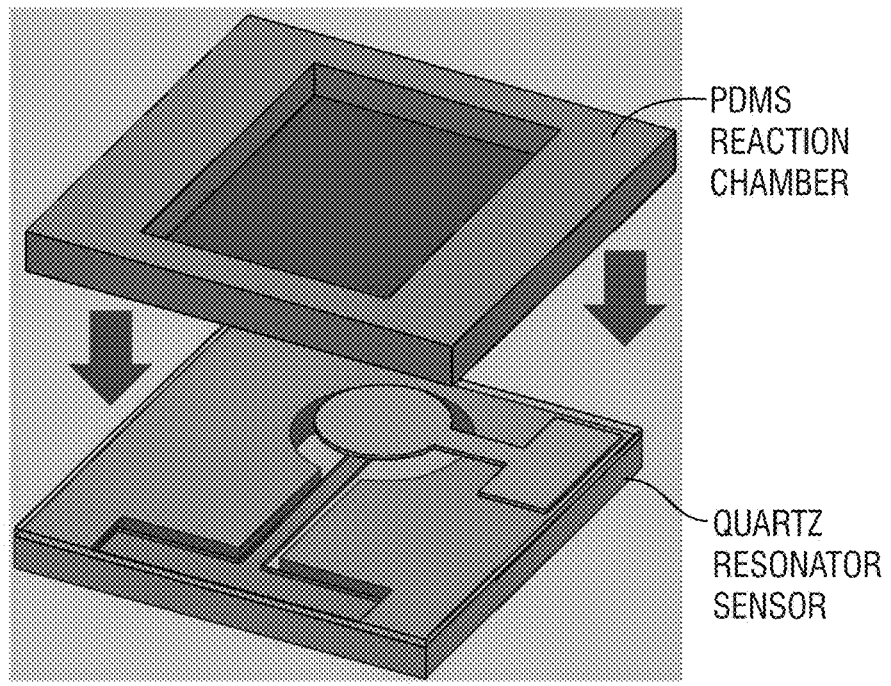

FIG. 6B is a schematic illustration of a biosensor of the type of FIG. 6A with a separated reaction chamber placed in close proximity to the quartz resonator temperature sensor.

Figure 6C:
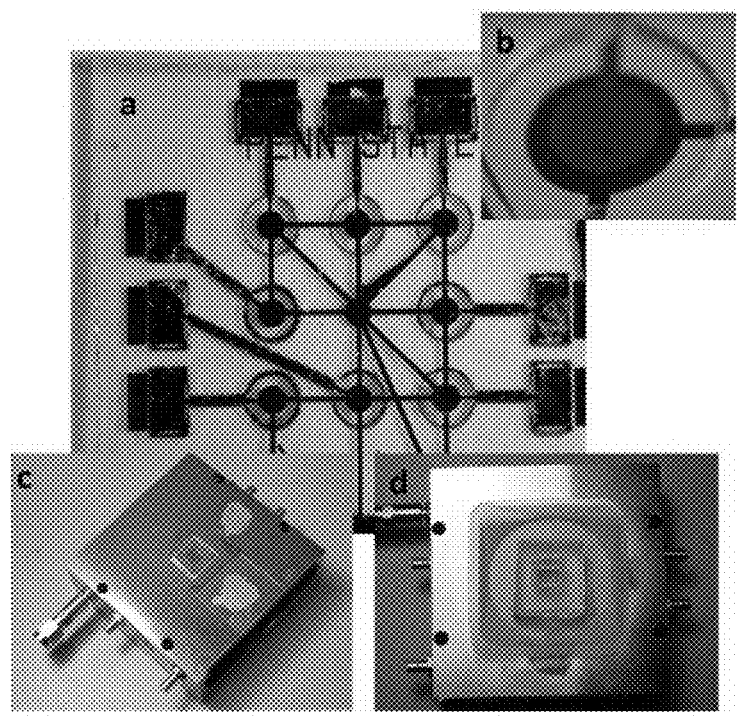

FIG. 6C is optical photographs of a plurality of Y-cut quartz based bulk acoustic wave resonators of the type of FIG. 6B. Top left at (a) is a photograph of a sensor array with 8-pixels arranged around the perimeter of the square. Top right at (b) is an enlarged image of one of the pixels. Bottom left at (c) is a package device on a 100 μm thick stainless steel plate. Bottom right at (d) is a package device with a PDMS reaction chamber. The central hole exposes the sensor array to the reaction chamber which is placed directly atop.

Figure 6D:
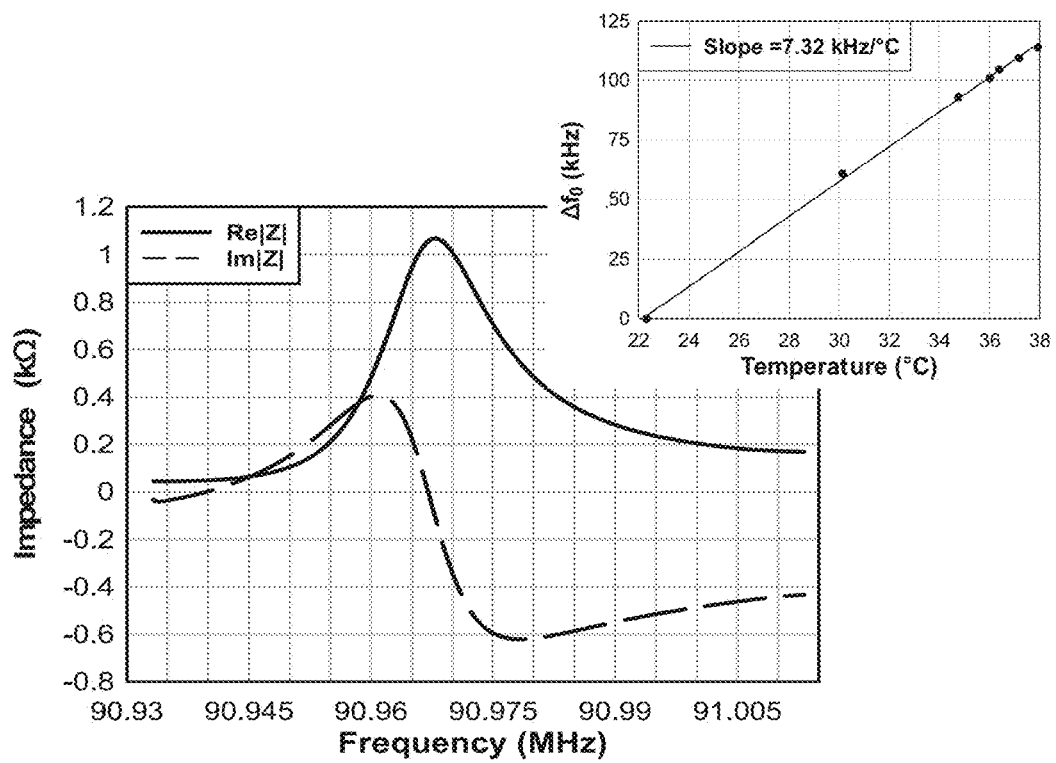

FIG. 6D is a graphical representation of real and imaginary components of admittance of a micro machine 90.94 MHz quartz resonator according to FIG. 6B. The inset shows the temperature sensitivity of the resonance frequency.

Figure 6E:
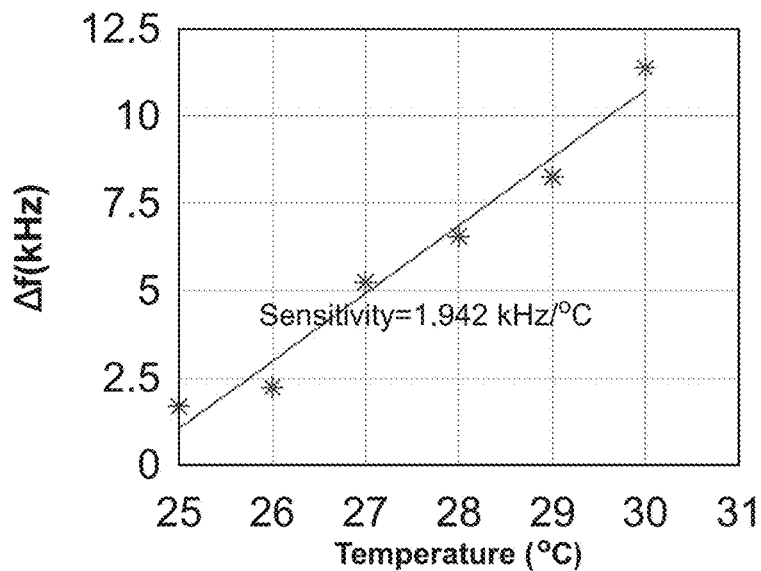

FIG. 6E is a graph showing temperature sensitivity of the Y-cut quartz resonator-based thermal sensor of FIG. 6B measured by placing approximately 3 mm of heated hot water in the reaction chamber. The measured sensitivity used in this method is approximately 27% of the sensitivity obtained from ideal temperature sensitivity measured in FIG. 6D.

Figure 6F:
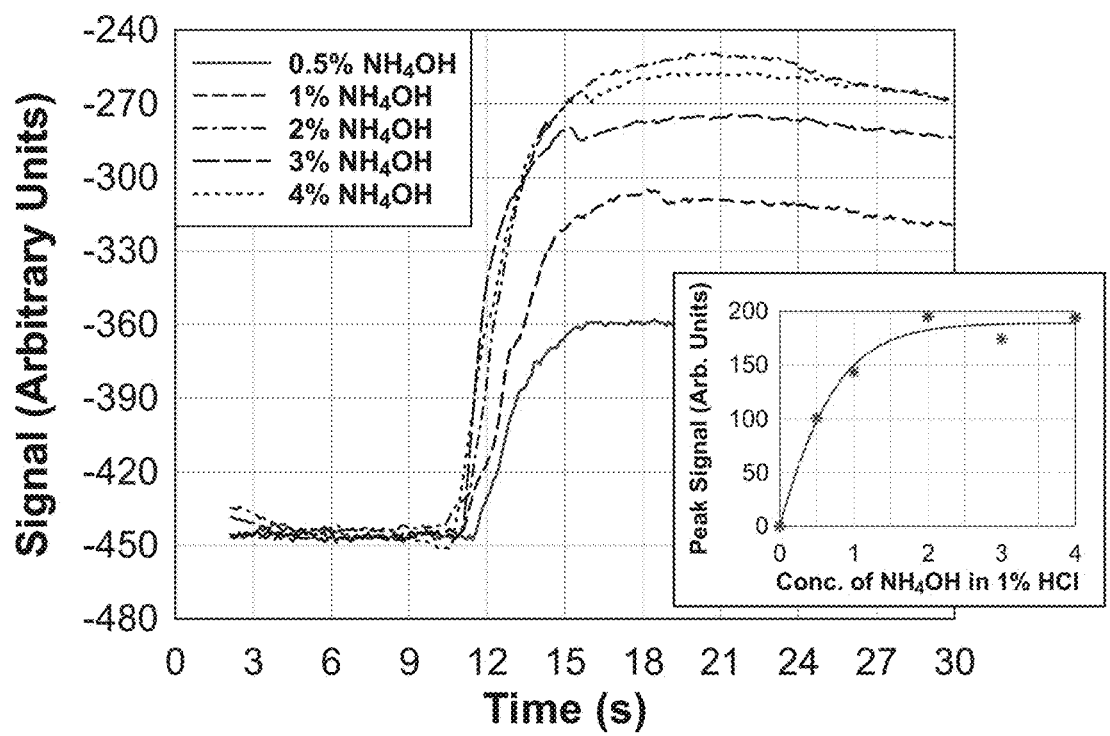

FIG. 6F is a graphical illustration of time dependence of Im|Y| of the quartz resonator sensor of FIG. 6B in real time upon addition of 0.5%-4% $NH_4OH_2$ to 1% HCl. Inset shows the peak amplitude for each concentration.

Figure 6G:
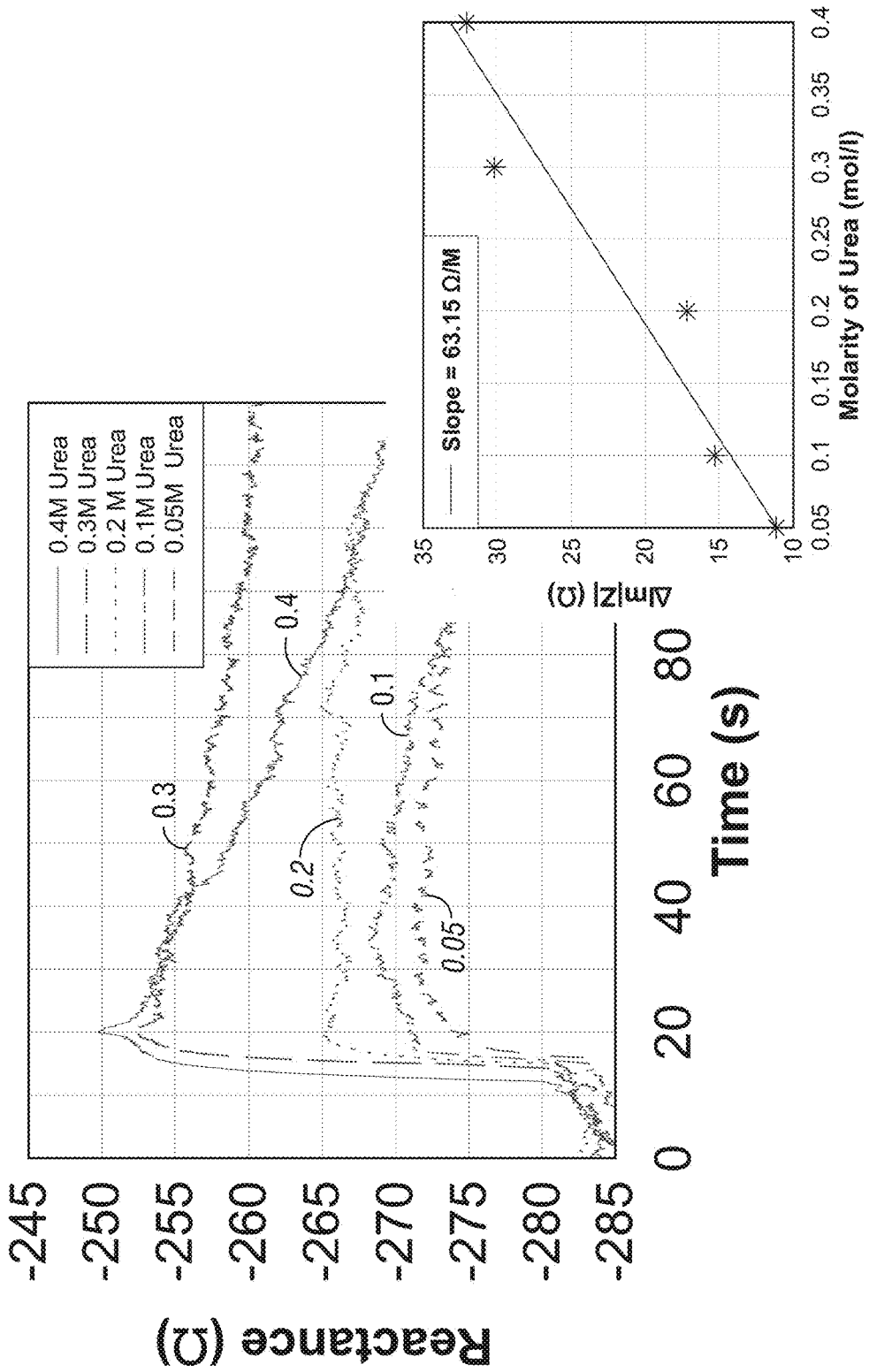

FIG. 6G is a graphical representation of output of the sensor for various concentrations of urea catalyzed by the enzyme urease. Increasing concentration of urea results in a linear increase in the peak impedance (see inset).

Figure 6H:
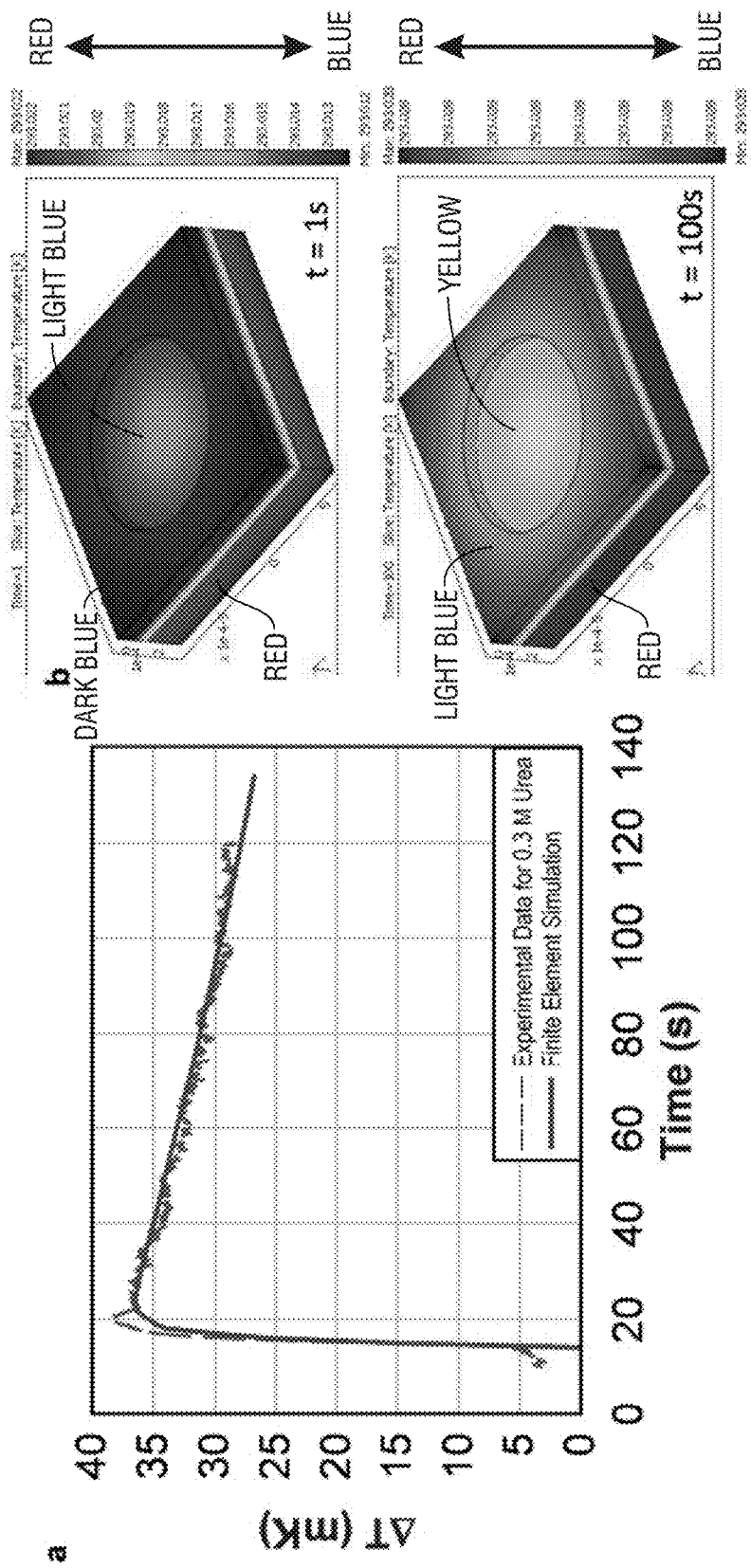

FIG. 6H is (a) a graphical illustration (left) of experimental and finite element simulated temperature evolution temporal profile for 0.3M urea-urease reaction; and (b) spatial distribution of the temperature profile of the pixel at times t=1 s (right top) and t=100 s (right bottom).

Figure 6I:
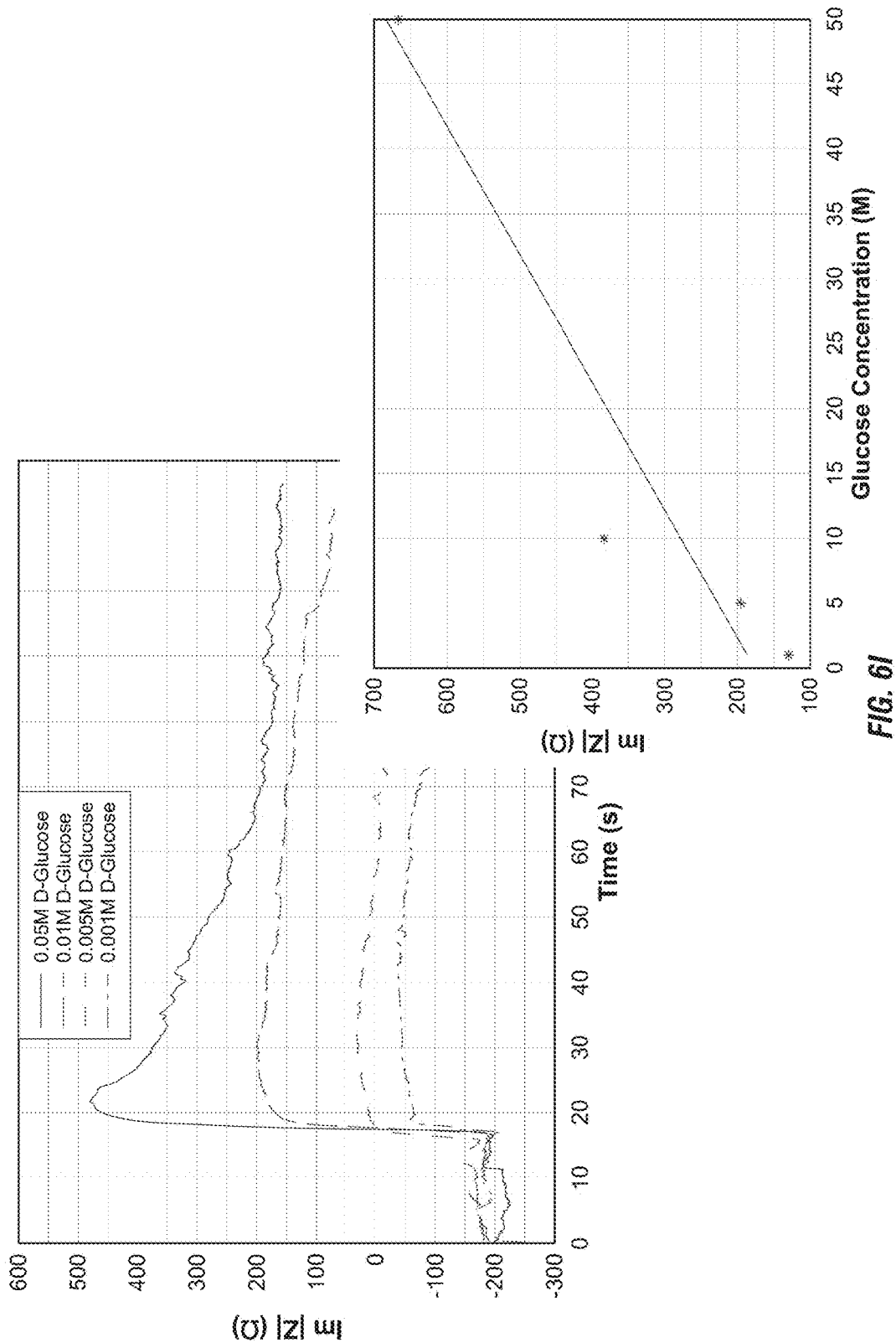

FIG. 6I is a graphical illustration of output of the sensor for various concentrations of glucose catalyzed by glucose dehydrogenase enzyme. Increasing concentrations of glucose results in monotonic increase in impedance which has been fitted by a straight line.

Figure 6J:
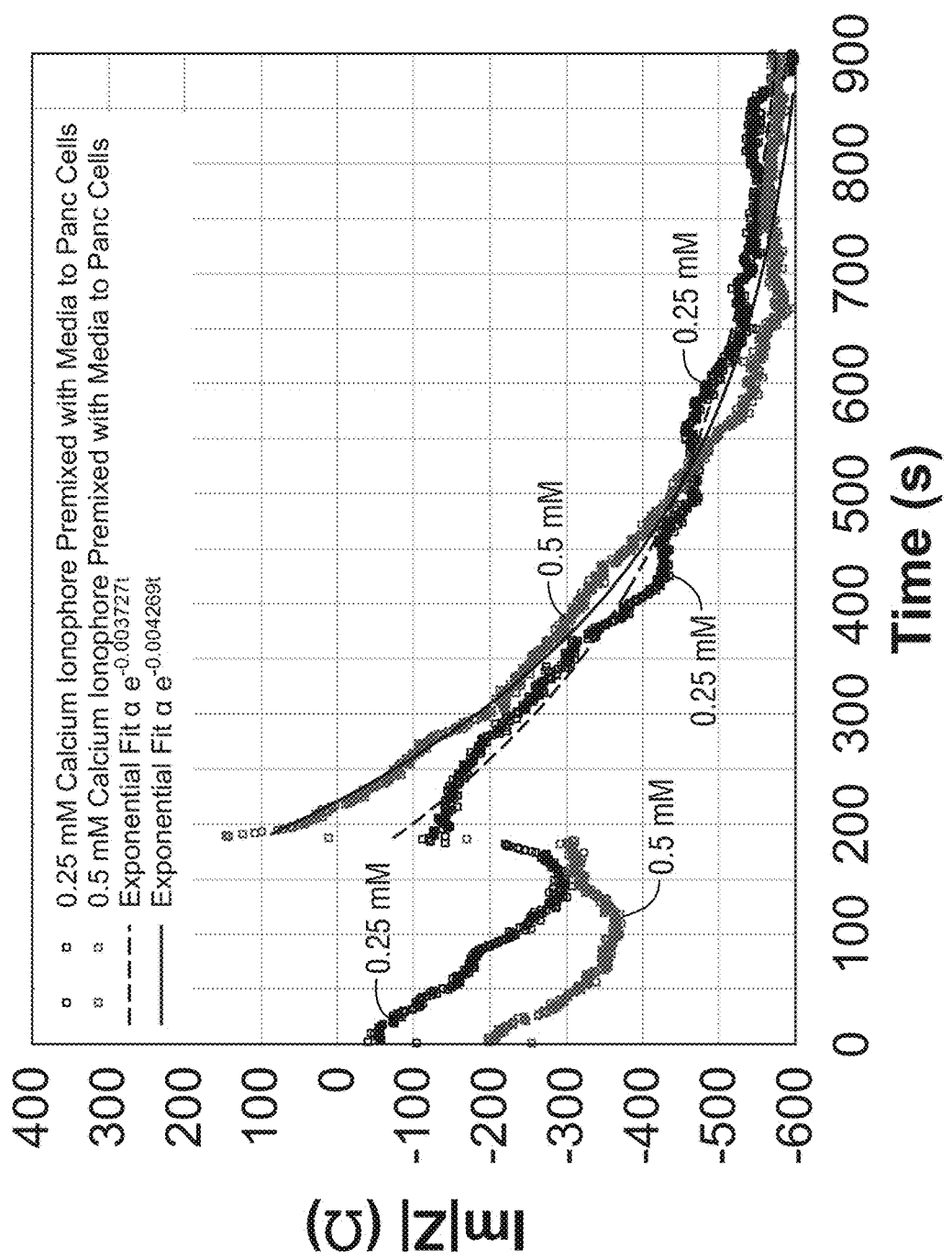

FIG. 6J is a graphical illustration of measurement of calcium ionophore induced activity in pancreatic cancer cells. Pancreatic cancer cells are grown in the reaction chamber and placed atop the quartz thermal sensor for measurement of the heat elevation from the interaction of the cells with the $Ca^{2+}$ permeating through the cell membrane.

V. DETAILED DESCRIPTION OF EXEMPLARY EMBODIMENTS OF THE INVENTION

For a better understanding of the invention and its aspects, specific examples of forms the invention can take will now be described in detail with reference to the above-described drawings. It is to be understood, however, that these detailed examples or embodiments are neither exclusive nor inclusive of all the forms the invention can take. For example, variations obvious to those skilled in the art will be included in the invention.

These embodiments are presented for illustration and not limitation. It should be appreciated that though the embodiments focus on micro- or nano-scale fabricated arrays of sensors and/or reaction chambers, the invention is not necessarily limited thereto. Aspects of the invention apply to individual sensors or individual sensor/reaction chamber combinations of various scale and form factors.

Also, some of the embodiments describe aspects of the invention used in combination. As can be appreciated by those skilled in the art, certain aspects can be used independent of others.

The embodiments specify certain applications of the sensors and methods. As will also be understood by those skilled in the art, aspects of the invention can be used in other applications in analogous ways.

Aspects of certain embodiments include the following concepts:

1) A fabrication method to produce extremely small thermal mass-reaction chamber array placed in close proximity (e.g. 10 nm-1 mm) range to the quartz resonator array using micromachining techniques. The close proximity of the sensor to the reaction chamber allows for direct detection of temperature change of the reaction chamber in response to the biochemical reaction while the separation allows for decoupling of the mass loading effect.

2) A new measurement method using near-resonance complex impedance tracking technique for enhancement of the transducer temperature sensitivity.

A more generalized description of these and other aspects of the invention will be discussed with respect to Exemplary Embodiments 1 and 2. Specific additional applications and embodiments will be discussed with respect to Exemplary Embodiments 3-6. It is to be understood, however, that these Exemplary Embodiments are illustrative and not comprehensive of all forms the invention can take.

A. Exemplary Embodiment 1 (General Method, Apparatus and System)

Two prominent aspects are as follows.

1. Fabrication Method

Fabrication of extremely small thermal mass quartz resonance-based calorimetric sensors allows the sensors to be placed in close proximity to the event to be measured. Similarly, fabrication of extremely small vessels or reaction chambers, and the ability to position the sensors near the event but neither touching the reaction chamber nor requiring placement of the analyte on the sensor, improve sensitivity of the measurements.

In the examples of Exemplary Embodiments 1-3, Y-cut quartz monolithic crystals are utilized. Micromachining techniques are well-known in the art (see, e.g., Marc J. Madou, "Fundamentals of MicroFabrication, CRC Press, Boca Raton, Fla., USA, 2002, ($2^{nd}$ Edition)).

Typical conventional quartz elements used in resonant sensors are on the order of 80 to 600 μm thick with resonant frequencies in the range of 3 to 20 MHz As described at Exemplary Embodiments 1-3, fabrication techniques can be used to create quartz wafers on the order of 1 to 10 μm thick with resonant frequencies in the range of 150 to 1000 MHz Moreover, the fabrication techniques can produce multi-sensor arrays of the size and configuration to be beneficially applied in a wide variety of ways. One example is high pixel density, calorimetric (bio)chemical sensor arrays.

Details regarding the fabrication and assembly of such systems are set forth in the corresponding descriptions of Exemplary Embodiments 1-6 below, including diagrammatic illustrations of fabrication processes and final products for an exemplary thin, thermally insulated, silicon co-integrated small form factor quartz resonator. As indicated, this process can be implemented with conventional micro- and nano-scale fabrication techniques to produce multi-sensor arrays. Specifics regarding production of an extremely thin quartz wafer are set forth. Likewise, the descriptions show how fabrication produces a thermally isolated sensor. They also demonstrate how placement (e.g. distance from) the quartz wafer sensor element relative to the event being measured can be controlled.

As indicated in the Exemplary Embodiments, these methods according to the present embodiment can produce sensors with quartz elements on the order of 1 to 10 μm thick with resonant frequencies in the range of 150 to 1000 MHz They can facilitate positioning of the sensor elements within 10 nm to 1 mm from the analyte and/or a reaction chamber to maximize heat transfer through radiative transfer. This provides the potential benefits described in the Exemplary Embodiments.

2. New Measurement Method

Following are details regarding an apparatus, method, and system of improving sensitivity of crystal resonators as calorimetric sensors. The state of the art implementation of such sensors is to track change in resonator frequency, and utilize a calibration of resonance characteristic changes as a function of temperature variations to derive temperature values from use of the resonator as a temperature sensor.

This Exemplary Embodiment 1 details a different paradigm. Instead of monitoring frequency of the resonator, and estimating temperature as a function of the measured frequency, at least one of the complex components of impedance or admittance of the resonator is monitored relative to a fixed reference frequency. The complex component is used to estimate temperature as it is a function of temperature.

It has been found that sensitivity can be greatly improved for the sensor; from a few orders of magnitude or higher. This amplification factor is illustrated below.

3. Combinations

As can be appreciated by those skilled in the art, the fabrication methods and new measurement methods can be used in combination for beneficial effects.

Additional details about the fabrication and measurement methods follow.

Fabrication Method and Detection Enhancement Strategy for Ultra-Sensitive Temperature Detection using Resonant Devices.

This describes a new method to improve the thermal sensitivity of resonant circuits using an off-resonance measurement technique according to the present invention. This detection scheme, associated to innovative fabrication technology to obtain thermally sensitive resonant circuits, can be used inter alia on applications where extremely high temperature sensitivity is desired, particularly for infra-red image and biomedical sensing applications where the monitoring process consists of detection of small temperature changes.

It is well known and documented that certain crystal cuts can provide high temperature dependency on the resonant frequency. Some crystal cuts, like the Y-cut quartz, provide variations in the resonant frequency in the order of 90 ppm/K. However, a primary limitation of using crystal resonators as sensitive temperature sensors in biomedical applications arises from the fact that direct placement of analyte on resonator surfaces confound temperature related frequency shift with simultaneous mass loading effects. Improved detection strategies for ultra-high temperature sensitivity include the following aspects:

1) A fabrication method to produce extremely small thermal mass-reaction chamber array placed in close proximity (10 nm-1 mm) range to the quartz resonator array using micromachining techniques. The close proximity of the sensor to the reaction chamber allows for direct detection of temperature change of the reaction chamber in response to the biochemical reaction while the separation allows for decoupling of the mass loading effect.

2) A new measurement method using off-resonance complex impedance tracking technique for enhancement of the transducer temperature sensitivity.

Fabrication Method of Planar, Thermally Thin, High Frequency Quartz Crystal Resonator.

Quartz crystals are largely used to design electrical oscillators thanks to their high quality, enabling the design and realization of low power consumption, high frequency and high-stability time keeping references. Special crystal cuts like the AT-cut are used in applications where temperature stability is necessary (e.g. timing applications or in quartz crystal microbalance sensors). Y-cut crystals on the other hand have high temperature coefficient that enables their use in temperature sensing applications.

Crystal resonators have their resonant frequency defined by the mechanical properties of the material (namely the stiffness and density) and the characteristic geometric dimension of the resonator. For example, a thickness-shear mode quartz resonator has a resonant frequency given by:

$$f_0 = \frac{1}{2t}\sqrt{\frac{\mu}{\rho}} \quad (1)$$

where t is the thickness of the resonator, μ is elastic modulus (2.95×10 Pa for quartz) and ρ the density of the resonator (2.65×10³ kg/m³ for quartz). Typical commercial resonators have thickness in the range of 80 to 600 μm with resonant frequencies in the range of 3 to 20 MHz.

For gravimetric and viscoelastic sensing applications, the sensitivity increases with higher value of the resonant frequency $f_0$, meaning that one should minimize the thickness t of the resonator in order to have maximum transducer output or better signal to noise ratio. For some sensing applications, especially for biochemical detection systems, small form factor devices are necessary in order to have a mass and response time that is comparable to the characteristic ones in the phenomena under study. Small form factor devices have also advantages in terms of system integration by offering the possibility of integrating large arrays in a small chip area.

For applications involving thermal sensing, it is also desirable to have thermally sensitive devices with a small thermal mass in order to decrease the response time. The exceptionally high temperature coefficient of Y-cut quartz makes it a good candidate for miniaturization and definition of low noise and low-response time systems, like infrared image sensor arrays. For image sensors, low noise also translates into the need of producing thermally insulated devices.

A new fabrication method capable of addressing most of the needs to obtain microscale arrays of electrically and thermally thin resonators co-integrated with silicon wafer meets this need.

Figure 1A:
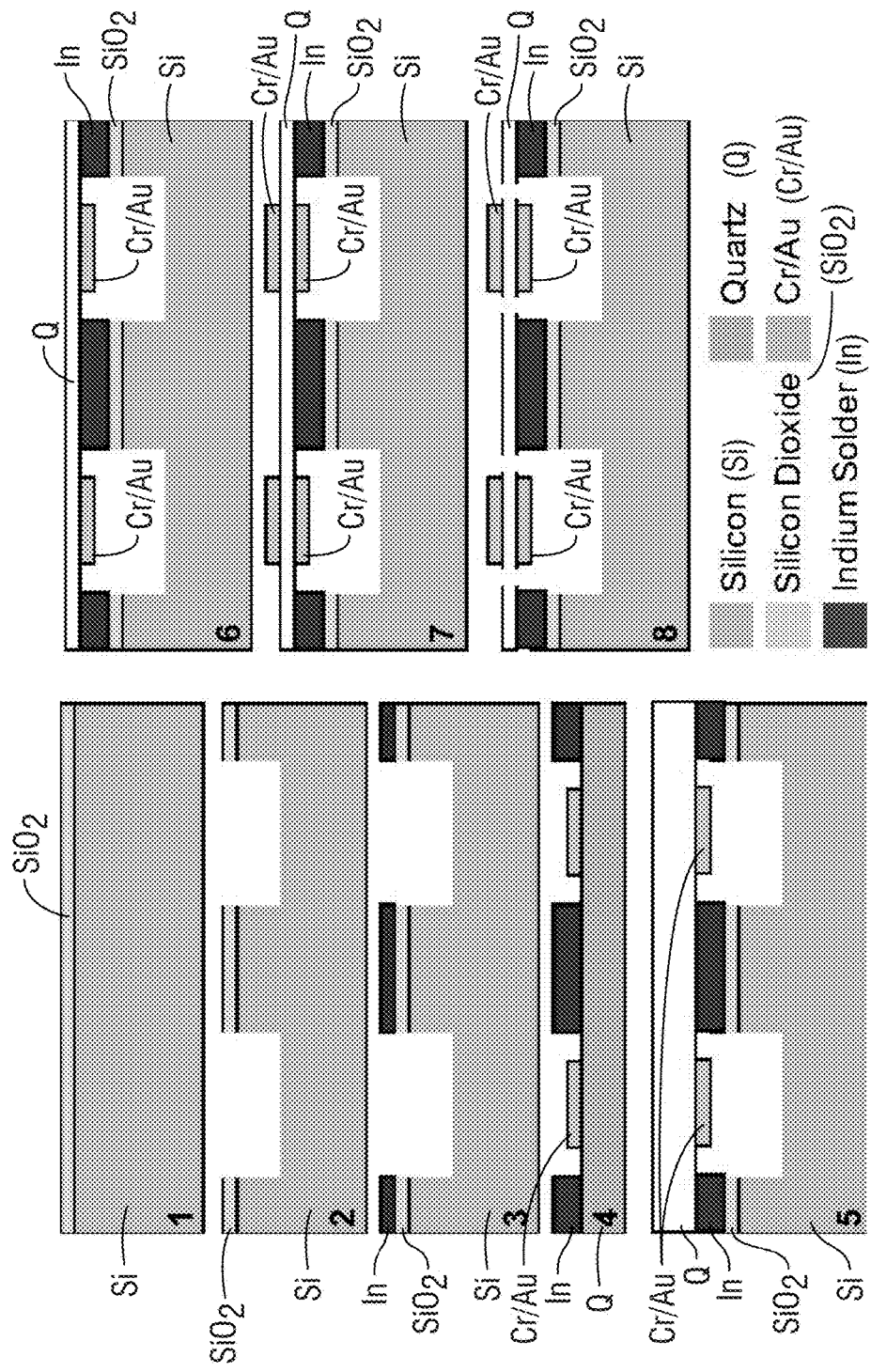
FIG. 1A is a diagrammatic view of a fabrication method of thin, thermally insulated, silicon co-integrated small form factor quartz resonators according to one exemplary embodiment of the present invention.

One possible fabrication process flow is shown in FIG. 1A, and fulfills the following:

a) Ability to produce very thin quartz resonators (thickness in the 1 to 10 μm range, giving frequencies in the range of 150 to 1000 MHz, much more than the current commercially available devices), b) Use of planar microelectronic lithographic definition steps capable of providing high definition and therefore very small form factors suitable for high frequency operation and co-integration with silicon circuits, c) Fabrication of free standing, thermally insulated, thin structures with good thermal contact to the semiconductor substrate, enabling their use on infra-red image rating (30 Hz) and low noise applications (a few mK).

Sensitivity Improvement by Tracking the Near-Resonance Complex Impedance Benefits of the present improved method can be better understood by comparison to one conventional present method of temperature measurement.

Figure 1B:
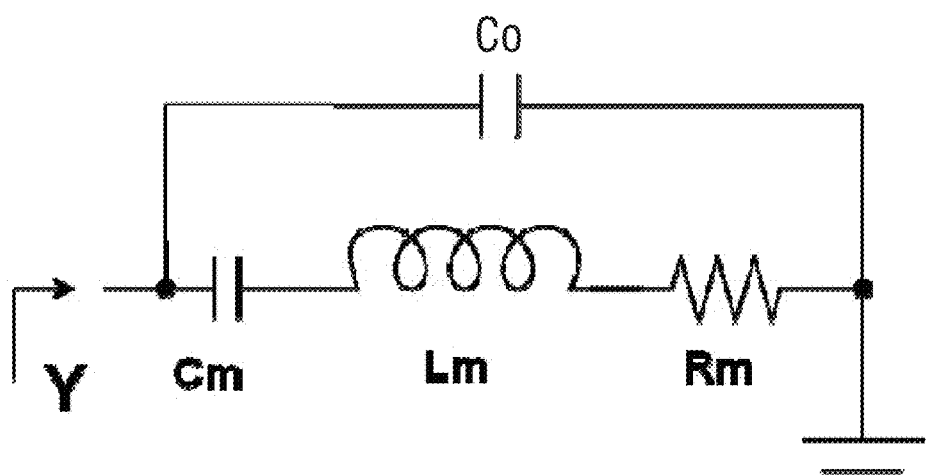
FIG. 1B is a schematic circuit diagram illustrating an equivalent RLC circuit model for an electrical resonator.

Crystal resonators at resonance can be represented using the Butterworth-Van Dyke model having an equivalent LCR circuit shown in FIG. 1B, where $C_m$ is the motional capacitance, $L_m$ the motional inductance, $R_m$ the motional resistance and $C_0$ the parallel intrinsic capacitance.

Such a device presents a complex frequency dependent impedance Z (or admittance Y) defined as:

$$Z = Y^{-1}\left(j\omega C_0 + \frac{1}{R_M + j\omega L_M + \frac{1}{j\omega C_M}}\right)^{-1} \quad (2)$$

Figure 1C:
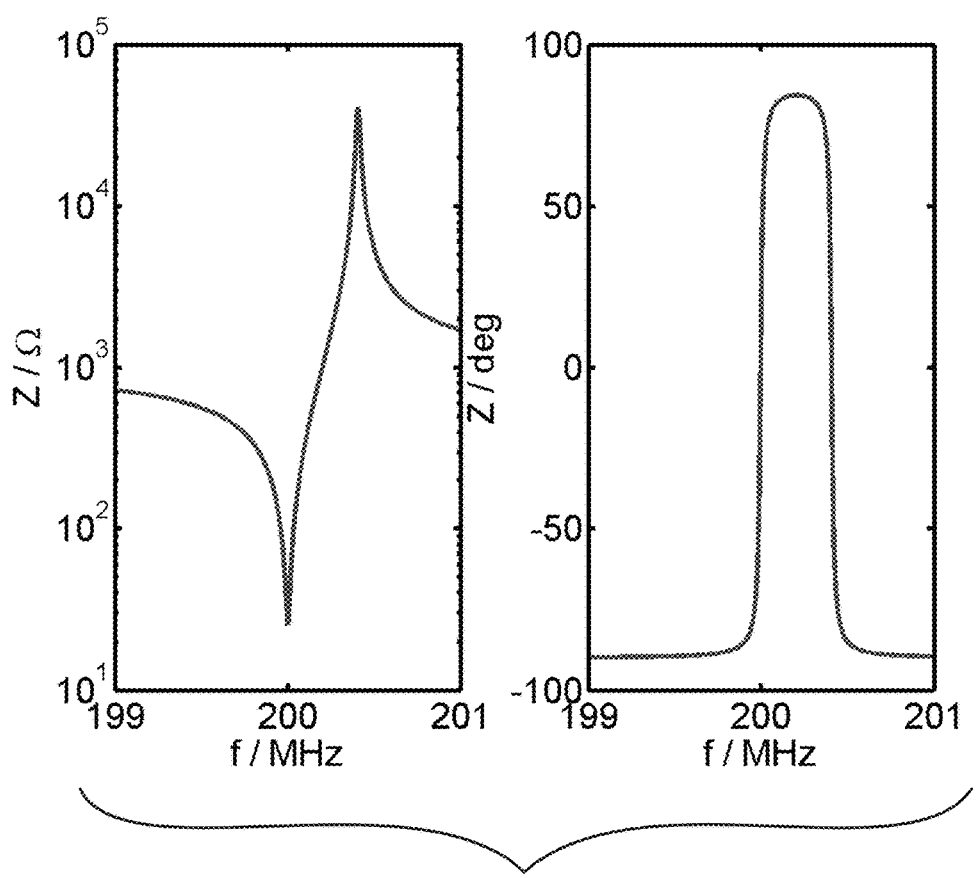
FIG. 1C is an example of complex impedance characteristic of an electric resonator (modulus (left side) and phase (right side)).

The behavior of the modulus and phase of the impedance as function of the frequency shows two distinct characteristic resonance peaks like the ones shown in FIG. 1C.

A resonator circuit is usually designed to operate at the minimum impedance point of FIG. 1C, which is defined as the series resonance peak occurring at a frequency given by:

$$f_s = \frac{1}{2\pi\sqrt{L_M C_M}} \quad (3)$$

Figure 1D:
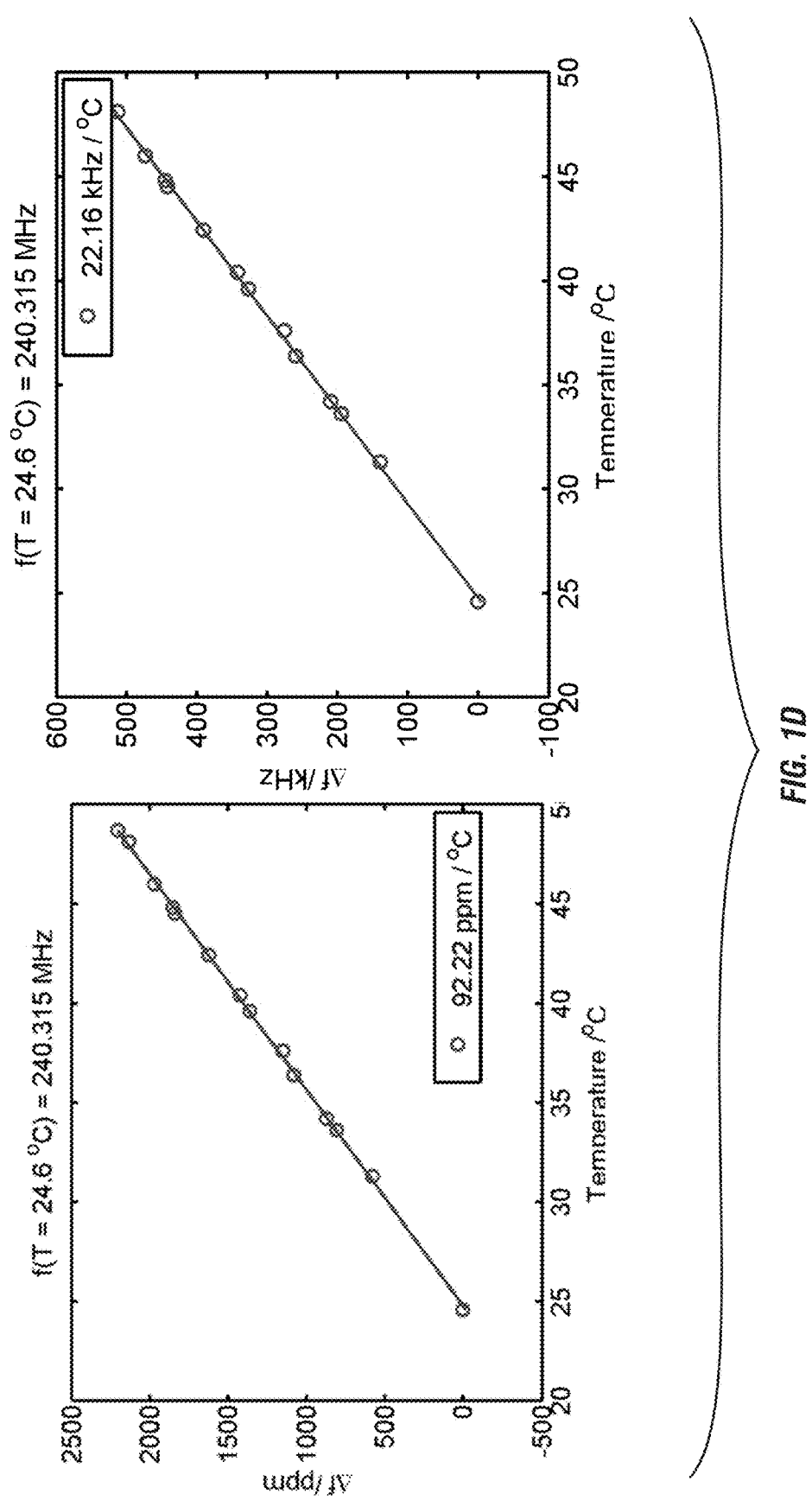
FIG. 1D is graphs illustrating frequency shift (position of $f_s$ peak) as a function of temperature for a Y-cut quartz crystal resonator.
Figure 1E:
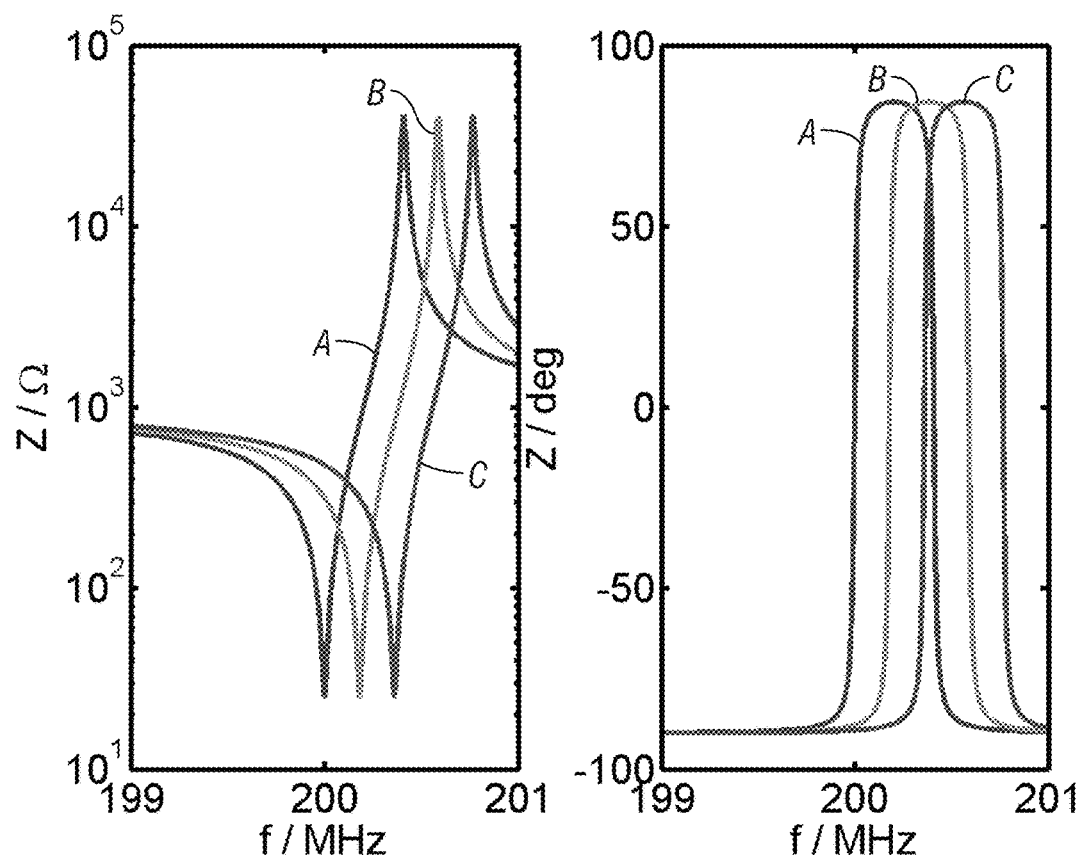
FIG. 1E is graphs showing resonance frequency change as a function of temperature for a sensor of the type of FIG. 1A.

Resonators made of high temperature coefficient material will have shifts on the resonance peaks as function of the temperature. High sensitivity Y-cut quartz crystal has a sensitivity of +90 ppm/K (relative frequency shift of the $f_s$ position measured as function of the temperature), like the results illustrated in FIG. 1D.

Figure 1F:
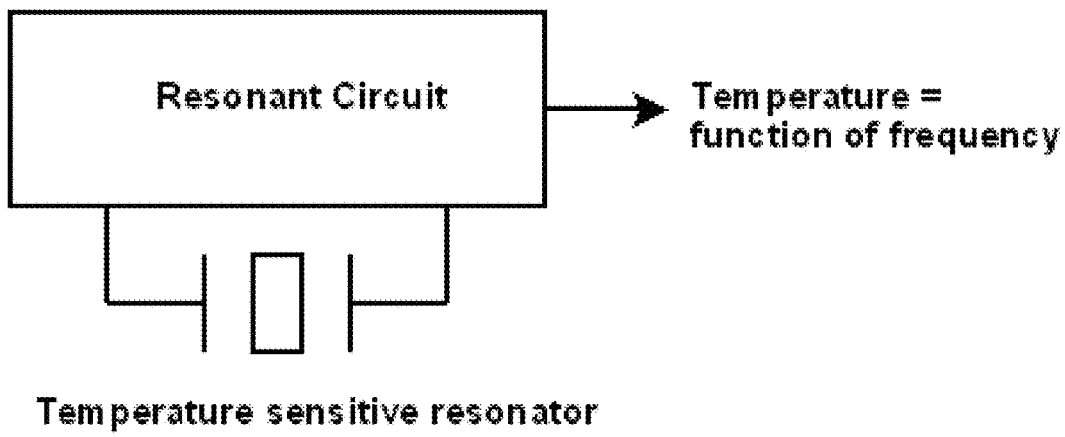
FIG. 1F is a diagrammatic depiction of a conventional resonator-based temperature detection scheme.

FIG. 1F shows schematically how the resonance characteristics change as a function of temperature variations of 0 (line A), +10 (line B) and +20 (line C) ° C. and a frequency temperature coefficient of +90.0 ppm/K.

Standard temperature detection method uses resonant frequency tracking that will detect the frequency shift of one of the resonant peaks (usually but not necessarily the series resonance) as function of the temperature. This is attained by designing a resonator circuit that has the output frequency defined by the temperature dependent resonator characteristics and as illustrated schematically in FIG. 1F.

Figure 1G:
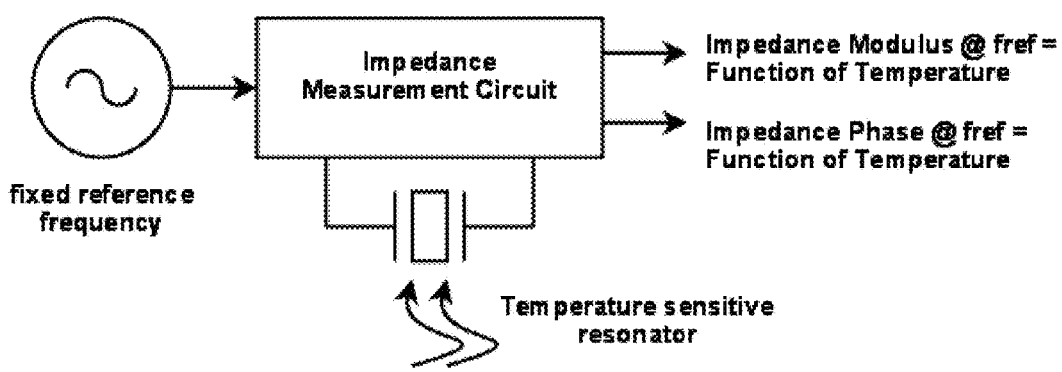
FIG. 1G is a diagrammatic illustration of a temperature detection scheme using complex impedance measurement at a given reference frequency according to one exemplary embodiment of the present invention.

A new detection method according to the present invention is now discussed. Instead of tracking the frequency of an oscillator, this new method tracks one of the components of the complex impedance (modulus or phase) at a fixed given frequency (see FIG. 1G).

Figure 1H:
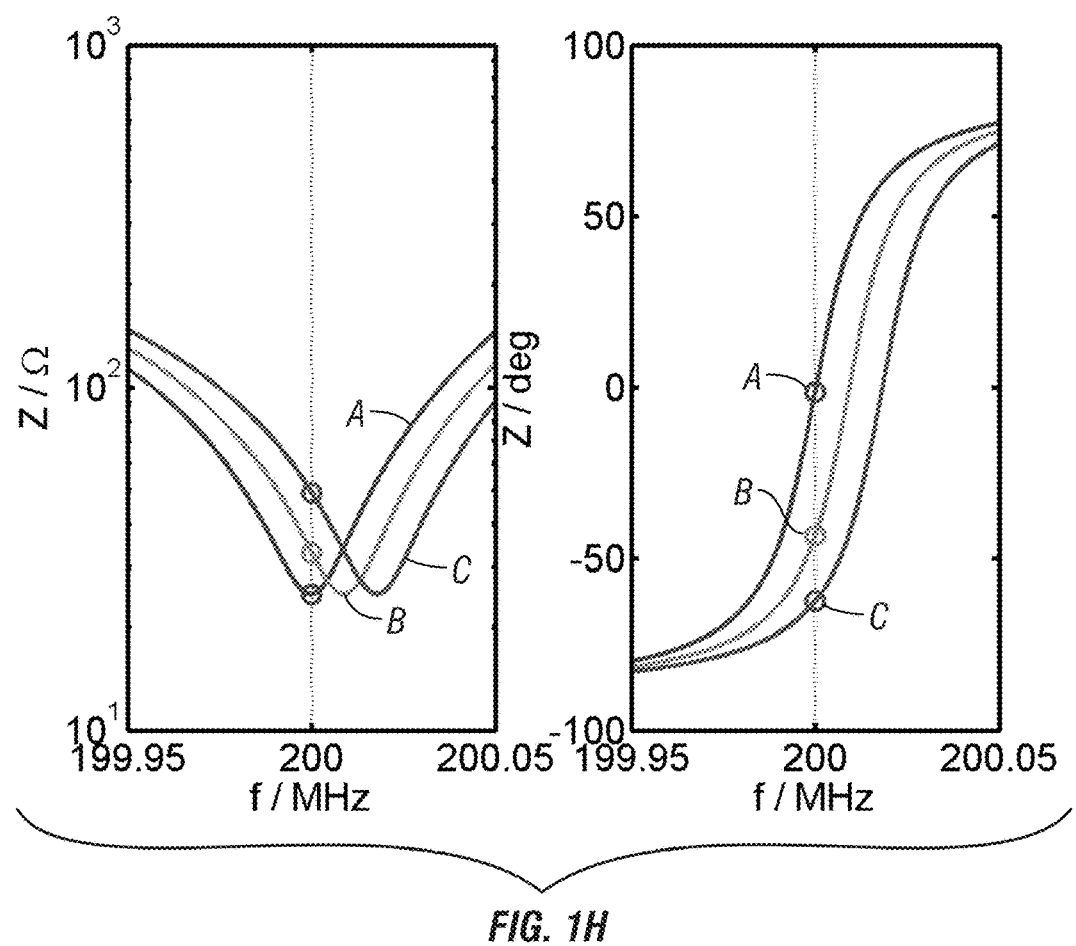
FIG. 1H is graphs illustrating the recording of an impedance modulus (left side) and phase (right) change at a given reference frequency for the exemplary embodiment of the type of FIG. 1A.

FIG. 1H schematically illustrates the changes in the readings for the impedance phase and modulus for small changes in the operating temperature (0.5° K steps—compare lines A, B, and C) of a Y-cut quartz resonator, measured at a fixed reference frequency of 200 MHz.

Figure 1I:
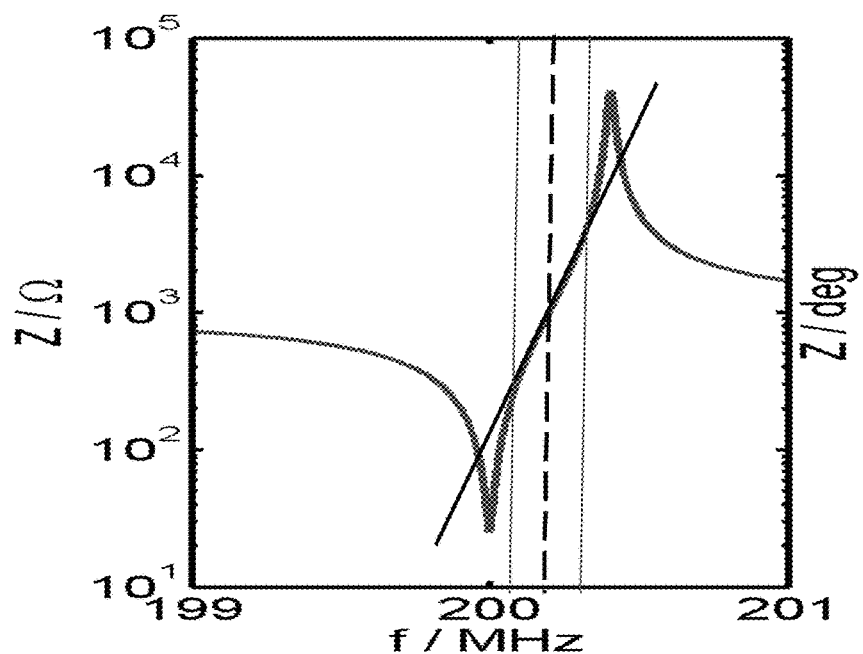
FIG. 1I is a schematic illustration of a measurement technique according to the detection scheme according to the exemplary embodiment of FIG. 1G.

The resulting sensitivity of the proposed measurement technique can be a few orders of magnitude larger than the traditional frequency tracking method. FIG. 1I schematically illustrates the method. For a device being monitored at a frequency (shown as dashed line), the impedance will vary along the straight line shown for small excursions of temperature. So long as the expected temperature variation is within this range, the following equation can be written for the temperature sensitivity of the resonator circuit:

$$\frac{df}{dT} = \frac{df}{dZ} \cdot \frac{dZ}{dT} = AmplificationFactor \cdot \frac{dZ}{dT} \quad (4)$$

The amplification factor is the slope of the frequency-impedance (modulus) as shown in FIG. 1I. FIG. 1I is a schematic illustration of the measurement technique proposed. The inverse of the slope of the impedance-frequency curve results in an amplification factor which can range from 10-10000 times depending upon the Q-factor of the resonator. The sharper the slope the higher the sensitivity.

Figure 1J:
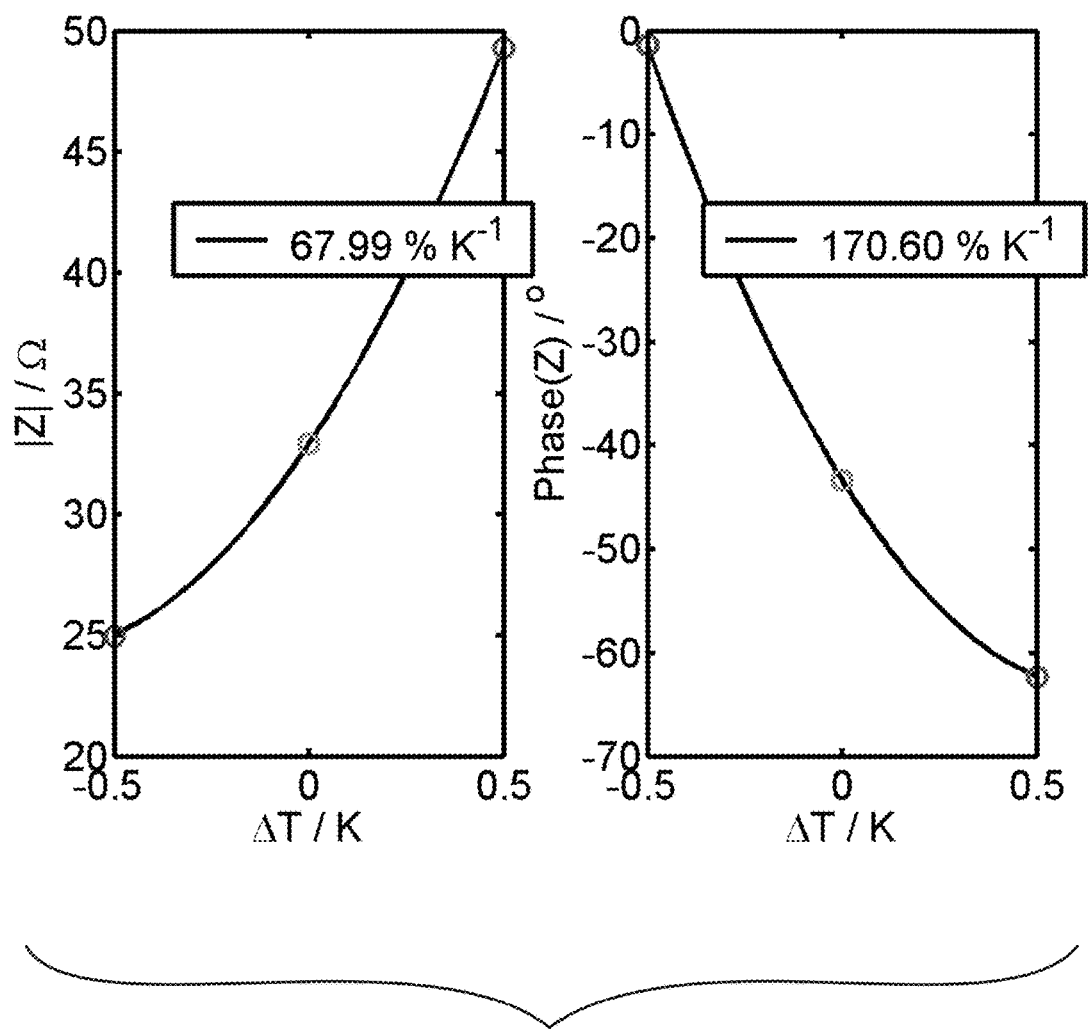
FIG. 1J is plots of variation of impedance modulus (left) and phase (right) as a function of temperature for the exemplary embodiment of the type of FIG. 1G.

This is practically illustrated in FIG. 1J. The average sensitivity in the amplitude measurement is $6.8\times10^{-2}$ $K^{-1}$, about 800 times larger than the $90\times10^{-6}$ $K^{-1}$ temperature coefficient of the used device. The average sensitivity in the phase measurement is 1.7 $K^{-1}$, about 19,000 times larger than the temperature coefficient of the used device.

Therefore, the aspects of the present invention include, but are not limited to:

1. Use of miniaturized quartz resonators for the detection of heat of reaction, specific heat changes, and/or any calorimetric measurement using such devices whereby the coupling of the heat is through radiative transfer of energy.
2. Maximization of the radiative energy transfer from the analyte to the sensor by placing the sample in close proximity to the quartz sensor. Typically a distance range from 10 nm-10 mm range is considered.
3. Aligned fabrication of reaction chambers and quartz resonator arrays for direct temperature sensing from corresponding individual pixels.
4. Radiative energy coupling excludes the confounding of the sensor signal due to mass loading effects on the sensor when analyte is directly placed on the resonator surface.
5. Amplification of the signal by measuring the impedance, phase, admittance, phase, Re|Impedance|, Im|Impedance|, Re|Admittance|, and/or Im|Admittance| at a fixed frequency set around the resonance frequency.
6. For small temperature variations, the signal amplification which is given as the inverse of the slope of the measurand (listed in sub-paragraph 5 above)-frequency curve is used to further improve the signal.
7. Measurement electronics whereby the typical oscillator circuit can be replaced by vector impedance/admittance measurement circuits and conversion of frequency related effects into impedance/admittance domain.
8. Application of the above invention (temperature sensing using radiative coupling using crystal quartz resonators) for such things as, but not limited to: biochemical detection, biological application, cell culturing and monitoring, clinical diagnostic applications, chemical sensing, homeland security applications, scientific application, and any other temperature based sensing application.
9. The resonator is made from any high quality factor crystal materials such as lithium niobate, lithium tantalate, quartz, aluminum nitride, zinc oxide, langasite, barium titanate or any other single crystal piezoelectric material.
10. Whereby the micro machined sample reactor is made using micromachining techniques for appropriate alignment of the chamber and resonator as well as controlled placement and distance control between the two.
11. Whereby such resonators are fabricated as 2D-arrays integrated either with individual corresponding reaction chamber each, or a single reaction chamber for all resonators in the array, or any other reasonable combinations.

12. Any methods of assembly of such including solder bonding, etching, nanoscale self-assembly techniques, micromachining techniques are used for the fabrication of the device.
13. Integration of the sensor structure with CMOS based integrated circuits for the fabrication of complete integrated device.

The foregoing describes methods and apparatus for ultrasensitive temperature detection using resonant devices. Importantly, one aspect changes from the conventional frequency measurement method to a different method for distinguishing small temperature changes. Another aspect relates to specific placement of the sensor relative to the event being measured.

B. Exemplary Embodiment 2 (Quartz Resonator Array for Calorimetric (Bio)Chemical Sensing Applications)

1. Overview

Low cost, miniature biosensors capable of analyzing small quantities of samples that are easy to use, have fast response times, and good operational stability are needed in many biochemical and clinical diagnostic applications[1-3]. calorimetry is a very powerful and effective investigative tool for analyzing biochemical reactions[4-6]. Unlike most other biochemical sensors, those based on thermal transducers can be mounted in a protected way that prevents fouling of the base transducer and thereby minimizing the consequent drift in its response. This endows thermal biosensors with unmatched operational stability for continuous monitoring, restricted only by the stability of the biocatalyst layer. The ability to follow the progress of a biochemical reaction continuously as a function of time or reactant concentration has many research and clinical applications with far reaching consequences. However, as in most biosensing techniques, calorimetric bioanalysis has been mostly hampered by the high cost, slow response times and cumbersome nature of the equipment.

Described herein is a versatile, high pixel density, calorimetric (bio)chemical sensor array from temperature sensitive micromachined monolithic quartz crystal resonators. High sensitivity calorimetric measurements will be made with molecular specificity at each pixel imparted through the use of self-assembled monolayer and ink-jet printing methodologies (such as known by those skilled in the art). The device integrated with microfluidic channels and reaction chambers will also allow for the simultaneous measurements using fluorescence spectroscopy for independent confirmation of the (bio)chemical reactions using labeled molecules. Historically, gravimetric (mass) measurement mode has been the primary focus of quartz resonator research for (bio)chemical sensing but as it turns out quartz resonators can be used as very sensitive temperature sensors as well. However, use of temperature sensitive cut of quartz resonators in the conventional approach confounds mass loading effects with calorimetric effects and therefore makes interpretation of the results difficult. This embodiment is a novel configuration of the sensor array in which the reaction chamber is physically separated and located in close proximity to a micromachined quartz resonator. The coupling of heat from the reaction chamber to the quartz resonator will be achieved via radiation and conduction through ambient gas. The close proximity of a couple of microns and the extremely high absorption coefficient of quartz in the 8-12 mm wavelength range renders this system into a very sensitive calorimeter design. The non-contact measurement results in no mass loading effects on the quartz resonator and therefore will provide clear calorimetric data. The device will be fabricated using silicon and quartz micromachining techniques and will be operated in a differential mode with a reference sensor to track and compensate for changes ambient.

The sensor platform in array format is expected to find a wide variety of applications including but not limited to enzyme catalyzed biomolecular sensors, immunosensors, and DNA hybridization detection. Biological reactions are more or less always exothermic in nature and therefore lend themselves to calorimetric analysis[7,8]. When an exothermic biological reaction is performed on a freestanding, thermally isolated, micromachined structure, the small thermal mass and the good thermal isolation of the structure causes the temperature of the freestanding membrane to rise. This rise in temperature can be very accurately measured in real time using the quartz crystal resonator array integrated located right under the freestanding micromechanical structure. Freestanding micromachined structures of small thermal mass are very sensitive to small changes in heat and are thus capable of analyzing very small quantities of reactants and products[9,10]. They also have fast response times required for real-time study of reaction kinetics.

Since, calorimetric measurements by themselves are not reaction specific, this technique is applicable to a wide range of materials. Specificity to identify or perform a selective assay can be achieved by coating the micromachined calorimeter with specific catalysts such as enzymes, antibodies or even single stranded oligonucleotides for DNA sequence analysis'. When the analyte is exposed to such immobilized enzymes or probe DNA strands on the freestanding reaction chamber, the biochemical reaction begins and its evolution in terms of total amount of heat generated and kinetics is proportional to the concentration of the reactants as well as the rate constants of the reaction[11]. In addition, if planar heater structures are integrated onto the freestanding reaction chamber, the device can be used for performing differential scanning calorimetric studies[12]. The possible list of biological analytes of interest is almost limitless. They can range at least from simple inorganic ions such as nitrates, through simple molecules such as carbon monoxide, methane, ketones, and ethanol, to complex biomolecules such as DNA strands. Main applications[13] of such a sensor can be broadly categorized under (i) health care, (ii) monitoring and control of industrial processes, and (iii) environmental monitoring, but are not limited to such.

Recently, a new form of calorimetric detection for use in gaseous and liquid ambient for (bio)chemical sensing based upon the out-of-plane bending of micromachined bimetallic cantilevers was proposed and demonstrated by Gimzewski et al at IBM, Zurich[14-18]. By using a simple model, the ultimate sensitivity of the system was estimated to be of the order of 10 pW with a minimum detectable energy of ~20 femtojoules[15]. Nakagawa et al., used this technique to observe rotator phase change in n-alkanes with a heat sensitivity of 500 pJ for a sample mass of 7 pg and a time resolution of 0.5 ms[19]. However, these cantilever based systems are difficult to functionalize as arrays and operation in liquid environment dramatically degrades their performance[20]. Although several groups have demonstrated excellent performance in laboratory conditions, these device are still beset with challenges relating to robustness, ease of use, and repeatability and reliability for practical (bio)chemical and clinical diagnostic applications.

The present embodiment exploits a state-of-the-art quartz micromachining process for fabricating miniaturized, high Q-factor quartz resonators in high density pixel arrays. Important aspects of the work include; (i) demonstration of the first 166 MHz QCM arrays capable of ultra-high temperature sensitivity (up to $10^{-5}$° C.) as calorimetric biosensors, (ii) novel sensor configuration for efficient radiative coupling of heat of reaction to a QCM array without the associated gravimetric loading on the pixel, and (iii) capability of simultaneous optical measurements using fluorescence measurements. These modes of operation can be used with a wide variety of molecules. Furthermore, high specificity can be achieved by surface functionalization, e.g., by immobilizing specific catalysts such as enzymes and antibodies which are in turn selectively deposited on a variety of self assembled monolayers. The resonance and damping characteristics will be continuously monitored using an impedance analyzer which will be multiplexed for array level measurements. The ultimate vision is to create a handheld or desktop multianalyte sensor system as shown in FIG. 2A in which the quartz resonator arrays with the integrated microfluidic system can be dropped in as disposable, easy to swap cartridges. The proposed instrument allows for fundamental real-time investigations into biochemical processes and phenomena relating to the growth of self assembled monolayers, protein conformations and reaction thermodynamics. This is a unique method of fabricating and integrating reaction chambers into a QCM device for biochemical applications. Thus calorimetric (bio)chemical studies using QCMs result.

2. Proposed Device

FIG. 2B shows a schematic of the proposed micromachined quartz crystal resonator array. On a 300 μm thick silicon substrate, 2 μm low stress LPCVD silicon nitride (0.3 μm)/silicon dioxide (1.4 μm)/silicon nitride (0.3 μm) layer will be deposited. On this layer nickel spacer posts (2-3 μm) with indium (1-2 μm) on top will be electroplated. Aligned to these posts, the silicon substrate will be patterned from the backside and etched through the entire silicon thickness using Bosch Si etch process to create the $Si_3N_4/SiO_2/Si_3N_4$ membrane. A 100 μm thick polished Y-cut quartz will be patterned with the bottom-side electrode pattern and coated with 200 nm of gold on 20 nm of chromium. This wafer will be aligned to the Ni/In posts pattern using a bond aligner and the wafer stack will be solder bonded. The bonded wafer stack will next be etched to thin the quartz from 100 μm to 10 μm. A surface smoothness of better than 5 nm after the >90 μm deep etch should preferably be maintained. This will be followed by the patterning of the top side Cr/Au electrodes for individual resonator pixels. Each resonator will be individually addressed through the topside electrodes which will be extended to the rim of the sensor array chip. The bottom electrode (facing the silicon nitride membrane) will be common to all the pixels of the array. In order to effectively confine the acoustic energy in each pixel, the area of the electrodes will have to be carefully optimized (typically ~50% of the pixel area)[22]. Finally a last lithography step will be performed using thick benzocyclobutene (BCB) resist and the remaining 10 μm thick quartz will be etched in the exposed areas only to create the isolation legs and expose the bottom Ni/In bondpad regions contact to the bottom electrodes. Application of a high frequency (RF) voltage across the top and bottom electrodes will cause each of the pixels to resonate in a shear bulk mode. The resonance frequency is determined by the thickness of the pixel. For the proposed 10 μm thick pixels, the fundamental resonance frequency is expected to be ~166 MHz. After the fabrication, the chip will be mounted upside down with the silicon nitride membrane facing up in a dual-in line package in which a hole will be machined. Areas of the membrane directly above individual quartz pixels will be functionalized using self assembled monolayers and other (bio)chemical based immobilization techniques [FIG. 2B at (b)]. Patterning techniques such as selective electrochemical deposition and microjet spraying techniques will be employed for the immobilization of the individual pixels areas. Technical aspects relating to each of these will be discussed in greater detail in the proposed work section.

3. Technical Feasibility Considerations for the Proposed Work 3.1 Quartz Crystal Resonator Arrays for calorimetric Measurements Thermal sensors based on the measurement of the heat of reaction (enthalpy) and the thermal properties of biological molecules suspended in solutions can be the basis of versatile thermometric biosensors[1-6,23-26]. The high thermal sensitivity also can be utilized for simple gas sensing where heats of adsorption characteristics can be used as an additional marker response for a specific molecule in a mixture, (e.g., neutral vs acidic molecules on basic functionalized surfaces). Bio-specificity for a selective assay can be achieved by coating the pixels with specific catalysts such as enzymes, and antibodies[7]. In this work, we propose to exploit the high temperature sensitivity of the fundamental resonance modes of Y-cut quartz crystal for realizing highly sensitive biosensor arrays. Although miniaturized (bio) chemical sensors are more sensitive than their macroscale counterparts, a reduction of the typical test sample volumes also accompanies their use. As the test sample volumes are reduced, achieving high molar sensitivities can only be possible if a sensing property with high phenomenological sensitivity is used. One alternative to this approach is to integrate a concentration step whereby the number of molecules of interest in the small sample volume are selectively increased using processes such as polymerase chain reaction (PCR) for DNA strands or by chromatographic and electrophoretic techniques for other molecules. This however is achieved at the cost of greater system complexity. Appreciation of this constraint along with the proposed micromachined quartz resonators has created an opportunity to extend the sensitivity of thermal biosensors to realize high sensitivity on-chip (bio)chemical/clinical diagnostic assays.

It is well known that shear-mode quartz resonators made from certain crystal cuts can be used as very sensitive temperature sensors with unprecedented resolutions of up to $10^{-6}$° C.[27] Table 1 below lists the temperature sensitivity of the resonance frequency with temperature for different quartz crystal cuts[28]. This phenomenological sensitivity of quartz crystals represents 2-3 orders of magnitude improvement in temperature sensitivity in comparison to other similar temperature dependent phenomena such as the Seebeck effect on which a thermopile device is based. The improved temperature sensitivity along with the low noise performance that can be achieved in quartz crystal resonators is the principle motivation behind the proposed calorimetric (bio)chemical sensors.

TABLE 1

List of the temperature dependence of the resonance frequency of different cuts of Quartz[27]

| Quartz Crystal Cut | $(\Delta f/f_0)/\Delta T$ (ppm/C) |
|---|---|
| AC-Cut | 20 |
| LC-Cut | 35.4 |

TABLE 1-continued

List of the temperature dependence of the
resonance frequency of different cuts of Quartz[27]

| Quartz Crystal Cut | $(\Delta f/f_0)/\Delta T$ (ppm/C) |
|---|---|
| Y-Cut | 90 |
| SC-Cut (b-mode) | −25.5 |
| SC-Cut (dual mode) | 80-100 |
| NLSC-Cut | 14 |

3.2 Heat Sensitivity of Y-Cut Quartz Resonator

In the proposed device, the quartz thermal detector absorbs the heat radiated by the silicon nitride membrane due to the occurrence of (bio)chemical reactions. The resulting rise in temperature of the quartz pixel is transduced as an increase in the frequency of the quartz resonator. Since the phenomenological sensitivity of quartz is very high, the fundamental limitation in the temperature resolution of an object is expected to be set by the noise limit of the spontaneous temperature fluctuations of the detector element due to conductive coupling[29]. The noise equivalent temperature difference (NEDT) is frequently used to characterize the performance of a thermal radiation detector. The expression for NEDT of a thermal imaging system in this case is given by:

$$NE\Delta T|_{TF} = \frac{2T_d(4F^2+1)\sqrt{k_BBG}}{\eta A_d \tau_0 (\Delta P/\Delta T_t)_{\lambda_1-\lambda_2}} \quad (5)$$

where F is the f-number of the optics, Td is the detector temperature, B is the electrical bandwidth, h is the absorption coefficient of the pixel, G is the thermal conductance of the pixel in W/K, $\tau_0$ is the transmittance of the atmospheric path between the scene and system multiplied by the transmittance of the optics, and $(DP/DT_t)_{11-12}$ is a blackbody function. The value of $(DP/DT)_{11-12}$ for 300 K scene temperature in the 8-14 mm spectral interval is $2.62\times10^{-4}$ W/K[30]. In this calculation the background fluctuation noise limit has been ignored since the thermal conductance fluctuation is expected to set the limit of performance of the individual pixels. The response time t of all thermal detection mechanisms is given by $$\tau = H/G \quad (6)$$

where H is the pixel heat capacity. Attaining high thermal isolation, i.e., a low G value to achieve maximum sensitivity requires a low H value in order that the response-time meets the system performance requirement for real-time reaction monitoring capability. For example, if it is required that the response time of a pixel be 1 ms, if G is $10^{-6}$ W/K, then H must be $10^{-9}$ J/K. This requires very thin pixels.

3.3 Feasibility Considerations

Based on these considerations, the quartz sensor pixel as shown in FIG. 2B is proposed. The square pixel of quartz is suspended by two symmetric legs from the rim to which they also form an intimate thermal contact. Circular Cr/Au electrodes will be aligned and patterned on both sides of the quartz pixel to create a bulk shear wave resonator structure. By creating identical electrode patterns on both sides and appropriately dimensioning the electrode area with respect to the pixel area to trap the energy, the spurious modes of resonance can be virtually eliminated[31,32] (We have demonstrated this[33]). The resonance frequency $f_0$ of a bulk shear wave quartz resonator only depends upon the thickness xq of the pixel and is given by $$f_0 = \frac{\sqrt{\mu_q}}{2x_q\sqrt{\rho_q}} \quad (7)$$

where μq is the shear modulus of quartz ($2.95\times10^{10}$ N/m), and ρq is the density of quartz ($2.65\times10^3$ kg/m). For example, for 10 μm thick quartz, the resonance frequency will be 166 MHz.

The noise equivalent temperature difference of the quartz pixel in the 8-14 μm wavelength range for 10 μm thick and 500 mm square pixel can now be calculated assuming that the IR absorption coefficient of the pixel is ~85% and the transmission coefficient of atmosphere and optics is 90% (to minimize this loss we will locate the silicon nitride membrane as close as practical to the quartz resonator structure). The thermal conductivity of quartz is 0.07 W/cm-K, gold is 3.18 W/cm-K and the heat capacity of quartz is 2.08 J/cm³-K. The pixel temperature is assumed to be 290 K while, the silicon nitride membrane is assumed to be at an average temperature of 300 K. For the proposed dimensions, the thermal conductance of the two supporting legs can be calculated to be (thickness weighted average[35]) $2.2\times10^{-6}$ W/K.

For the proposed device, the pixel area is given by $A_d=(432\times10^{-4})\times(432\times10^{-4})=1.87\times10^{-3}$ cm², f-number of the optics is assumed to be 1. Under these assumptions, the noise equivalent temperature difference of the pixel is given by $NE\Delta\Delta T|_{TF}=0.043$ mK=4.3 mK. The electrical bandwidth of measurement has been taken to be 1 Hz. Using eq. (6) the time constant of the pixel can be calculated to be τ=565 ms where $H=2.08\times A_d\times10\times10^{-4}=3.882\times10^{-6}$ J/K has been used in the calculation. These calculations show that for the 500 μm pitch, the detector response time is fast enough for real-time biochemical reaction monitoring. For Y-cut quartz the temperature coefficient of frequency is 90 ppm, i.e. for a 166 MHz resonator, 1 K temperature change will result in a frequency shift of 14.94 kHz making it possible to resolve 6.7 mK for 0.1 Hz frequency resolution. Thus, this device will be thermal fluctuations and/or background fluctuations limited in overall performance.

3.4 Heat Production Considerations in Membrane Biochemical Reactor

Assuming the etched membrane in silicon is circular in geometry, the temperature profile of the silicon nitride reaction chamber can be modeled as a circular membrane (for a single pixel) of radius a, and of uniform thickness d. Neglecting radiation and convection heat losses and assuming uniform heat generation $\dot{Q}$ per unit time per unit area over the whole pixel area, the radial temperature profile of the silicon nitride membrane can be modeled by the two dimensional heat conduction equations. If the boundaries of the circular membrane are assumed to be clamped at room temperature, the solution of the heat conduction equation is given by[36], $$\Delta T(r)|_{Membrane} = \frac{\dot{Q}(a^2 - r^2)}{4\kappa_\parallel d} \quad (8)$$

where DT(r) is the temperature difference between the pixel membrane at radius r and the rim of the membrane and $k_{\parallel}$ is the planar thermal conductivity for the membrane material. The average temperature over the membrane from r=0 to r=a/2 can be given by $DT(r)|_{avg} = 11 \dot{Q}a^2/48\kappa_{\parallel}d$.

As an example, if we assume the heat generated on the surface of the membrane is due to an enzymatic reaction, the heat generated per unit time per unit area can be calculated using the expression $\dot{Q} = {_D}H \cdot M \cdot d_c/\tau$, where ${_D}H$ is the enthalpy of the reaction in J/mol, M is the molarity of the reactant in moles/liter, $d_c$ is the depth of the reaction chamber, and $\tau$ is the time, in seconds, required to refresh the entire volume of the reaction chamber which in turn depends on the flow rate used in the experiment. For the case of catalytic hydrolysis of urea molecules using urease, 1 M solution of urea will generate a total heat of $6.1 \times 10^7$ J/m$^3$ of heat when completely reacted. For the typical flow rates used in the enzymatic testing, $\tau=3$ s. Using the depth of the reaction chamber of 300 mm, the heat generated per unit area per second on the membrane can be estimated to be $6.1 \times 10^3$ W/m$^2$.

Using this value of $\dot{Q}$, and using a value of $\kappa_{\parallel}$ for the composite $Si_3N_4/SiO_2/Si_3N_4$ membrane of 5.46 Win$^{-1}$ K$^{-1}$ the average rise in the temperature, $\Delta T(r)|_{avg}$, of the 2 mm thick $Si_3N_4/SiO_2/Si_3N_4$ composite membrane of 0.5 mm diameter, is calculated to be ~32° C. for completely reacted 1 M urea solution. Assuming a temperature resolution of 10 mK using the quartz resonator, the expected sensitivity of the device is ~0.3 mM (22 femtomoles) for a sample volume of ~75 nl. Using a thermopile device in our earlier work we were able to achieve ~2 mM sensitivity for 15 nl sample volumes[37]. The proposed technique clearly represents at least three (3) orders of sensitivity improvement. The simplified model presented here does not consider conduction through gas trapped in the narrow gap, which will only increase the sensitivity further[38]. We will however consider the comprehensive thermal model and experimental evaluation during the development of these sensors.

4. Preliminary Results: Micromachined Quartz Crystal Resonators 4.1 Quartz Crystal Resonator Arrays Recently we have reported the design and performance of 66 MHz bulk acoustic wave quartz resonators and arrays for gravimetric biochemical sensing applications[39,40]. FIG. 2C shows a photograph of a fabricated 8-pixel sensor array. FIG. 2C shows a photograph of a fabricated 8-pixel sensor array.

TABLE 2

Summary of the typical resonance parameters of the micromachined resonator

| | |
|---|---|
| $C_0$ (Static Capacitance) | 4.577 pF |
| $C_m$ (Motional Capacitance) | 1.992 fF |
| $L_m$ (Motional Inductance) | 2.914 mH |
| $R_m$ (Motional Resistance) | 49 Ω |
| $f_s$ (Series Resonance) | 66062639 Hz |
| $f_p$ (Parallel Resonance) | 66270822 Hz |
| Q-Factor | 24685 |

Table 2 summarizes the typical resonator characteristics that have been obtained. So far we have been able to fabricate and test similar high Q-factor resonators with fundamental frequencies up to 90 MHz (18 mm thick resonators). We have several recent publications detailing these findings[39,40,42-44].

4.2 Y-Cut Quartz Resonators

Recently we have reported the fabrication and preliminary performance of a micromachined Y-cut quartz resonator based thermal infrared detector array. 1 mm diameter and 18 mm thick (90 MHz) inverted mesa configuration quartz resonator arrays with excellent resonance characteristics were fabricated. Temperature sensitivity of 7.2 kHz/K was experimentally measured. Infrared calibration tests on the resonator array even without the use of infrared absorbers gave a responsivity of 64.7 MHz/W and an NEP of 72 nW. In this first report on the performance of the Y-cut quartz resonator infrared thermal detector array, the response time measurements were found to be limited by the use of slow measurement time of the impedance scans and the undesired heating of the quartz substrate[45]. Most importantly, this initial work demonstrates the possibility of realizing thermal sensor arrays based on quartz resonators. FIG. 2E shows the simultaneous response of 3-pixels to chopped IR radiation from a blackbody source.

The goal of this proposal is to develop a Y-cut quartz crystal resonator array as an instrument for (bio)chemical sensing applications and for fundamental investigations into biomolecular processes. Arrays of quartz crystal sensors will be used for quantitative and qualitative calorimetric analysis of a large number of biomolecules. The ultimate vision is to create a handheld or desktop multianalyte sensors system in which the quartz resonator arrays with the integrated microfluidic system can be dropped in as easy swapping cartridges as shown in FIG. 2A.

A proposed fabrication process flow is as shown in FIG. 2F. The steps comprise:

Step 1: $Si_3N_4/SiO_2/Si_3N_4$ deposited Si wafer.

Step 2: 2 mm Indium is plated on top of 2-3 mm thick electro plated Nickel posts.

Step 3: Si wafer is etched from back side.

Step 4: 100 mm thick polished Y-cut quartz wafer is patterned with gold and plated with In solder.

Step 5: Quartz wafer is aligned and solder bonded to the Si substrate wafer.

Step 6: Quartz is thinned to 10 mm via polish etching in ICP RIE.

Step 7: Top gold electro is deposited and patterned.

Step 8: Quartz is patterned and etched to create the thermally isolated pixels as shown in FIG. 2B using plasma etching and opening up bottom contact.

See similar view of FIG. 1A. Of course variations of this process are possible. Other embodiments can use simple mechanical spacers to place the quartz resonator in proximity to the reaction chamber. For example, a quartz resonator mounted onto a metal or thermally conductive plate which can in turn be bolted or otherwise mounted onto a reaction chamber or fluidic system can be another effective embodiment of this concept.

Sensitivity Enhancement for Thermometric Measurements:

As discussed earlier, temperature sensitive quartz cut such as Y-cut will be used for this work. A differential sensor arrangement will be used for all calorimetric measurements where a reference pixel facing thick silicon substrate at ambient temperature will be used to compensate for all temperature drift effects. For realizing 10$^{-5}$° C. temperature resolution the drift of the pixels due to ambient temperature fluctuations will need to be carefully compensated.

SAM functionalization of Reaction Chamber: Methods similar to functionalization of gravimetric QCM sensors, can be used for surface functionalization techniques in this sensor. SAM formation is primarily done via thiol-Au surface chemistry. Gold films will be deposited in the reaction chambers for this step, if necessary, although it is not listed as one of the fabrication steps in FIG. 2F. The effects of Au cleanliness and roughness are critical and well understood. The deposited gold films in the reaction chamber are expected to be a bit rougher than for most SAMs on standard evaporated Au films (~3-5 nm vs ~1-2 nm rms roughness) but the main requirement of the SAMs for the sensing applications is the chemical nature of the top surface, which has been shown to be essentially unaffected by such changes in surface roughness. If necessary detailed verification of the SAMs directly on the pixels can be done using XPS, ToF-SIMs, electrochemical blocking and perhaps microspot ellipsometry, but for the most part it will be sufficient to do careful parallel preparations on large area samples with detailed characterization and then carry the procedures over directly to the fabricated device surfaces. Different types of surfaces can be prepared using this method, using mostly $X(CH_2)_{15}SH$ molecules, where $X=CH_3$, $CO_2H$, OH, $CO_2CH_3$, CN, $CONH_2$, oligo(ethyleneglycol) (useful for protein studies), etc.

An important step is the functionalization of specific SAMs at specific electrodes, especially required in array applications. One way to do this is by "hand" or individual microjet delivery of a micro volume of the thiol molecule solution to the reaction chamber facing the pixel of interest. It may be possible to directly verify the growth of SAMs layer from the exothermic reaction during the thiol-Au bond formation.

For immunosensing applications a variety of protein molecules such as avidin molecules can be adsorbed on 3,3'-Dithiobis(sulfosuccinimidylpropionate) DTSSP, Human Serum Albumin and BSA on methyl terminated SAMs. These surface immobilized molecules can then be reacted by the addition of fluorescently labeled biotin and antigen molecules. The heat signals from the binding reactions in real-time can be monitored and may be used to quantify the relationship between the concentration of the molecules and the observed signals. These calibrations will be used to determine the ultimate limits of this detection technique. This method of detection can be extended to a variety of sandwich assays for example where biotynilated protein molecules of interest are available. This application of the proposed sensor array specifically pertains to the application for a variety of clinical diagnostics and pharmaceutical drug testing applications.

In order to configure the proposed sensor system into a differential scanning calorimeter, a heater structure could be integrated onto the reaction chamber. This will be accomplished as part of the patterning of the front surface of the silicon chip [FIG. 2F, step (2) from the top] although it is not explicitly shown. Linearly ramping the heat through nearby pixels (one functionalized and one without functionalization) can be used for very accurate measurements of phase changes, molecular conformational changes, dissociations, etc in the biomolecules.

The proposed QCM array will be the first demonstration of a monolithic planar thermometric biosensor array integrated with microfluidic channels. The uniqueness of the device lies in being able to completely avoid mass loading effects while exploiting the temperature sensitivity of quartz bulk acoustic resonators. We believe that with expected sensitivity, this work will set new standards in microcalorimetric studies. The combination of the unprecedented sensitivity and the proposed microfabrication based manufacturing techniques, are likely to result in a very useful sensor system for fundamental scientific investigations into biological and chemical surface and interfacial phenomena and for biomedical applications.

The calorimetric mode of operation can be exploited to better understand the in-situ thermodynamics of (bio)chemical reactions under stimulation. The proposed device can be used for the study of reaction kinetics. It is expected that the thermal signals from specific (bio)chemical reactions will exhibit unique temporal characteristics, which can be used as the markers (or signatures) for the presence of such reactants. Specifically, it will be very exciting to study the thermodynamics of the hybridization process in DNA oligonucleotides and protein folding processes. Compared to electrochemical and capacitive techniques, the proposed QCM technique is a superior biosensing technology since it does not require direct electrical and physical contact of the biomolecules, cell cytoplasm or cell membrane. Further, neither electrochemical nor capacitive techniques can be easily extended for array level investigation in interacting cells.

Use of different surface functionalizations is expected to provide high selectivity and drastic reduction in false positives in clinical diagnostic applications. The proposed QCM array can be easily available as a handheld or desktop instrument with relatively inexpensive electronic interface to quantitatively measure the biological events occurring in interacting cells in network of cells. It will for the first time provide an in-vitro tool for culturing and observing biological events in response to various biological stimuli in real time.

REFERENCES FOR EXEMPLARY EMBODIMENT 2

1. Karube, K. Sode, and E. Tamiya, Journal of Biotechnology 15, 267-281 (1990).
2. H. C. Cantor, V. Padmanabhan, P. Favreau, and A. Midgley Jr, Endocrinology 137, 2782-2790 (1996).
3. M. Shichiri, M. Sakakida, K. Nishida, and S. Shimoda, Artificial Organs 22, 32-42 (1998).
4. K. Ramanathan, M. Khayyami, and B. Danielsson, in *Affinity Biosensors: Techniques and Protocols*; Vol. 7, edited by K. R. Rogers and A. Mulchandani (Humana Press, 1998), p. 19-29.
5. Y. Guan, P. M. Evans, and R. B. Kemp, Biotechnology and Bioengineering 58, 464-477 (2000).
6. B. Danielsson, J. Biotechnology 15, 187-200 (1990).
7. B. Eggins, *Biosensors: An Introduction* (Wiley Teubner, Chichester, 1996).
8. J. T. Edsall, *Biothermodynamics: The study of Biochemical Processes at Equilibrum* (John Wiley, Chichester, 1983).
9. I. Jelesarov, L. Leder, and H. R. Bosshard, Methods 9, 533-541 (1996).
10. J. Lerchner, A. Wolf, and G. Wolf, J. Therm. Anal. & calorimerty 5, 241-251 (1999).
11. A. L. Smith, S. Rose Mulligan, J. Tian, H. M. Shirazi, and J. Riggs, in *A Mass/Heat Flow Sensor Combining Shear Mode Resonators with Thermoelectrics: Principles and Applications,* 2003 (Institute of Electrical and Electronics Engineers Inc.), p. 1062-1065.
12. M. Y. Efremov, E. A. Olson, Z. Ming, F. Schiettekatte, Z. Zishu, and L. H. Allen, Review of Scientific Instruments 75, 179 (2004).
13. E. Kress-Rogers, *Handbook of Biosensors and Electronic Noses: Medicine, Food, and Environment* (CRC Press, Boca Raton, Fla., 1997).
14. J. K. Gimzewski, C. Gerber, E. Meyer, and R. R. Schlittler, Chemical Physics Letters 217, 589 (1994).

15. J. R. Barnes, R. J. Stephenson, C. N. Woodburn, S. J. O'Shea, M. E. Welland, T. Rayment, J. K. Gimzewski, and C. Gerber, Review of Scientific Instruments 65, 3793 (1994).
16. R. Berger, C. Gerber, J. K. Gimzewski, E. Meyer, and H. J. Guntherodt, Applied Physics Letters 69, 40 (1996).
17. R. Berger, C. Gerber, H. P. Lang, and J. K. Gimzewski, Microelectronic Engineering 35, 373 (1997).
18. R. Berger, H. P. Lang, C. Gerber, J. K. Gimzewski, J. H. Fabian, L. Scandella, E. Meyer, and H. J. Guntherodt, Chemical Physics Letters 294, 363 (1998).
19. Y. Nakagawa, R. Schafer, and H. J. Guntherodt, Applied Physics Letters 73, 2296 (1998).
20. S. Cherian and T. Thundat, Applied Physics Letters 80, 2219-2221 (2002).
21. A. Goyal, V. Hood, and S. Tadigadapa, Journal of Non-Crystalline Solids 352, 657 (2006).
22. F. Shen, K. H. Lee, P. Lu, and S. J. O'Shea, in *Energy trapping in mesa-shaped quartz crystal microbalance*, 2002, p. 1154-1159.
23. J. Lerchner, D. Caspary, and G. Wolf, Sensors and Actuators B 70, 57-66 (2000).
24. A. Koll, A. Schaufelbuhl, N. Schneeberger, U. Munch, O. Brand, H. Baltes, C. Menolfi, and Q. Huang, in MEMS'97 (1999), p. 547-551.
25. I. Wadso, in *Thermal and Energetic Studies of Cellular Systems*, edited by A. M. James (Wright, Bristol, 1987).
26. A. W. van Herwaarden, P. M. Sarro, J. W. Gardner, and P. Bataillard, Sensors and Actuators A: Physical 43, 24-30 (1994).
27. E. P. Eernisse, R. W. Ward, and R. B. Wiggins, IEEE Transactions on Ultrasonics Ferroelectrics and Frequency Control 35, 323-330 (1988).
28. J. R. Vig, R. L. Filler, and Y. Kim, Journal of Microelectromechanical Systems 5, 131-137 (1996).
29. A. Van-der-Ziel, Noise in Measurements (John Wiley, New York, 1976).
30. A. Rogalski, Progress in Quantum Electronics 27, 59 (2003).
31. W. Shockley, D. R. Curran, and D. J. Koneval, Journal of Acoustical Society of America 41, 981-993 (1967).
32. A. G. Lubowe and R. D. Mindlin, Journal of the Acoustical Society of America 34, 1911-1917 (1962).
33. A. Goyal, Thesis, The Pennsylvania State University, 2006.
34. D. S. Ballantine, R. M. White, S. J. Martin, A. J. Ricco, E. T. Zellers, G. C. Frye, and H. Wohltjen, *Acoustic Wave Sensors: Theory, Design, and Physico-Chemical Applications* (Academic Press, San Diego, 1997).
35. O. Paul, and H. Baltes, Journal of Micromechanics and Microengineering 3, 110-112 (1993).
36. H. S. Carslaw and J. C. Jaeger, *Conduction of Heat in Solids* (Oxford University Press, Oxford, 1959).
37. Y. Zhang and S. Tadigadapa, Biosensors & Amp; Bioelectronics 19, 1733 (2004).
38. T. Elbel, S. Poser, and H. Fischer, Sensors and Actuators A: Physical 42, 493-496 (1994).
39. P. Kao, A. Patwardhan, D. Allara, and S. Tadigadapa, Anal. Chem. (2008).
40. P. Kao, Doerner, S., Schneider, T., Allara, D., Hauptmann, P., Tadigadapa, S., Journal of Microelectromechanical Systems, 18(3) 522-530 (2009).
41. E. Y. Katz, Journal of Electroanalytical Chemistry 291, 257 (1990).
42. P. Kao, D. Allara, and S. Tadigadapa, *Sensors and Actuators B* (Chemical) 142(2), 406-411(2009).
43. P. Kao, A. Patwardhan, D. Allara, S. Tadigadapa, J. Strutwolf, and D. Arrigan, in *Performance of micromachined quartz gravimetric sensors upon electrochemical adsorption of monolayers*, 2008, p. 1544-1547.
44. P. Kao, Hempel, U., Schneider, T., Doerner, S., Hauptmann, P., Allara, D., and Tadigadapa, S., in *Proceedings of 22nd European Conference on Solid-State Transducers (EUROSENSORS XXII)* (Dresden, Germany, 2008).
45. P. Kao and S. Tadigadapa, Sensors and Actuators A: Physical 149, 189-192 (2009).
46. A. Hierlemann, A. J. Ricco, K. Bodenhofer, A. Dominik, and W. Gopel, Analytical Chemistry 72, 3696 (2000).
47. M. C. Dixon, Thesis, Pennsylvania State University, 2002.
48. A. Krishnan, P. Cha, Y. H. Liu, D. Allara, and E. A. Vogler, Biomaterials 27, 3187-3194 (2006).
49. A. Krishnan, Y. H. Liu, P. Cha, D. Allara, and E. A. Vogler, Journal of The Royal Society Interface 3, 283-301 (2006).
50. A. Krishnan, Y. H. Liu, P. Cha, R. Woodward, D. Allara, E. A. Vogler, and G. Hematology Biomater Inter Res, Colloids and Surfaces B-Biointerfaces 43, 95-98 (2005).

C. Exemplary Embodiment 3 (Room Temperature Infrared Imaging Array Fabricated Using Multi-Materials Integration Methods)

Shear-mode quartz resonators made from Y-cut crystal can be used as high sensitivity temperature sensors with resolutions down to $10^{-6\circ}$ C. [1]. The high temperature coefficient of 90 ppm/° C. along with low noise performance that can be achieved in quartz resonators allows for the realization of room temperature thermal detectors suitable for uncooled infrared imaging applications. Although high-frequency quartz resonators [2] and resonator-based infrared sensors have been previously proposed [3] and demonstrated [4-6], this is the first report on an integrated array with image rate time response (~30 Hz) using CMOS-compatible micromachining techniques. This paper presents the design, fabrication, and characterization of temperature sensitive quartz resonators fabricated using heterogeneous integration methods for realizing high-density, thermal conductance fluctuation limited infrared imaging arrays.

FIG. 3A is a schematic illustration of the device which consists of a thin and insulated Y-cut, single-crystal, quartz resonator integrated onto a silicon substrate. The fabrication process is schematically illustrated in FIG. 3B. A 100 μm thick Y-cut quartz wafer is bonded onto an oxidized and etched silicon wafer using aligned and patterned indium solder bonding performed at ~150° C. in forming gas. Prior to bonding, the bottom electrode of the resonator consisting of Cr/Au is patterned. The bonded quartz wafer is thinned down using a high-density inductively coupled plasma (ICP) etching step to a thickness in the 4-8 μm range (frequencies of 200-400 MHz). The top Cr/Au electrode is thereafter patterned using lift-off technique. Finally, the release mask is defined and the quartz is etched through using an ICP etching step to create the corner supported free-standing, thermally isolated, quartz resonator array. FIG. 3C shows pictures of the fabricated sensor array. The bottom electrode was made larger than the top one to improve the IR absorption of the pixel by having a reflecting bottom metal layer. The electrode design was carefully chosen to minimize parasitic capacitances and unwanted coupling at high frequencies.

FIG. 3D shows a typical resonance curve obtained for the fabricated devices in air. The resonance frequency was found to be ~241 MHz implying a pixel thickness of 6.94 mm. The quality factor of the fabricated device was ~4200. The temperature sensitivity of the resonators was measured by placing the resonator array in an oven and varying the temperature in the 22-50° C. range. The device showed a linear response with a temperature coefficient of 22.162 kHz/° C. or ~92 ppm/° C. (FIG. 3E), close to the value expected for the Y-cut crystal cuts.

A broadband (2-20 µm) infrared light source with a parabolic reflector and without further collimation or filtering was used for infrared testing. The infrared source with a beam diameter of ~5 mm was modulated using an optical chopper at full intensity up to a frequency of 100 Hz. A Heimann® thermopile sensor with 1.2 mm×1.2 mm area with ~90% transmission up to 10 mm was used to calibrate the intensity provided by the infrared source. The sensitivity of the thermopile reference sensor was 29.5 V/W with a time constant of 9.3 ms. The resonance frequency was monitored by performing calibrated impedance versus frequency scans.

FIG. 3F shows the infrared response of the quartz resonator as compared to that of the reference thermopile sensor. From the noise measurements in 1 Hz bandwidth, a noise equivalent power of 2.8 $nW/Hz^{1/2}$ and a detectivity of $1.79\times10^7$ $cmHz^{1/2}/W$ were deduced. FIG. 3G shows the thermal Bode plot of the IR sensor. A response time of <30 ms can be seen; allowing for a 33 frames per second video rate.

REFERENCES FOR EXEMPLARY EMBODIMENT 3

[1] E. P. Eernisse, R. W. Ward, and R. B. Wiggins, "Survey of Quartz Bulk Resonator Sensor Technologies," IEEE Transactions on Ultrasonics Ferroelectrics and Frequency Control, vol. 35, pp. 323-330, 1988.
[2] F. P. Stratton, D. T. Chang, D. J. Kirby, R. J. Joyce, H. Tsung-Yuan, R. L. Kubena, and Y. Yook-Kong, "A MEMS-based quartz resonator technology for GHz applications," 2004, p. 27.
[3] J. R. Vig, R. L. Filler, and Y. Kim, "Uncooled IR Imaging Array Based on Quartz Microresonators," Journal of Microelectromechanical Systems, vol. 5, pp. 131-137, 1996.
[4] M. R. Hamrour, S. Galliou, and B. Dulmet, "A new type of infrared-sensitive resonator used as a thermal sensor," Sensors and Actuators A: Physical, vol. 65, p. 147, 1998.
[5] Y. Kim and J. R. Vig, "Experimental results on a quartz microresonator IR sensor," in Ultrasonics Symposium, 1997. Proceedings., 1997 IEEE, 1997, pp. 449-453.
[6] P. Kao and S. Tadigadapa, "Micromachined quartz resonator based infrared detector array," Sensors and Actuators A: Physical, vol. 149, pp. 189-192, 2009.

D. Exemplary Embodiment 4 (Application of Micromachined Y-Cut-Quartz Bulk Acoustic Wave Resonator for Infrared Sensing, JMS, VoL 20, No. 1)

(The contents of this embodiment can also be found at Pisani, M. B., Kailiang R., Kao. P., and Tadigadapa, S., *Application of Micmmachined Y-Cut-Quartz Bulk Acoustic Wave Resonator for Infrared Sensing*, J. Microelectromechanical Systems, Vol. 20, No. 1, pp. 288-296. February 2011 incorporated by reference herein in its entirety.)

Abstract—This paper presents the design, fabrication, and characterization of thermal infrared (IR) imaging arrays operating at room temperature which are based on Y-cut-quartz bulk acoustic wave resonators. A novel method of tracking the resonance frequency based upon the measurement of impedance is presented. High-frequency (240-MHz) micromachined resonators from Y-cut-quartz crystal cuts were fabricated using heterogeneous integration techniques on a silicon wafer. A temperature sensitivity of 22.16 kHz/° C. was experimentally measured. IR measurements on the resonator pixel resulted in a noise equivalent power of 3.90 $nW/Hz^{1/2}$, detectivity D* of $1\times10^5$ $cm\cdot Hz^{1/2}/W$, and a noise equivalent temperature difference of 4 mK in the 8-to 14-µm wavelength range. The thermal frequency response of the resonator was determined to be faster than 33 Hz, demonstrating its applicability in video-rate uncooled IR imaging. This work represents the first comprehensive thermal characterization of micromachined Y-cut-quartz resonators and their IR sensing response. [2010-0217]

Index Terms—Bulk acoustic wave resonator, heterogeneous microelectromechanical systems integration, infrared (IR) detector, quartz micromachining, thermal IR sensor, Y-cut quartz.

I. Introduction

Advances in micromachining technologies have led to the development of thermal infrared (IR) detectors which, by virtue of their small thermal mass and good thermal isolation, have been shown to operate very close to the background fluctuation limit at room temperature [1]. The advent of focal plane arrays (FPAs) comprising such miniaturized thermal sensors has made it possible to find low-cost room-temperature IR imaging cameras. The two main technological approaches to IR detectors are based upon vanadium-oxide microbolometers [2] and barium-strontium-titanate and lanthanum-doped lead-zirconate-titanate (PLZT) pyroelectric detectors. An excellent review on the state of the art in the field of IR detectors and arrays is presented by Rogalski [3]. Niklaus et al. [4] have recently published a review of microbolometer technology developments. IR imaging systems based on uncooled bolometer arrays have been demonstrated with a noise equivalent temperature difference (NETD) of 25 mK using f/1 optics with pixel sizes of 17 µm [5], [6]. Pyroelectric IR detectors have been recently reviewed by Muralt [7]. Modern imagers based upon pyroelectric detectors are typically implemented using micromachining techniques. Recent detectors have been fabricated using PLZT films ($\rho$~15-20 nC/C° C.·cm², $\epsilon\approx350$, and tan $\delta\approx0.03$) [8]. The NETD of the 48.5-µm pixels from PLZT has been reported to be ~80-90 mK. In this paper, we propose and demonstrate thermal IR detector design and fabrication technology based on bulk acoustic wave quartz resonators. Experimental results on uncooled thermal IR detectors based on microfabricated Y-cut-quartz resonators are presented and critically evaluated.

The possibility of using bulk acoustic wave quartz resonators for thermal IR sensing was first presented in 1985 by Ralph et al. [9], followed by a detailed theoretical evaluation of the same for IR imaging applications by Vig et al. [10] and Stewart and Kim [11] in 1996. Hamrour et al. [12] demonstrated an IR sensitivity of 107 ppm/mW, allowing for a detection limit of 1 µW using an 88-mm² 360-µm-thick Y-cut-quartz resonator with $f_0$=5.1 MHz. However, over the intervening years, the experimental realization of these sensors has not been fully demonstrated. Recently, we have published a paper on the application of micromachined quartz bulk acoustic wave resonators for IR sensing in which an 18-µm-thick 1-mm-diameter disk-shaped Y-cut-quartz resonator array was configured as an IR detector [13]. However, these devices were found to be unsuitable for imaging applications since the absorption of IR from the surrounding rim dominated the response of these devices and consequently slowed the response time to several seconds. In spite of the initial demonstration of the potential for IR sensing using Y-cut-quartz resonators, the fabrication of small-thermal-mass quartz resonator structures in large arrays and their integration with CMOS interface electronics continues to remain unaddressed, and these issues are the main focus of this paper.

II. Quartz IR Detector Design

Quartz resonators fabricated from certain crystal cuts can be used as sensitive temperature sensors with unprecedented resolutions of up to $10^{-6}$° C. [14]. Table I lists the temperature coefficient of the resonance frequency for different quartz crystal cuts at ambient temperature [10]. This phenomenological sensitivity of quartz crystals makes them a highly competitive technology that is alternative to the currently used uncooled thermal detectors such as vanadium-oxide-based bolometers [2], thermopiles, and pyroelectric detectors [3]. Specifically, Y-cut quartz exhibits an extremely high temperature coefficient of resonance frequency of +90 ppm/K and has been used in this work.

TABLE I

Temperature Coefficient Of The Resonance Frequency For Various Quartz Cuts [10]

| Quartz Crystal Cut | Temperature Coefficient of Frequency (ppm/° C.) |
| --- | --- |
| AC-Cut | 20 |
| LC-Cut | 35.4 |
| Y-Cut | 90 |
| SC-Cut (b-mode) | −25.5 |
| SC-Cut (dual mode) | 80-100 |
| NLSC-Cut | 14 |

The resonance frequency $f_0$ of bulk acoustic wave quartz resonators is determined by the thickness of the resonator t as $$f_0 = \frac{1}{2t}\sqrt{\frac{\mu}{\rho}} \quad (9)$$

where $\mu$ is the elastic modulus and $\rho$ is the density of quartz. For quartz, $\mu=2.95\times10^{10}$ Pa, and $\rho=2.65\times10^3$ kg/m$^3$. Typical commercially available resonator crystals consist of 100- to 300-μm-thick quartz with resonance frequencies in the 5- to 20-MHz range. A Y-cut-quartz resonator-based IR detector is a thermal detector in which the rise in temperature of the quartz pixel is transduced as an increase in the frequency of the quartz resonator. FIG. 4A shows a schematic illustration of the fabricated device. The device consists of a thin freestanding single-crystal Y-cut-quartz resonator suspended atop a silicon substrate via four legs. The legs are also used to electrically connect to the top and bottom electrodes of the resonator and also provide a thermal connection to the substrate which acts as a heat sink. Absorption of the incident IR radiation results in a temperature rise of the freestanding structure. The magnitude of the resulting temperature rise is primarily determined by the thermal conductance of the suspension legs of the pixel to the substrate which is clamped at ambient temperature.

In this paper, we report the resonance characteristics of two different micromachined Y-cut resonators, namely, 89 and 241 MHz. The latter is the focus of this work; however, the 89-MHz resonator will be used to illustrate the new frequency-tracking methodology proposed in this paper since the Q factor of these resonators is much higher and better illustrates the concept. The resonance characteristics of the micromachined bulk acoustic wave resonator were determined by performing frequency-impedance scans using an Agilent 4395A analyzer. Standard temperature detection method uses real-time (series or parallel) resonance frequency tracking as a function of the temperature. FIG. 4B shows the experimentally measured real and imaginary components of the impedance for an 89-MHz microtnachined quartz resonator. For small temperature changes within ±25° C. about room temperature, the resonance frequency is found to vary linearly with temperature [13].

The analyzer used in this work is capable of acquiring up to 801 impedance measurements over the experimentally set frequency span. Even using extremely fast scan rates and much fewer data points, each impedance scan takes around 300 ms, Since the fabricated IR detectors are designed to have a response time of less than 30 ms, this method of tracking the resonance frequency is unsuitable for the current application. To overcome this limitation, we have devised a new strategy in this work. The impedance analyzer is set to a fixed frequency at the midpoint between the two inflection points in the imaginary component of the impedance curve shown in FIG. 4B, and the change in the imaginary part of the impedance is monitored in real time. For small temperature changes, an increase and/or decrease in the frequency, about the set quiescent frequency, translates into an increase and/or decrease in the value of Im(Z) as shown schematically in FIG. 4C. This method offers an additional gain to the measurement of the temperature (I) sensitivity of the resonance frequency ($f_0$) since $$\frac{d(\text{Im}Z)}{dT} = \frac{d(\text{Im}Z)}{df_0}\bigg|_{f_0} \cdot \frac{df_0}{dT} = -\text{Slope}\cdot\frac{df_0}{dT}. \quad (10)$$

For the case shown, Y-cut quartz has a temperature coefficient of frequency of 90 ppm, which, for an 89.1-MHz resonator, translates into 8019 Hz/° C. The gain factor from the slope of the graph shown is −6.31 Ω/Hz, which will result in an impedance sensitivity of 50.62 kΩ/° C. Furthermore, using this method, the continuous tracking of the resonance frequency reduces to real-time monitoring of the real or imaginary component of the impedance at a fixed frequency. So long as the quiescent point of the circuit is set to be at the midpoint between the inflection points in the impedance curve and the temperature changes are small, this method offers a very simple electronic measurement method which can be readily scaled to large FPAs. For the 89-MHz resonator shown here, the linear range of frequency excursion is limited to ~2 kHz, corresponding to a pixel temperature change of 0.25° C. Since the temperature change induced in the sensor pixel for room-temperature IR imaging applications is expected to be small, this method is reasonably well suited for this application.

In terms of an actual measurement protocol, a temperature sensor will be included on the chip to track the overall temperature of the resonator chip in real time. The measurement circuit will consist of the following blocks: 1) a direct digital signal synthesizer; 2) a vector voltmeter to measure the signals from the resonator pixels; 3) a temperature sensor; 4) a multiplexer; 5) a field-programmable gate array to control the multiplexer and the direct digital synthesizer (DDS); and 6) an x86-based microcontroller for signal analysis. As part of the initialization of the device, impedance scans determining the two inflection points and $f_0$ setting for each resonator will be determined. These values, along with the temperature sensitivity of the frequency, for each resonator would be stored into a lookup table and processed to provide a temperature calibration. The proposed electronic interface is motivated by our earlier work [15], and FIG. 4D shows a schematic representation of a possible electronic interface. Since the proposed electronic interface has not been implemented in this work, all measurements reported were performed using an Agilent 4395A impedance analyzer.

III. IR Sensor Array Fabrication

A cross-sectional overview of the fabrication process is schematically shown in FIG. 4E. On a (100) 525-μm-thick 4-in-diameter p-doped silicon wafer, the mechanical support structures are defined. The Si wafer has a 500-nm-thick thermally grown $SiO_2$ film to electrically insulate the bottom electrode of the quartz resonators from the silicon substrate and to reduce parasitic capacitance and coupling in the device. Evaporated on the wafer are 20-nm Cr and 100-nm Au films. A thick positive photoresist (SPR-220) is spun and patterned using contact lithography to define the support structure areas for the freestanding resonators. A 3- to 5-μm-thick indium film is electroplated using an indium-sulfamate-based solution in the support areas, created after development of the photoresist pattern. A 15- to 30-μm-deep cavity is etched in silicon using a $SF_6$-based anisotropic Bosch etch process with indium acting as the mask for this step.

Separately, 100-μm-thick Y-cut 1-in-diameter quartz wafers are prepared on which the bottom electrode is defined by the evaporation, lithography, and etching of a 15-nm Ti/135-nm Au film. The quartz wafer with the bottom electrode pattern is subsequently aligned to the indium support structure pattern on the silicon wafer, and the two wafers are solder bonded using an EVG501 bonder at a temperature of 200° C. for about 1 h. The use of indium enables a low-temperature bonding step (melting point ~150° C.) and provides a good thermal contact to the substrate in the bonded areas. The bonded quartz wafer is thinned down using a high-density inductively coupled plasma (ICP) etching step to a thickness in the 4-to 8-μm range [13]. An etch rate of ~0.5 μm/min was used during the thinning step, requiring over 4 h of etching time. Thereafter, the 15-nm Ti/200-nm Au film for the top electrode is deposited by evaporation and defined using lift-off. The top electrode is designed to be smaller than the bottom one in order to improve the IR absorption since the gold in the electrode areas is a highly reflecting layer. Finally, the release mask is defined, and the surrounding quartz is etched through its entire thickness using a fast ICP etching process to create the corner-supported freestanding thermally isolated quartz IR detector array. FIG. 4F shows an optical image of the fabricated device. The use of a low-temperature fabrication process, along with the use of a silicon substrate wafer on which the quartz resonator array is integrated, can be designed to potentially allow for integration with CMOS readout electronics in future designs.

IV. IR Sensitivity and Thermal Modeling

The device as shown in FIG. 4A is assumed to be a circular pixel connected to the frame via four legs. The anchor pads are assumed to be at room temperature, and the incident radiation is assumed to be absorbed by the annular pixel region outside the top electrode. The heat balance equation for this case can be simply written as $$-G\Delta T + H\frac{d(\Delta T)}{dt} = \zeta Q \qquad (11)$$

where $\xi$ is the absorption coefficient, G is the thermal conductance (in watts per kelvin) of the four legs, H is the thermal mass (in joules per kelvin) of the circular pixel, and $Q=Q_0 e^{i\omega t}$ is the incident addition of peak power $Q_0$ (in watts) modulated sinusoidally at the angular frequency ω. The maximum rise in temperature $\Delta T|_0$ upon absorption of radiation can be written as $$\Delta T|_0 = \frac{(\zeta Q_0)}{\sqrt{G^2 + \omega^2 H^2}}. \qquad (12)$$

It must be noted that the use of the four support legs increases the overall thermal conductance G and is therefore undesired from thermal standpoint. However, the four-leg structure is mechanically and structurally more robust and provides better yield. The responsivity R (in hertz per watt) of the device is given by $$R = \frac{\Delta f_0}{Q_0} = \frac{TCF \cdot \Delta T|_0}{Q_0} = \frac{\zeta \cdot TCF}{\sqrt{G^2 + \omega^2 H^2}} \qquad (13)$$

where $\Delta f_0$ is the change in the resonance frequency in response to the modulated incident radiation and TCF is the temperature coefficient of the resonance frequency, i.e., TCF=df/dT. Furthermore, IR detectors are typically characterized by two additional figures of merit known as noise equivalent power (NEP) (in W/√Hz) and detectivity D* (in m·√Hz/W).

These can be defined as $$NEP = \frac{\Delta f|_{Noise}}{R} \qquad (14)$$

$$D^* = \frac{A_D^{1/2}}{NEP} = \frac{R \cdot A_D^{1/2}}{\Delta f|_{Noise}} \qquad (15)$$

where $\Delta f|_{Noise}$ is the rms frequency noise measured in 1-Hz bandwidth and $A_D$ is the area of the detector.

Since the phenomenological sensitivity of quartz is very high, the fundamental limitation in the temperature resolution is set by the noise limits. NETD is a widely used parameter to characterize IR detectors and arrays. It refers to the minimum difference in the temperature of the background that produces a signal that is equal to the noise in the system. Since there are several sources of noise, the total NETD can be expressed as $$NETD^2 = NETD_{Thermal}^2 + NETD_{Flicker}^2 + NETD_{ROE}^2 \qquad (16)$$

where the subscripts refer to the noise limits set by thermal fluctuation noise, flicker noise, and readout electronics, respectively. Allan variance $\sigma_y(\tau)$ is a two-sample variance that is used to measure the stability of resonators and oscillators in the time domain. Frequency flicker is typically characterized by the power spectral density $S_y(f)|_{Flicker}$, with the 1/f behavior, which can be written as [16]

$$S_y(f)|_{Flicker} = \frac{(\sigma_y(\tau)f_0)^2}{2\ln(2)f} \quad (17)$$

and sets the limit for the minimum IR power that can be detected when modulated at frequency f. Based on empirical observations, the smallest level of Allan variance in quartz resonators has been estimated to be $1.2 \times 10^{-20} \cdot f_0$ [10], [17].

In most thermal detectors, however, the noise limit is set by the spontaneous temperature fluctuations of the detector element due to conductive coupling. For the ideal thermal detector discussed, the power spectral density $S_y(f)|_{Thermal}$ is given by [18]

$$S_y(f)|_{Thermal} = \frac{4k_B T^2 G \cdot TCF^2}{G^2 + \omega^2 H^2} \quad (18)$$

where $k_B$ is the Boltzmann constant and T is the ambient temperature which is taken as 293 K for room-temperature imagers. Once the power spectral density is known for each noise source, the variance of the noise can be written as [19]

$$\langle \sigma_y^2(N, \tau) \rangle = \int_0^\infty S_y(f) \left[ \frac{N}{N-1} \left( \frac{\sin(\pi f \tau)}{\pi f \tau} \right)^2 \times \left\{ 1 - \left( \frac{\sin(N \pi f \tau)}{N \sin(\pi f \tau)} \right)^2 \right\} \right] df \quad (19)$$

where N is the number of measurement samples and $\tau$ is the measurement time. The second term in the aforementioned expression in square brackets is the transfer function of a linear filter. In this calculation, the dead time between measurements has been assumed to be zero. Substituting equation (17) and (18) into (19), the variance of the noise due to flicker (1/f) and thermal fluctuations can be calculated. The combined deviation of noise $\sigma_{Noise}$ in hertz due to contributions from flicker and thermal components can be written as $$\sigma_{Noise} = [\langle \sigma_y^2 \rangle |_{Flicker} + \langle \sigma_y^2 \rangle |_{Thermal}]^{1/2} \quad (20)$$

In this work, we use an impedance analyzer, the measurement time and number of points over which the data are averaged can be set as desired. Hence, we have ignored the electronic readout noise.

The NETD is another important performance parameter for IR imaging systems and is defined as the smallest difference in temperature of a blackbody which, when viewed by the IR detector, gives rise to a signal that is equal to the noise in the detector, i.e., the smallest difference in the temperature of a blackbody at room temperature, resulting in a signal-to-noise ratio of one. The NETD is defined as $$NETD = \frac{(4F^2 + 1)\sigma_{Noise}}{\zeta A_D \eta R \int_{\lambda_1}^{\lambda_2} (\partial M(\lambda, T)/\partial T) d\lambda} \quad (21)$$

where F is the f-number of the optics, $\xi$ is the absorption coefficient of the pixel, $\eta$ is the transmittance of the atmospheric path between the scene and the system multiplied by the transmittance of the optics, and $(\partial M/\partial T)d\lambda$ is a reference blackbody emission function integrated over the wavelength range of interest (for a 300-K scene temperature in the 8-to14-μm spectral interval, its value is 2.62 W/K·m², and in the 3-to 5-μm spectral interval, its value is 0.21 W/K·m²[3]). The response time $\tau_{RT}$ of thermal detection mechanisms is given by $$\tau_{RT} = H/G \quad (22)$$

V. Experimental Results

The resonance characteristics of the individual resonators were measured using an Agilent 4395 impedance analyzer following short, open, and load (51-Ω) fixture compensation measurements. FIG. 4G shows a typical resonance curve obtained for the fabricated devices in air. The resonance frequency was found to be 241 MHz, implying a pixel thickness of 6.9 μm. The quality factor of the fabricated device was 4200. The slope of the imaginary part of the impedance Im(Z) versus frequency was determined to be −640 Ω/MHz.

The temperature sensitivity of the resonators was measured in the 22° C.-50° C. temperature range. The device was placed in a temperature oven, the temperature of which could be maintained at a steady value within 0.1° C. At each temperature, the device was allowed to equilibrate for 30 min before recording the resonance frequency. The resonator was continuously driven during the entire measurement. FIG. 4H shows the resonance frequency as a function of temperature. The device showed a linear response with a temperature coefficient of frequency TCF of 22.16 kHz/K or 92 ppm/K—which is close to the expected value for the Y-cut crystal. From the experimentally measured slope of the impedance-frequency curve (FIG. 4G), the temperature sensitivity of Im(Z) is 14.2 Ω/K when biased at the midpoint between the two inflection points as shown in FIG. 4G.

A broadband (2-to 20-μm) IR light source with a parabolic reflector and without any window, obtained from Ion Optics Inc., was used for the IR calibration experiments. The IR source with a beam diameter of 5 mm was modulated using an optical chopper at full intensity and frequencies up to 100 Hz. A Heimann thermopile sensor with an area of 1.2 mm×1.2 mm and $CaF_2$ window with ~90% transmission up to 10 μm was used for IR source calibration. The calibrated sensitivity of the thermopile sensor is given to be 29.5 V/W with a time constant of 9.3 ms. The maximized output from the reference detector of 0.05 V was obtained, which gave an incident power of 1170 W/m². The resonance frequency was monitored by performing calibrated impedance versus frequency scans. The impedance analyzer was set up to operate at a frequency of 241.02 MHz, and the Im(Z) was monitored as the incident radiation was modulated using the optical chopper at a frequency of 3.8 Hz.

FIG. 4I shows the response of a quartz resonator pixel and the reference sensor. The modulated impedance output was 0.535Ω, which implies a temperature change of 37.7 mK and is well within the dynamic (linear) range of operation. The dynamic range of the detector is the difference in Im(Z) bounding the linear region in the impedance curve between the two inflection points as shown in FIG. 4F, which, for the curve shown, is 14Ω. The measured responsivity of the device is 7.32 kΩ/W or 11.4 MHz/W. The rms noise in the 1-Hz bandwidth was experimentally measured to be 28.5 μΩ/Hz$^{1/2}$, from which an NEP of 3.90 nW/Hz$^{1/2}$ and a detectivity D* of $1 \times 10^5$ m·Hz$^{1/2}$/W were deduced. Furthermore, FIG. 4I also shows a linearly increasing/decreasing impedance output in the fully modulated states of the pixel. This arises from the fact that quartz is a good absorber of IR radiation in the 8-to 12-μm range, and this heat in the surrounding thermally clamped areas slowly couples back into the pixel with a much slower time constant. A similar effect leading to a slow response time was observed in the IR detectors reported earlier [13]. However, the problem in the previous design was far more exacerbated than reported here.

It must be noted that the method of tracking the resonance frequency in the impedance domain at the array level requires individual calibration of each pixel. The experimentally measured slope of Im(Z) versus frequency, as well as the resonance frequency $f_0$ of each pixel, is used for converting time-dependent impedance changes into a change of scene temperature. In a single chip with eight resonators, we measured an average dynamic range of 3.53 kHz with a standard deviation of the resonance frequency in the array of 2.48 MHz. This clearly indicates that individual calibration for each sensor is required which can be readily performed as part of the experimental measurement protocol as proposed in Section II.

Table II lists the geometric parameters that have been used to model the fabricated IR detectors. Furthermore, the material properties are assumed as follows: thermal conductivity of quartz of 6.2 W/m K, density of quartz of 2650 kg/m$^3$, heat capacity of quartz of 733 J/kg·K, thermal conductivity of gold of 318 W/m·K, heat capacity of gold of 129 J/kg·K, density of gold of 19 320 kg m$^3$, and ambient temperature is assumed to be 293 K. It is assumed that the bottom electrode covers the entire back side of the resonator structure, whereas the topside electrode is assumed to be 200 μm in diameter. Based on the dimensions listed, the total thermal conductance of the four legs can be calculated to be 217.5 μW/K. The heat capacity of the pixel is calculated to be 2239 nJ/K, resulting in a thermal time constant of 10.3 ms according to (14).

TABLE II

Geometric Parameters Used In The Thermal Calculations Based On The Fabricated Device Geometry

| Pixel Parameter | Dimension (μm) |
| --- | --- |
| Pixel Diameter | 450 |
| Pixel Thickness ($f_0$ = 241 MHz) | 6.94 |
| Supporting Leg Length | 116 |
| Supporting Leg Width | 54 |
| Bottom Gold Electrode Diameter | 446 |
| Top Electrode Diameter | 200 |
| Electrode Thickness | 0.4 |

Using equations (7) and (18) and the aforementioned pixel thermal parameters, the responsivity, NEP, and D* are calculated as a function of modulation frequency and shown in FIG. 4J. The calculated values of the responsivity, NEP, and D* are approximately an order of magnitude higher than the measured values reported and are primarily limited by measured noise values.

Based on the measurement time τ of 0.9 ms, the noise deviation due to flicker and thermal sources was calculated for N=2 using equations (19) and (20) and by performing a numerical integration. For the typical values of transmittance of η=0.9 and absorption of ξ=0.5, the NETD can be calculated as a function of modulation frequency and is shown in FIG. 4K. Using the experimentally measured broadband noise value of 0.001 Hz and the responsivity of 11.4 MHz/W, the NETD for the pixel is obtained to be 3.8 mK, which compares well with the theoretically predicted value of 2 mK obtained in the 3.8-Hz modulation region.

The thermal characteristics of the device were also modeled using finite-element analysis using Comsol software using the general heat transfer module. The device shape was drawn to dimensions and meshed using tetrahedral elements. Only the top surface of the quartz in the region where the gold top electrode does not exist is assumed to absorb the incident IR radiation. Based on the experimental value of the incident radiation density and the absorption coefficient of 50%, a value of 573 W/m$^2$ was used in the simulations. The ends of the four support legs were fixed at room temperature of 293 K, and for the rest of the surfaces, natural convective heat flux was assumed. The top and bottom gold electrodes were modeled as 0.2-μm-thick highly conductive layers of gold. This setting in the software allows for optimized sizing of the mesh elements while accommodating the extreme difference in the aspect ratios of the various structures in the device and at reasonable computational resources. FIG. 4L shows the temporal thermal response of the device to a step function, and the inset shows the obtained temperature profile in steady state. The time to reach $e^{-1}$ of the asymptotic temperature value gives a time constant of 6 ms, which is close to the simple analytical value of 10 ms predicted without including any natural convective heat losses. The temperature profile across the pixel also shows uniform heating except in the vicinity of the supporting legs due to the presence of the gold electrodes which helps in spreading the heat across (see inset of FIG. 4L). Thus, most of the temperature gradient is sustained in the supporting legs. For the pixel shown, a temperature difference of 126 mK is obtained which, for the 240-MHz device, is expected to result in a frequency change of 2.8 kHz when operated below the thermal cutoff frequency. This finite element modeled frequency change is about three times higher than the experimentally observed value. Since the modeled frequency change depends upon the values of the absorbance, the transmittance, and the power input used, any significant errors between the actual and model input values of these quantities can be the source of the observed discrepancy between the predicted and measured temperature differences. Furthermore, in the model presented, no conductive heat losses through the surrounding air were included, which would also contribute to the observed error.

The response time of the device was experimentally measured by monitoring the relative output of the pixel response as the chopper frequency was increased up to 100 Hz. FIG. 4M shows a Bode plot of the relative response of the pixel, from which a thermal time constant of <30 ms was measured—allowing for a 33-frames/s video rate. The predicted time constant for the pixel using equation (22) was 10 ms, which agrees within a factor of three with the measured time constant. Since the calculation of time constant does not depend upon assumptions relating to the absorbance, the transmission losses, and the accuracy of the calibration of the power output from the IR source, this prediction is expected to show a better agreement with the experimental values than the temperature change of the pixels. However, the current time constant measurements were limited by the optical chopper sweep time through the incident IR beam, and more refined measurements are required to determine the exact thermal time constant of the device.

VI. Conclusion

In summary, the design, fabrication, and experimental characterization of IR detectors based on Y-cut-quartz bulk acoustic wave resonators has been presented. Using heterogeneous integration and micromachining techniques, a high-thermal sensitivity and fast-response-time IR sensor array was realized. Specifically, uncooled IR detectors for thermal imaging applications with a time constant of less than 30 ms and an NETD of 4 mK have been demonstrated. Y-cut thickness shear mode resonators with a thickness of 6.9 μm ($f_0$=240 MHz) were fabricated using the newly developed heterogeneous integration technique. Although the fabricated pixel pitch was 500 µm, the developed technology has good scalability due to the use of high-resolution planar lithography steps, ICP etching used for the thinning and release of the resonators, and the high-thermal conductivity indium support that provides good thermal contact to the substrate and minimal thermal crosstalk between neighboring pixels. Even with the current pixel size, low-resolution imagers with (4×4) 16 pixel arrays can be realized for simple applications such as triggers for video monitoring and low-cost intruder alarm applications. The low thermal budget of the fabrication process (<200° C.) and the cointegration onto a silicon wafer will enable direct CMOS interfacing in future designs of these sensor arrays. A novel method for real-time resonance frequency tracking based upon the measurement of the impedance of the resonator at around the resonance frequency has been proposed and offers additional improvement in the sensitivity.

REFERENCES FOR EXEMPLARY EMBODIMENT 4

[1] S. Tadigadapa and Y. Zhang, "Thermal sensors from micro and nanoscale structures," in *Encyclopedia of Sensors*, E. D. Craig Grimes and M. Pishko, Eds. Stevenson Ranch, Calif.: American Scientific, 2006.
[2] R. A. Wood, "Uncooled thermal imaging with monolithic silicon focal planes," in *Infrared Technology XIX*, 1 ed. San Diego, Calif.: SPIE, 1993, p. 322.
[3] A. Rogalski, "Infrared detectors: Status and trends," *Prog. Quantum Electron.*, vol. 27, no. 2/3, pp. 59-210, 2003.
[4] F. Niklaus, C. Vieider, and H. Jakobsen, "MEMS-based uncooled infrared bolometer arrays: A review," in *Proc. SPIE—MEMS/MOEMS Technologies and Applications III*, Beijing, China, 2007, p. 683 60D-15.
[5] M. Kohin and N. R. Butler, "Performance limits of uncooled VOx micro-bolometer focal plane arrays," in *Proc. SPIE—Infrared Technology and Applications XXX*, Orlando, Fla., 2004, pp. 447-453.
[6] C. Li, G. D. Skidmore, C. Howard, C. J. Han, L. Wood, D. Peysha, E. Williams, C. Trujillo, J. Emmett, G. Robas, D. Jardine, C. F. Wan, and E. Clarke, "Recent development of ultra small pixel uncooled focal plane arrays at DRS," in *Proc. SPIE—Infrared Technology and Applications XXXIII*, Orlando, Fla., 2007, p. 654 21Y-12.
[7] P. Muralt, "Micromachined infrared detectors based on pyroelectric thin films," *Rep. Frog. Phys.*, vol. 64, no. 10, pp. 1339-1388, October 2001.
[8] C. M. Hanson, H. R. Beratan, and D. L. Arbuthnot, "Uncooled thermal imaging with thin-film ferroelectric detectors," in *Proc. SPIE—Infrared Technology and Applications XXXIV*, 2008, p. 694 025-1.
[9] J. E. Ralph, R. C. King, J. E. Curran, and J. C. Page, "Miniature quartz resonator thermal detector," in *Proc. IEEE Ultrason. Symp.*, 1985, vol. 1, pp. 362-364.
[10] J. R. Vig, R. L. Filler, and Y. Kim, "Uncooled IR imaging array based on quartz microresonators," *J. Microelectromech. Syst.*, vol. 5, no. 2, pp. 131-137, June 1996.
[11] J. T. Stewart and Y. Kim, "Design of a quartz microresonator for infrared sensor applications," in *Proc. 50th IEEE Int. Freq. Control Symp.*, 1996, pp. 595-601.
[12] M. R. Hamrour, S. Galliou, and B. Dulmet, "A new type of infrared-sensitive resonator used as a thermal sensor," *Sens. Actuators A, Phys.*, vol. 65, no. 2/3, pp. 147-151, March 1998.
[13] P. Kao and S. Tadigadapa, "Micromachined quartz resonator based infrared detector array," *Sens. Actuators A, Phys.*, vol. 149, no. 2, pp. 189-192, February 2009.
[14] E. P. Eernisse, R. W. Ward, and R. B. Wiggins, "Survey of quartz bulk resonator sensor technologies," *IEEE Trans. Ultrason., Ferroelectr., Freq. Control*, vol. 35, no. 3, pp. 323-330, May 1988.
[15] P. Kao, S. Doerner, T. Schneider, D. Allara, P. Hauptmann, and S. Tadigadapa, "A micromachined quartz resonator array for biosensing applications," *J. Microelectromech. Syst.*, vol. 18, no. 3, pp. 522-530, June 2009.
[16] D. W. Allan, "Time and frequency (time-domain) characterization, estimation, and prediction of precision clocks and oscillators," *IEEE Trans. Ultrason., Ferroelectr., Freq. Control*, vol. UFFC-34, no. 6, pp. 647-654, November 1987.
[17] F. L. Walls and J. R. Vig, "Fundamental limits on the frequency stabilities of crystal oscillators," *IEEE Trans. Ultrason., Ferroelectr., Freq. Control*, vol. 42, no. 4, pp. 576-589, July 1995.
[18] A. Van-der-Ziel, Noise in Measurements. New York: Wiley, 1976.
[19] P. Lesage and C. Audoin, "Characterization and measurement of time and frequency stability," *Radio Sci.*, vol. 14, no. 4, pp. 521-539,1979.

E. Exemplary Embodiment 5 (Micromachined Quartz Resonator-Based High Performance Thermal Sensors)

Abstract—This paper presents the design, fabrication, and characterization of temperature sensitive quartz resonators fabricated using heterogeneous integration methods for realizing high-density, thermal conductance fluctuation limited thermal sensors for infrared imaging and biochemical sensing applications. An integrated quartz sensor array using CMOS-compatible micromachining techniques has been designed and fabricated. 241 MHz micromachined resonators from Y-cut quartz crystal cuts were fabricated with a temperature sensitivity of 22.162 kHz/° C. Infrared measurements on the resonator pixel resulted in a noise equivalent power (NEP) of 3.90 nW/Hz$^{1/2}$, detectivity D* of 9.17×10$^7$ cmHz$^{1/2}$/W, and noise equivalent temperature difference (NETD) in the 8-12 µm wavelength region of 4 mK and a response time of <30 Hz. In a unique new application a remotely coupled thermal sensor configuration was used to monitor biochemical reactions in real time.

I. Introduction

The most generic definition of a thermal sensor is essentially a temperature sensor (thermometer) that has been optimized to result in maximum temperature change upon exposure to the measurand. Thus optimization of thermal sensor designs thus focus on two aspects: (i) development and integration of materials (phenomenon) with a large and repeatable temperature coefficient of the property being used as the measurement principle, and (ii) development of sensing structures capable of realizing a maximum temperature change upon exposure to minimum amount of input. The second requirement implicitly constrains thermal sensors into the micro and nanoscale sizes where the thermal mass of the systems is extremely small and therefore small amounts of absorbed power results in large changes in temperature. In this paper we describe the design, fabrication, and test results of thermal sensors based on micromachined quartz bulk acoustic wave resonators. As we will demonstrate, the use of temperature sensitive quartz cuts provides extremely high temperature detection capability in these sensors while micromachining allows reduction in the thermal mass and thermally isolates the sensor structure for optimized performance.

II. Ideal Thermal Sensor

An ideal thermal sensor is schematically illustrated in FIG. 5A. The detector element of thermal mass H (J/K) is coupled to the heat sink at a constant temperature $T_0$ (K) via a thermal conductance G (W/K). Upon absorption off a power Q(W) by the detector element, its temperature T is found by solving the equation:

$$Q = H\left(\frac{d(T - T_0)}{dt}\right) + G(T - T_0) \qquad (23)$$

where t(s) is the time. For a sinusoidal power input, $Q=Q_0\exp(i\omega t)$, (1) can be solved to yield $$\Delta T = T - T_0 = \frac{Q_0\exp(i\omega t)}{\sqrt{G^2 + \omega^2 H^2}} \qquad (24)$$

For a thermal detector to exhibit high sensitivity, $\Delta T$ must be as large as possible which, according to eq. (24), can be achieved by making G as small as possible and $\omega$ sufficiently low so that $\omega H \ll G$. In other words both the thermal heat capacity of the detector element and its thermal coupling to the surroundings should be as small as possible. The implication of making H as small as possible results in a sensing element of as small and as light a construction as practicable. A characteristic thermal time constant $T_T$ for the detector can be defined as $$\tau_\tau = H/G \qquad (25)$$

In most thermal detectors the noise limit is set by the spontaneous temperature fluctuations of the detector element due to the heat conductance G to the surroundings. For the ideal thermal detector shown in FIG. 5A, the mean squared temperature fluctuations are given by [1]

$$\Delta T_n^2 = \frac{4k_B T^2 G}{G^2 + \omega^2 H^2} \qquad (26)$$

where $k_B$ is the Boltzmann Constant and the noise is measured at a frequency $\omega$ in a 1 Hz bandwidth. The minimum detectable power $P_{min}$ per unit bandwidth due to temperature fluctuations is determined from the condition when the temperature changes due to signal input are equal to the root mean squared of the temperature noise fluctuations. Using eq. (24) and eq. (26), $P_{min}$ can be written as $$P_{min} = 2T\sqrt{k_B G} \qquad (27)$$

III. Y-Cut Quartz Resonator

Bulk acoustic wave resonators fabricated from some quartz crystal cuts can be used as sensitive thermometers with unprecedented temperature resolutions of up to $10^{-6\circ}$ C. [2]. Table 1 lists the temperature coefficient of the resonance frequency for different quartz crystal cuts at room temperature [3]. This phenomenological sensitivity of quartz crystals makes them a highly competitive technology alternative to the currently used uncooled thermal detectors such as vanadium oxide-based bolometers [4], thermopiles, and pyroelectric detectors [5]. Specifically, Y-cut quartz exhibits an extremely high temperature coefficient of resonance frequency of +90 ppm/K and has been used in this work.

TABLE 1

Temperature Coefficient Of Resonance Frequency For Various Quartz Cuts [3]

| Quartz Crystal Cut | Temperature Coefficient of Frequency (ppm/° C.) |
| --- | --- |
| AC-Cut | 20 |
| LC-Cut | 35.4 |
| Y-Cut | 90 |
| SC-Cut (b-mode) | −25.5 |
| SC-Cut (dual mode) | 80-100 |
| NLSC-Cut | 14 |

The resonance frequency $f_0$ of bulk acoustic wave quartz resonators is determined by the thickness of the resonator d as $$f_0 = \frac{1}{2d}\sqrt{\frac{\mu}{\rho}} \qquad (28)$$

where $\mu=4.05\times10^{10}$, Pa is the elastic modulus and $\rho=2.65\times 10^3$ kg/m³ is the density of quartz. Typical commercially available resonator crystals consist of 100 to 300 μm thick quartz with resonance frequencies in the 5 to 20 MHz range. Using bulk micromachining techniques, we have fabricated resonators from 18 μm and 6.9 μm thick Y-cut quartz. These resonators have fundamental resonance frequencies of 89 and 241 MHz respectively as shown in FIG. 5B. The temperature sensitivity of the resonators was measured around room temperature by placing the packaged resonator in an oven and allowing for the temperature to stabilize for 30 minutes before taking the resonance frequency measurement. The two insets in FIG. 5B show the measured temperature sensitivity which gave a value of 7.2 kHz/° C. for 89 MHz and 22.2 kHz/° C. for the 241 MHz resonators and is consistent with the expected temperature sensitivity of 90 ppm.

In this paper we present two specific applications of the Y-cut resonators-based thermal sensors. We have configured the 241 MHz resonators as room temperature IR sensors and the 90 MHz resonators for biosensing application. These will be described in detail in the following sections.

IV. Y-Cut Quartz Resonator IR Sensor

The 241 MHz Y-cut quartz resonator-based IR detector is tested as an IR detector in which the rise in temperature of the quartz pixel is transduced as an increase in the frequency of the quartz resonator. FIG. 5C shows the mask layout of the sensor array chip. The device consists of a thin, free-standing, single-crystal Y-cut quartz resonator suspended atop a silicon substrate via four supporting legs that also provide a thermal connection to the substrate, which acts as a heat sink. Two of the four legs are used to electrically connect to top and bottom electrodes of the resonator. Absorption off the incident IR radiation results in a temperature rise of the freestanding structure. The magnitude of the resulting temperature rise is primarily determined by the thermal conductance of suspension legs of the pixel to the substrate which is clamped at ambient temperature.

The fabrication process uses a 100 μm thick Y-cut quartz wafer bonded onto an oxidized and etched silicon wafer using aligned and patterned indium solder bonding performed at ~150° C. Prior to bonding, the bottom electrode of the resonator consisting of Cr/Au is patterned. The bonded quartz wafer is thinned down using a high-density inductively coupled plasma (ICP) etching step to a thickness in the 4-8 μm range. The top Cr/Au electrode is thereafter patterned using lift-off technique. Finally, the release mask is defined and the quartz is etched through using an ICP etching step to create the corner-supported freestanding, thermally-isolated, quartz resonator array. The fabrication process is described in greater detail elsewhere [6].

A broadband (2-20 μm) infrared light source with a beam diameter of ~5 mm and modulated using an optical chopper at full intensity up to a frequency of 100 Hz was used for the calibration. A Heimann® thermopile sensor with 1.2 mm×1.2 mm area, sensitivity of 29.5 V/W and a time constant of 9.3 ms was used as the reference sensor. The response of the sensor was measured by using an impedance analyzer tuned at the resonance frequency and monitoring the change in the imaginary part of impedance of the resonator. The details of this method of measurement are described elsewhere [6]. FIG. 5B shows the infrared response of the quartz resonator as compared to that of the reference thermopile sensor. From the noise measurements in 1 Hz bandwidth, a noise equivalent power of 3.90 nW/Hz$^{1/2}$ and a D* of 9.17×10$^7$ cmHz$^{1/2}$/W were deduced. The NETD of the measured pixel was deduced to be 4 mK. The relative response (peak-to-peak amplitude)) of the sensor as a function of the modulation frequency of the incident radiation was measured and a Bode plot of the relative response was plotted. A response time of <30 ms was experimentally measured, allowing for a 33 frames per second video sampling rate.

The thermal characteristics off the device were also modeled using finite element analysis using Comsol® software using the general heat transfer module. Only the top surface of the quartz in the region where the gold top electrode does not exist is assumed to absorb the incident IR radiation. Based on the experimental value of the incident radiation density and absorption coefficient of 50%, a value of 573 W/m$^2$ was used in the simulations. The ends of the four support legs were fixed at room temperature of 293 K and for the rest of the surfaces natural convective heat flux was assumed. FIG. 5E shows the temperature profile at four different times. The time to reach e$^{-1}$ of the asymptotic temperature value gives a time constant of 6 ms, which is close to the simple analytical value of 10 ms predicted without including any natural convective heat losses using eq. (25). The temperature profile across the pixel also shows uniform heating except in the vicinity of the supporting legs due to the presence of the gold electrodes which helps in spreading the heat across uniformly. For the pixel shown, a temperature difference of 126 mK is obtained which for the 240 MHz device is expected to result in a frequency change of 2.8 kHz when operated below the thermal cut-off frequency. The FEM modeled frequency change is about 3 times higher than the experimentally observed value.

V. Y-Cut Quartz Biosensor

In a novel configuration of the sensor, a reaction chamber is positioned <100 μm from the 89 MHz sensor array and the reaction enthalpy was measured in real time. FIG. 5F schematically illustrates the sensor configuration. The major advantage of this method is that the biochemical reactions can be directly performed in the reaction chamber which is in the proximity of the quartz resonator but not in actual contact with it. Therefore no direct mass loading or fouling of the resonator surface occurs. The heat from the biochemical reaction couples through radiation and conduction via the thin layer of air trapped between the resonator and the bottom of the chamber.

Reducing the gap between the sensor and the reaction chamber also results in improved heat transfer coefficient through the confined gas layer. The effective heat transfer coefficient via radiation (h$_{radiation}$) and conduction via air (h$_{air}$) in confined spaces can be given by the expressions:

$$h_{radiation} = 4\varepsilon\sigma\left(\frac{T_1 + T_2}{2}\right)^3 \quad (29)$$

$$h_{air} = \frac{\kappa}{d_{air}} \quad (30)$$

where T1 and T2 are the temperatures of the quartz resonator and the reactor respectively, ε is the emissivity of the chamber wall, σ is the Stefan-Boltzmann constant, κ is the thermal conductivity of air and d$_{air}$ is the thickness of the air layer trapped between the sensor and the reaction chamber. Using these expressions, the effective heat transfer coefficient can be plotted as a function of the gap thickness (d$_{air}$) and is shown in FIG. 5G.

The effective heat transfer coefficient plotted in FIG. 5G is dominated by conductive heat transfer through air which is the dominant contribution when the separation gap is less than 100 μm. Thus, the designed sensor configuration is a very effective calorimeter design.

FIG. 5H shows the real time response of the calorimeter to the exothermic reaction between 1% HCl to varying concentration of NH$_4$OH. For small concentrations, the reaction can be written as

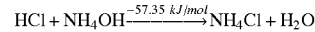

$$HCl + NH_4OH \xrightarrow{-57.35\ kJ/mol} NH_4Cl + H_2O$$

Since the concentration of HCl is fixed, increasing the concentration of NH$_4$OH initially increases the amount of heat generated. However, after a certain concentration corresponding to higher than 1:1 molar ratio, the amount of heat evolved begins to saturate. In these experiments, 200 μL of each of the reactants were added to the reaction chamber. The temperature in the reaction chamber follows an exponential rise with a time constant of ~2.4 s, eventually reaching a peak and thereafter decaying to room temperature with a longer time constant. The decay time constant is long since the chamber was designed to be thermally insulated from all directions except where it faces the quartz temperature sensor. A similar experiment with urease (enzyme) to catalyze the hydrolysis of urea was performed and the heat of reaction could be monitored in real time. The enthalpy change of the reaction is −61 kJ/mol. In the experiments it was found the frequency increase for 0.4 M urea is about 2.3 kHz. Taking into account of the sensor sensitivity, the calculated temperature change in quartz resonator sensor is 1.2° C. This implies that with the current design only 23% of the generated heat from biochemical reaction is transferred to the sensor from the top reaction chamber.

VI. Conclusions

This paper reports the first experimental results on the design, fabrication, and characterization of temperature sensitive quartz resonators fabricated using heterogeneous integration methods able to fabricate high-density, thermal conductance fluctuation-limited thermal sensors. Two different applications were described in detail: infrared sensing and calorimetric biochemical sensing.

REFERENCES FOR EXEMPLARY EMBODIMENT 5

[1] A. van der Ziel, Noise in measurements. New York: John Wiley & Sons, 1976
[2] E. P. Eernisse, R. W. Ward, and R. B. Wiggins, "Survey of quartz bulk resonator sensor technologies," *IEEE Transactions on Ultrasonics Ferroelectrics and Frequency Control*, vol. 35, pp. 323-330, 1988.

[3] J. R. Vig, R. L. Filler, and Y. Kim, "Uncooled IR imaging array based on quartz microresonators," *Journal of Microelectromechanical Systems*, vol. 5, pp. 131-137, 1996

[4] R. A. Wood, "Uncooled thermal imaging with monolithic silicon focal planes," in *Infrared Technology XIX*, 1 ed. vol. 2020 San Diego, Calif., USA: SPIE, 1993, p. 322.

[5] A. Rogalski, "Infrared detectors: status and trends," *Progress in Quantum Electronics*, vol. 27, p. 59, 2003.

[6] M. B. Pisani, K. Ren, P. Kao, and S. Tadigadapa, "Application of micromachined Y-cut quartz bulk acoustic wave resonator for infrared sensing," *Journal of Microelectromechanical Systems*, J. of Microelectromechanical Systems, Vol. 20, No. 1, February 2011.

F. Exemplary Embodiment 6 (Monitoring Biochemical Reactions Using Y-Cut Quartz Thermal Sensors)

Abstract—In this paper, we present a micromachined Y-cut quartz resonator based thermal sensor array which is configured with a reaction chamber that is physically separated but located in close proximity to the resonator for sensitive calorimetric biosensing applications. The coupling of heat from the reaction chamber to the quartz resonator is achieved via radiation and conduction through ambient gas. The sensor was packaged onto a 300 mm thick stainless plate with an opening in the middle. The sensor array was aligned to the opening and mounted from the underside of the plate. A reaction chamber designed for performing (bio)chemical reactions was used in the measurements. This configuration of the sensor allows for a very robust sensing platform with no fouling of the sensor surface or degradation in its performance metrics. Impedance-based tracking of resonance frequency was used for chemical, enzymatic, and cellular activity measurements. The sensor described has impedance sensitivity of 852 W/° C. or a frequency sensitivity of 7.32 kHz/° C. for the 91 MHz resonator used in this work. Results on exothermic reaction between hydrochloric acid and ammonium hydroxide, the hydrolysis reaction of urea by urease and the catalytic reaction of glucose with glucose dehydrogenase are reported. From the signal to noise ratio analysis of the glucose sensor, <10 uM glucose sensitivity could be obtained improving the detection limit by a factor of 250 in comparison to our previous work using thermopile sensors. Finally, calcium ionophore induced cellular activity was measured in pancreatic cancer cells using the sensor.

Index Terms—Calorimetric Biosensors, Y-cut Quartz, Thermal Sensors, Enzymatic Sensing, Glucose Sensor, Calcium Ionophore I. Introduction Historically, gravimetric (mass) measurement mode has been the primary focus of quartz resonator research for (bio)chemical sensing but as it turns out quartz resonators can be used as sensitive temperature sensors as well. A major impediment in the use of temperature sensitive cut of quartz resonators for thermal biosensing applications is the concomitant mass loading effects that confound the results and therefore make calorimetric analysis of the results difficult. In this paper we present a novel configuration of a quartz resonator-based thermal sensor in which the reaction chamber is physically separated and located in close proximity to a micromachined quartz resonator [1]. The coupling of heat from the reaction chamber to the quartz resonator is achieved via radiation and conduction through ambient gas. The close proximity of a reaction chamber of a few tens-hundreds of microns and the high absorption coefficient of quartz in the 8-12 μm wavelength range render this system into a very sensitive calorimeter design. The non-contact measurement results in no mass loading effects on the quartz resonator and therefore provides clear calorimetric data.

Biological reactions are more or less always exothermic in nature and therefore lend themselves to calorimetric analysis [2, 3]. When an exothermic biological reaction is performed on a freestanding, thermally isolated, micromachined structure, the small thermal mass and the good thermal isolation of the structure causes the temperature of the freestanding membrane to rise. This principle has been used to demonstrate calorimetric biosensors using thermopiles, thermistors, and other temperature sensors [4-8]. J. Weaver et al. designed one of the first thermal enzyme probe used to detect the reaction of glucose and urea [9]. In the 1980s, B. Danielson conducted a comprehensive research on reaction enthalpy and developed thin film calorimetric biosensors to detect glucose oxidase/catalase catalyzed reactions [5, 10]. They used differential measurements with one of the sensors coated with enzyme to measure the temperature change during biochemical reactions. Following the development of advanced microfabrication technology, Seebeck effect based thermopile thermal sensors were extensively investigated. G. R. Lahiji et al. demonstrated one of the first thermopile based infrared detector with a responsivity of 6 V/W and a time constant of 15 ms. [11]. Thermopile based thermal biosensors have been since demonstrated several research groups [8, 1215].

More recently, calorimetric detection for use in gaseous and liquid ambient for (bio)chemical sensing based upon the out-of-plane bending of micromachined bimetallic cantilevers was proposed and demonstrated by Gimzewski et al. at IBM, Zurich [16-20]. By using a simple model, the ultimate sensitivity of the system was estimated to be of the order of 10 pW with a minimum detectable energy of ~20 femtojoules [17]. Nakagawa et al., used this technique to observe rotator phase change in n-alkanes with a heat sensitivity of 500 pJ for a sample mass of 7 pg and a time resolution of 0.5 ms [21]. However, these cantilever based systems are difficult to functionalize as arrays and operation in liquid environment dramatically degrades their overall performance [22]. Although several groups have demonstrated excellent performance in laboratory conditions, these devices are still beset with challenges relating to robustness, ease of use, repeatability, and reliability for practical (bio) chemical and clinical diagnostic applications.

II. Ideal Thermal Sensor

An ideal thermal sensor is schematically illustrated in FIG. 6A. The detector element of thermal mass H (J/K) is coupled to the heat sink at a constant temperature $T_0$ (K) via a thermal conductance G (W/K). Upon absorption of a power Q' (W) by the detector element, its temperature T is found by solving the equation:

$$Q' = H\left(\frac{d(T-T_0)}{dt}\right) + G(T-T_0) \qquad (31)$$

where t(s) is the time. For a sinusoidal power input, $Q'=\dot{Q}_0\exp(i\omega t)$, eq. (31) can be solved to yield $$\Delta T = T - T_0 = \frac{Q'_0\exp(i\omega t)}{\sqrt{G^2 + \omega^2 H^2}} \qquad (32)$$

For a thermal detector to exhibit high sensitivity, ΔT must be as large as possible which, according to eq. (32), can be achieved by making G as small as possible and ω sufficiently low so that ωH<<G. In other words both the thermal heat capacity of the detector element and its thermal coupling to the surroundings should be as small as possible. The implication of making H as small as possible results in a sensing element of as small and as light a construction as practicable. A characteristic thermal time constant $\tau_T$ for the detector can be defined as $$\tau_T = H/G \tag{33}$$

In most thermal detectors the noise limit of a detector is set by the spontaneous temperature fluctuations of the detector element due to the heat conductance G to the surroundings.

For the ideal thermal detector shown in FIG. 6A, the mean squared temperature fluctuations are given by [23]

$$\Delta T_n^2 = \frac{4k_B T^2 G}{G^2 + \omega^2 H^2} \tag{34}$$

where $k_B$ is the Boltzmann constant and the noise is measured at a frequency ω in a 1 Hz bandwidth. The minimum detectable power $P_{min}$ per unit bandwidth due to temperature fluctuations is determined from the condition when the temperature change due to signal input is equal to the root mean squared noise fluctuations. Using eq. (32) and eq. (34), $P_{min}$ can be written as $$P_{min} = 2T\sqrt{K_B G} \tag{35}$$

III. Quartz Resonator Based Calorimetric Biosensor

In this paper we measure the rise in temperature in real-time using the quartz crystal resonator (QCR) located right under the freestanding reactor membrane. FIG. 6B shows the schematic illustration of the device. Freestanding micromachined membranes of small thermal mass are very sensitive to small changes in heat and are thus capable of analyzing very small quantities of reactants and products [24, 25]. They also have fast response times required for real-time study of reaction kinetics. Specificity to identify our perform a selective assay is achieved by coating the reactor with specific catalysts such as enzymes, antibodies or even single stranded oligonucleotides for DNA sequence analysis [2]. When the analyte is exposed to such immobilized enzymes or probe DNA strands on the freestanding reaction chamber, the biochemical reaction begins and its evolution in terms of total amount of heat generated and kinetics is proportional to the concentration of the reactants as well as the rate constants of the reaction [26]. The applications of the presented sensor [27] can be broadly categorized under (i) health care, (ii) monitoring and control of industrial processes, and (iii) environmental monitoring.

Quartz resonators fabricated from certain crystal cuts can be used as sensitive temperature sensors with unprecedented resolutions of up to $10^{-6\circ}$ C. [28]. This phenomenological sensitivity of quartz crystals makes them highly competitive technology alternative to the currently used uncooled thermal detectors such as vanadium oxide-based bolometers [29], thermopiles, and pyroelectric detectors [30]. Thus quartz crystal resonators can be configured as high performance thermal sensors and can achieve temperature resolutions as low as few mK. The possibility of using quartz bulk acoustic wave resonators for thermal infrared sensing was first presented in 1985 by Ralph and co-workers, followed by a detailed evaluation the same for infrared (IR) imaging applications by Vig et al. in 1996 [31, 32]. However over the intervening years, the experimental realization of these sensors has not been fully demonstrated. Recently we have published papers on the application of micromachined Y-cut quartz bulk acoustic resonators for IR sensing applications [33, 34].

The resonance frequency of bulk acoustic wave quartz resonators is determined by the thickness of the resonator t as:

$$f_0 = \frac{1}{2t}\sqrt{\frac{\mu}{\rho}} \tag{36}$$

where μ is the elastic modulus and ρ is the density of quartz. For quartz, $\mu = 2.95 \times 10^{10}$ Pa and $\rho = 2.65 \times 10^3$ kg/m³. Typical commercially available resonator crystals consist of 100 to 300 μm thick quartz with resonance frequencies in the 5 to 20 MHz range. Using bulk micromachining techniques, we have fabricated resonators from 18 μm thick Y-cut quartz. These resonators have fundamental resonance frequencies of ~90 MHz. Y-cut quartz has a temperature sensitivity of +90 ppm/K yielding a temperature sensitivity of ~8 kHz/K.

FIG. 6C shows an optical picture of the quartz resonator-based temperature sensor array consisting of eight 1-mm diameter and 18 μm thick micromachined Y-cut quartz resonator pixels with a resonance frequency of ~90 MHz and quality factor >10,000. Thee fabricated sensor array is packaged onto a 300 μm thick stainless steel plate with an open window facing the sensors. A 6×6 mm² biochemical reaction chamber is made by attaching PDMS mold onto a 160 μm thick glass cover slip and placed atop the sensor array. The thick PDMS walls provide good thermal isolation while the bottom glass plate couples the heat from the reaction chamber efficiently to the sensor array. The fabrication process of the quartz sensor array is described in detail elsewhere [35]. With the sensor array mounted under the steel plate and the reaction chamber placed atop the steel plate, the gap is determined by the thickness of the plate.

IV. Results & Discussion

A. Y-Cut Quartz Resonator Sensor Calibration

FIG. 6D shows the real and imaginary part of the impedance of the fabricated quartz resonator sensor measured using an Agilent 42994A impedance analyzer. The resonance frequency of the measured sensor is about 90.96 MHz and calculated quality factor is ~27700. Using eq. (31), the calculated effective thickness of quartz sensor after the fabrication process is ~18.3 μm, is in accordance with our designed process parameters. The temperature sensitivity of the resonators was measured around room temperature by placing the packaged resonator in an oven and allowing for the temperature to stabilize for 30 minutes before taking the resonance frequency measurement. Inset in FIG. 6D shows the measured temperature sensitivity which gave a value of 7.32 kHz/° C. for the 90.94 MHz resonator and is consistent with the expected temperature sensitivity of ~90 ppm for Y-cut quartz.

The analyzer used in this work is capable of acquiring up to 801 impedance measurements over the experimentally set frequency span. Even using extremely fast scan rates, each impedance scan takes around 3 s. Since the expected biochemical reaction times are expected to be much faster, this method of tracking the resonance frequency is unsuitable for the current application. To overcome this limitation a new strategy as described in detail in our recent work has been used [34]. Briefly, the impedance analyzer is set to a fixed frequency at the mid-point between the two inflexion points in the imaginary component of the impedance curve shown in FIG. 6D and the change in imaginary part of impedance is monitored in real-time. For small temperature changes, an increase and/or decrease in the frequency, about the set quiescent frequency, translates into an increase or decrease in the value of Im(Z). This method offers an additional gain to the measurement of temperature (T) sensitivity of resonance frequency ($f_0$) since $$\frac{d(\text{Im}Z)}{dT} = \frac{d(\text{Im}Z)}{df_0}\bigg|_{f_0} \cdot \frac{df_0}{dT} = -\text{Slope} \cdot \frac{df_0}{dT} \quad (37)$$

For the case shown, Y-cut quartz has a temperature coefficient of frequency 7320 Hz/° C. The gain factor from the slope of the graph shown is $-0.12\ \Omega/\text{Hz}$ which results in an impedance sensitivity of $-852\ \Omega/°$ C. Furthermore, using this method, continuous tracking of the resonance frequency reduces to real-time monitoring of the imaginary component of impedance at a fixed frequency. So long as the quiescent point of the circuit is set to be at the mid-point between the inflection points in the impedance curve, and the temperature changes are small, this method offers a very simple electronic measurement method which can be readily scaled to large arrays. For the 91 MHz resonator shown here, the linear range of frequency excursion is limited to ~5.6 kHz corresponding to a pixel temperature change of ~0.75° C. Since the temperature change induced in the sensor pixel in the described biosensors is expected to small, this method is reasonably well suited for this application. Labview® based program was developed to find the maximum slope factor in the linear region of impedance vs. frequency curve and to set-up the measurement frequency for real time measurement of admittance change during the biochemical reaction at the set maximum slope point. With this new test method, the scanning time for every data point is only ~0.15 second, which resulted in 20 times more data points being recorded during experiments.

Using the method described above, the temperature sensitivity of the quartz resonator sensor was measured using hot water, from 24° C. to 31° C. in the reaction chamber. ~100 µl of water heated on a hot plate with the temperature set to the desired value and measured using a thermometer was instantly placed in the reaction chamber using a plastic syringe. The experimental data is shown in FIG. 6E. From the data, it is found that temperature sensitivity of quartz temperature sensor is 1.942 kHz/° C., which is ~3.5 times lower than the temperature sensitivity measured by placing the device in an oven and shown in the inset in FIG. 6D. The discrepancy in the temperature measured using this and the oven technique shown in FIG. 6D can be attributed to heat loss during the transfer of hot water to the reaction chamber and the heat losses within the reaction chamber and between the reaction chamber and the quartz resonator sensor.

B. Liquid Batch Testing

Systematic experimental studies have been performed to test the fabricated quartz resonator sensor for enthalpic measurements using liquid batch testing. The studied experiments include the neutralization reaction between hydrochloric acid (from J. T. Baker) and ammonium hydroxide (from J. T. Baker), the hydrolysis of urea (from J. T. Baker) with urease (5 U/mg, EM Science Inc), and the catalytic reaction of D-(+)-glucose (99.5%, from Sigma Aldrich) by glucose dehydrogenase (279 U/mg, Sigma Aldrich). For ease of operation, all the experiments are performed in open chamber condition. A reaction chamber made using PDMS mold is attached to a 160 µm thick glass cover slip to form a 6×6 mm² area reaction chamber was used and placed atop the hole in 300 µm thick steel plate under which the quartz sensor was mounted.

As an initial demonstration, the exothermic reaction of hydrochloric acid and ammonium hydroxide was chosen to test the quartz resonator sensor. The neutralization reaction can be expressed as following:

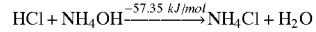

$$\text{HCl} + \text{NH}_4\text{OH} \xrightarrow{-57.35\ kJ/mol} \text{NH}_4\text{Cl} + \text{H}_2\text{O}$$

The enthalpy of the reaction $\Delta H = -57.35$ kJ/mol. In this measurement, the HCl and NH$_4$OH solutions were made by diluting the original stock solutions from the manufacturer with DI water to 0.5% to 4% (wt %), respectively. Prior to the test, the sensor was connected to Agilent impedance analyzer to stabilize for 30 minutes. The reaction chamber (opening in the PDMS walls) was aligned on top of the sensor array and 100 µl of 1% HCl solution was placed in the reaction chamber. The chamber with HCl solution was allowed to equilibrate in the ambient for ~5 minutes to eliminate any temperature difference between the reaction chamber and the sensor. 100 µl of 0.5% ammonium hydroxide solution was thereafter added to the reaction chamber using a pipette and the impedance change in real-time was measured using the Labview® program as described earlier. Identical procedure was repeated for 1%, 2% 3%, and 4% NH$_4$OH solution reaction with 1% HCl solution. FIG. 6F shows the time dependence of the output of quartz resonator sensor from the reaction of 1% HCl with various concentrations of NH$_4$OH. Since the chemical reaction requires 1:1 molar concentration for the maximum evolution of heat, the amount of heat evolved beyond 2% weight concentration of NH$_4$OH for fixed 1% HCl solution saturates. As a confirmation, a linear response is observed if 1:1 wt. % concentrations of HCl and NH$_4$OH are reacted. An exponential rise in the temperature with an average time-constant of 0.5 s is observed.

C. Urea Sensing

The hydrolysis of urea in the presence of the catalyst urease can be written as follows:

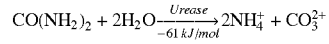

$$\text{CO(NH}_2)_2 + 2\text{H}_2\text{O} \xrightarrow[-61\ kJ/mol]{Urease} 2\text{NH}_4^+ + \text{CO}_3^{2+}$$

The enthalpy change of the reaction is $-61$ kJ/mol. 0.05 M, 0.1, 0.2, 0.3 and 0.4 M solutions of urea were prepared in phosphate buffer saline (PBS, pH 7.0) solution. Since 1 unit of urease can hydrolyze 0.5 µmol of urea, urease solution 250 U/ml in PBS was prepared which has sufficient enzymes to react with urea for all the concentration in the experiment. Initially, 200 µl of 0.05 M urea solution was placed into reaction chamber. Then similar to the experimental procedure described earlier, the reaction chamber was stabilized in air for ~5 minutes following which 30 µl of urease solution was added into the urea solution in the reaction chamber. The data was acquired by the Labview® program, for 0.05M, 0.1M, 0.2M, 0.3M and 0.4M urea solutions, respectively. The experiment data for hydrolysis of urea is shown in FIG. 6G. The data exhibits a linear dependence of the peak sensor output as a function of the concentration of the urea.

To better understand the observed output of the sensor, the device was modeled using finite element analysis using Comsol® software. A 20 μm thick, 1 mm diameter circular Comsol quartz resonator sensor in 100 μm-thick quartz substrate and the reaction chamber modeled as a 160 μm thick glass plate spaced 300 μm apart from the quartz with air as the medium in between was drawn to scale and meshed using tetrahedral elements. The boundary conditions were chosen to closely approximate the experimental conditions used in the experiment. Since the reactant used in any given test was fixed, the evolution of heat (Q') in the reaction chamber was modeled as an exponentially decaying function of time given by the expression

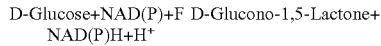

$$Q'=12\exp(-0.5t) \qquad (38)$$

The time-constant was chosen based upon the typical reported rates of enzymatic reactions for the quantity of enzymes and reactants used. FIG. 6H, part (a) shows the measured temporal evolution of temperature for 0.3 M urea-urease solution with the experimental and simulated temperature outputs overlaid. The graph shows a remarkable agreement between the simulated and measured evolution off temperature evolution for the urea-urease reaction. The spatial distribution of temperature profile across the resonator pixel at two different times t=1 s and t=100 s is shown in FIG. 6H part (b).

D. Glucose Sensor

As a further demonstration of the sensor for enzymatic reaction monitoring, 1 mM, 5 mM, 10 mM and 50 mM D-glucose solutions in PBS were catalyzed using the enzyme glucose dehydrogenase. Glucose dehydrogenase catalysis glucose according to the chemical reaction:

D-Glucose+NAD(P)+F D-Glucono-1,5-Lactone+ NAD(P)H+H$^+$

This oxido-reductase enzyme acts on the CH—OH group of glucose with NAD+ or NADP+ as acceptors with an enthalpy of reaction of ~–80 kJ/mol. Identical experimental procedure as described for the urea reaction was used for testing of glucose oxidase and with 100 μl of glucose solutions. As it is known that 1 unit of glucose dehydrogenase enzyme can catalyze 1 μmol of D-glucose, appropriate amounts of the enzyme were diluted in phosphate buffer solution prior to the experiment. FIG. 6I shows the results of enzymatic catalysis of D-glucose using glucose dehydrogenase. For the concentrations tested, a linear dependence of the sensor output to the concentration of the glucose solution is observed. Based on the stability of the sensor output and the impedance noise, a signal to noise ratio of ~130 was obtained for 1 mM glucose solution allowing for a glucose detection resolution of less than 10 μM of D-glucose using this technique. This resolution represents ~250 times improvement in the measurement of glucose over thermopile base sensing reported earlier [6].

E. Measurement of Cellular Activity

As a further demonstration of the efficacy of the current sensor for the measurement of cellular activity, pancreatic cancer cells were plated and grown in several reaction chambers prepared with PDMS walls. Upon successfully obtaining confluent cells in the reaction chamber, the sensor set-up was prepared for measurement. The cells immersed in growth medium in the reaction chamber were taken out of the incubator and allowed to equilibrate to room temperature for ~30 minutes. 10 μl of 0.25 and 0.5 mM A23187 calcium ionophore solution premixed in cell growth media was added to the cells while the heat evolved from the reaction was measured in real-time.

A23187 acts as a divalent cation ionophore, i.e. lipid soluble molecule capable of transporting $Ca^{2+}$ ions across the lipid cell membrane allowing these ions to cross cell membranes, which are usually impermeable to them. The ionophore is typically used in laboratories to increase intracellular $Ca^{2-}$ levels in intact cells. Furthermore, the disruption of the transmembrane ion concentration gradients, required for the proper functioning and survival of microorganisms induces apoptosis in cells. After an initial enhancement in the reaction, inferred as a result of the opening of the ion channels in the cells mediated by the A23187 solution, the reaction was observed to decay exponentially. Observation under microscope of the cells after the experiment clearly showed the cells having shrunk from their original appearance and delamination from the reaction chamber surface. FIG. 6J shows the results of the reaction—furthermore it can be seen that the exponential decay due to the addition 0.25 mM $Ca^{2+}$ ionophore solution is ~1.15 times slower than that of 0.5 mM. While intuitively we should be expecting a ratio of ~2, the resulting discrepancy can be due to differences in the actual number of cells in the two experiments as well as due to other experimental variables. Most importantly, this experiment shows the effectiveness of the sensor in tracking energetics of reactions in real-time in cell populations.

V. Conclusions

This paper describes the design and implementation of a calorimetric biosensor based on micromachined Y-cut quartz resonator. The sensor was packaged onto a 300 μm thick stainless plate with an opening in the middle. The sensor array was aligned to the opening and mounted from the underside of the plate. A reaction chamber designed for performing (bio)chemical reactions made from a glass coverslip with thick PDMS walls was specifically designed and used in the measurements. Since the reaction chamber was simply placed atop the sensor array, upon completion of the reaction they could be readily taken off and replaced with a new one for the next sensor test. This configuration of the sensor allows for a very robust sensing platform with no fouling of the sensor surface or degradation in the performance metrics. Using the recently described method for tracking resonance measurement in real-time, impedance based chemical, enzymatic, and cellular activity measurements were made. The sensor described has an ideal impedance sensitivity of 852 W/° C. or a frequency sensitivity of 7.32 kHz/° C. for the 91 MHz resonator used in this work.

Several experiments were conducted to test the quartz resonator sensor, such as the exothermal reaction between hydrogen chloride acid and ammonium hydroxide, the hydrolysis reaction of urea with urease and the catalytic reaction of glucose with glucose dehydrogenase. From the signal to noise ratio analysis of the glucose sensor, <10 μM glucose sensitivity could be obtained improving the detection limit by a factor of 250 in comparison to our previous work using thermopile sensors. Using an exponentially decaying heat input function, a remarkable agreement between the experimentally measured and finite element simulation of the evolution of the sensor signal was obtained and showed that the overall sensor operation is in accordance to the original design. Finally, calcium ionophore induced cellular activity was measured in pancreatic cancer cells using the sensor. In summary, the sensor shows good repeatability, high sensitivity and robust performance especially in comparison with previous reported devices using thermopile and thermistor based devices. And although single sensor measurements are reported in this work, the sensor configuration can be readily extended for array level measurements.

REFERENCES FOR EXEMPLARY EMBODIMENT 6

[1] K. Ren, M. B. Pisani, P. Kao, and S. Tadigadapa, "Micromachined quartz resonator-based high performance thermal sensors," in *Sensors, 2010 IEEE*, pp. 2197-2201.

[2] B. Eggins, Biosensors: *An Introduction*. Chichester: Wiley Teubner, 1996.

[3] J. T. Edsall, *Biothermodynamics: The study of Biochemical Processes at Equilibrium*. Chichester: John Wiley, 1983.

[4] K. Ramanathan and B. Danielsson, "Principles and applications of thermal biosensors," *Biosensors and Bioelectronics*, vol. 16, pp. 417-423, 2001.

[5] B. Danielsson, "Calorimetric Biosensors," *J. Biotechnology*, vol. 15, pp. 187-200, 1990.

[6] Y. Zhang and S. Tadigadapa, "Calorimetric biosensors with integrated microfluidic channels," *Biosensors & Bioelectronics*, vol. 19, p. 1733, 2004.

[7] M. Zanini, J. H. Visser, L. Rimai, R. E. Soltis, A. Kovalchuk, D. W. Hoffman, E. M. Logothetis, L. Brewer, O. W. Bynum, U. Bonne, and M. A. Richard, "Fabrication and properties of a Si-based high-sensitivity microcalorimetric gas sensor," *Sensors and Actuators A: Physical*, vol. 48, pp. 187-192, 1995/5/30 1995.

[8] A. W. van Herwaarden, P. M. Sum, J. W. Gardner, and P. Bataillard, "Liquid and gas micro-calorimeters for (bio) chemical measurements," *Sensors and Actuators A: Physical*, vol. 43, pp. 24-30, 1994/5 1994.

[9] J. C. Weaver, C. L. Cooney, S. P. Fulton, P. Schuler, and S. R. Tannenbaum, "Experiments and calculations concerning a thermal enzyme probe," *Biochimicaet Biophysica Acta (BBA)—Enzymology*, vol. 452, pp. 285-291, 1976.

[10] B. Xie, K. Ramanathan, and B. Danielsson, *Principles of Enzyme Thermistor Systems: Applications to Biomedical and Other Measurements*, 1999.

[11] G. R. Lahiji and K. D. Wise, "A Batch Fabricated Silicon Thermopile Infrared Detector," *IEEE Transactions on Electron Devices*, vol. ED29, 1982.

[12] A. A. Minakov, A. W. van Herwaarden, W. Wien, A. Wurm, and C. Schick, "Advanced nonadiabatic ultrafast nanocalorimetry and superheating phenomenon in linear polymers," *Thermochimica acta*, vol. 461, pp. 96-106, 2007.

[13] J. Lerchner, D. Caspary, and G. Wolf, "Calorimetric detection of volatile organic compounds," *Sensors and Actuators B (Chemical)*, vol. B70, p. 57, 2000.

[14] T. Maskow, J. Lerchner, M. Peitzsch, H. Harms, and G. Wolf, "Chip calorimetry for the monitoring of whole cell biotransformation," *Journal of Biotechnology*, vol. 122, pp. 431-442, 2006.

[15] M. Zieren and J. M. Kohler, "A micro-fluid channel calorimeter using BiSb/Sb thin film thermopiles," in *Solid State Sensors and Actuators, 1997. TRANSDUCERS '97 Chicago., 1997 International Conference on*. vol. 1, 1997, pp. 539-542 vol. 1.

[16] J. K. Gimzewski, C. Gerber, E. Meyer, and R. R. Schlittler, "Observation of a chemical reaction using a micromechanical sensor," *Chemical Physics Letters*, vol. 217, p. 589, 1994.

[17] J. R. Barnes, R. J. Stephenson, C. N. Woodburn, S. J. O'Shea, M. E. Welland, T. Rayment, J. K. Gimzewski, and C. Gerber, "A femtojoule calorimeter using micromechanical sensors," *Review of Scientific Instruments*, vol. 65, p. 3793, 1994.

[18] R. Berger, C. Gerber, J. K. Gimzewski, E. Meyer, and H. J. Guntherodt, "Thermal analysis using a micromechanical calorimeter," *Applied Physics Letters*, vol. 69, p. 40, 1996.

[19] R. Berger, C. Gerber, H. P. Lang, and J. K. Gimzewski, "Micromechanics: A toolbox for femtoscale science: "Towards a laboratory on a tip"," *Microelectronic Engineering*, vol. 35, p. 373, 1997.

[20] R. Berger, H. P. Lang, C. Gerber, J. K. Gimzewski, J. H. Fabian, L. Scandella, E. Meyer, and H. J. Guntherodt, "Micromechanical thermogravimetry," *Chemical Physics Letters*, vol. 294, p. 363, 1998.

[21] Y. Nakagawa, R. Schafer, and H. J. Guntherodt, "Picojoule and submillisecond calorimetry with micromechanical probes," *Applied Physics Letters*, vol. 73, p. 2296, 1998.

[22] S. Cherian and T. Thundat, "Determination of adsorption-induced variation in the spring constant of a microcantilever," *Applied Physics Letters*, vol. 80, pp. 2219-2221, 2002/Mar. 25, 2002.

[23] A. van der Ziel, *Noise in measurements*. New York: John Wiley & Sons, 1976.

[24] I. Jelesarov, L. Leder, and H. R. Bosshard, "Probing the Energetics of Antigen-Antibody Recognition by Titration Microcalorimetry," *Methods*, vol. 9, pp. 533-541, 1996.

[25] J. Lerchner, A. Wolf, and G. Wolf, "Recent developments in integrated circuit calorimeter," *J. Therm. Anal. & calorimerty*, vol. 57, pp. 241251, 1999.

[26] A. L. Smith, S. Rose Mulligan, J. Tian, H. M. Shirazi, and J. Riggs, "A Mass/Heat Flow Sensor Combining Shear Mode Resonators with Thermoelectrics: Principles and Applications," 2003, pp. 1062-1065.

[27] E. Kress-Rogers, *Handbook of Biosensors and Electronic Noses: Medicine, Food, and Environment*. Boca Raton, Fla.: CRC Press, 1997.

[28] E. P. Eernisse, R. W. Ward, and R. B. Wiggins, "Survey of quartz bulk resonator sensor technologies," *IEEE Transactions on Ultrasonics Ferroelectrics and Frequency Control*, vol. 35, pp. 323-330, 1988.

[29] R. A. Wood, "Uncooled thermal imaging with monolithic silicon focal planes," in *Infrared Technology XIX*, 1 ed. vol. 2020 San Diego, Calif., USA: SPIE, 1993, p. 322.

[30] A. Rogalski, "Infrared detectors: status and trends," *Progress in Quantum Electronics*, vol. 27, p. 59, 2003.

[31] J. E. Ralph, King, R. C., Curran, J. E., and Page, J. C., "Miniature quartz resonator thermal detector," in *IEEE Ultrasonics Symposium*. vol. 1, 1985, pp. 362-364.

[32] J. R. Vig, R. L. Filler, and Y. Kim, "Uncooled IR imaging array based on quartz microresonators," *Journal of Microelectromechanical Systems*, vol. 5, pp. 131-137, 1996.

[33] P. Kao and S S. Tadigadapa, "Micromachined quartz resonator based infrared detector array," *Sensors and Actuators AA: Physical*, vol. 1149, pp. 189-192, 2009.

[34] M. B. Pisani, K. Ren, P. Kao, and S. Tadigadapa, "Application of Micromachined Y-Cut-Quartz Bulk Acoustic Wave Resonator for Infrared Sensing," *Journal of Microelectromechanical Systems*, vol. 20, pp. 288-296, 2011.

[35] P. Kao, Allara, D. L., and Tadigadapa, S S., "Fabrication and Performance Characteristics of High-Frequency Micromachined Bulk Acoustic Wave Quartz Resonator Arrays," *Measurement Science & Technology*, vol. 20, p. 124007, 2009.

G. Options and Alternatives

As previously stated, the Exemplary Embodiments described in the preceding sections, are but a few specific examples of forms and configurations the invention can take. It is to be understood that the invention can take many forms and embodiments, and the exemplary embodiments set forth herein do not limit the same. For example variations obvious to those skilled in the art will be included within the invention.

By further example, it is to be noted that the Exemplary Embodiments themselves point to a number of possible alternatives, variations, or options for aspects of the invention. For example, they give ranges of dimensions, alternatives for different fabrication methods, and some generalized rules regarding certain aspects of the invention or how to make and use certain aspects of the invention.

Exemplary Embodiment 2 gives several specific alternatives or options. For example, FIG. 2A and related written description defines a handheld, portable device envisioned to incorporate at least one of the exemplary embodiment concepts, and could incorporate several. FIG. 2B and related description detail another resonator array incorporated into a device for a 2 by 2 resonator array. Other embodiments are described.

Furthermore, the Exemplary Embodiments describe options. One example is a reference sensor to compensate for temperature drift effects. Another is self assembling monolayer (SAM) (well-known in the art) functionalization of reaction chambers used with the sensors. Another is use of fluorescent molecules and detectors, in combination with monitoring heat signals from reactions. Another is addition of a heater into the reaction chamber for artificially manipulating temperature. These and other alternatives and options show the versatility and potential applicability of the invention.

Examples of the measurand for the method of ultrasensitive temperature measurement includes such things as impedance, phase of impedance, admittance, phase of admittance, and the real and/or imaginary part(s) of impedance or admittance. It is to be understood it could be other parameters of network analysis.

Examples of materials for the resonator include but are not limited to lithium niobate, lithium tantalate, quartz, aluminum nitride, zinc oxide, langasite, barium titanate, lead magnesium niobate-lead titanate crystal, lead zinc niobate-lead titanate crystal, or any other single crystal piezoelectric material.

It will therefore be appreciated that the invention meets all of its stated objectives. The embodiments described herein present potential significant benefits in the utilization of crystal resonator calorimetric sensors.

What is claimed is:

1. An apparatus for temperature measurement comprising:
temperature sensitive resonator-based calorimetric sensor having a resonant frequency that varies with temperature;
a fixed reference frequency source providing a reference frequency near the resonant frequency of the sensor;
an impedance or admittance measurement circuit operatively connected to the sensor and the reference frequency source, the measurement circuit having an output related to a characteristic of impedance or admittance of the sensor at the fixed reference frequency; and
a reaction chamber having a measurement location for temperature measurement, the reaction chamber including the measurement location disposed in close proximity to and not in contact with the sensor forming a small separation between the reaction chamber and the sensor;
wherein the output is used for deriving temperature based on the characteristic.

2. The apparatus of claim 1 wherein the sensor comprises a piezoelectric crystal.

3. The apparatus of claim 2 wherein the crystal comprises Y-cut quartz and the characteristic of impedance or admittance comprises modulus or phase of impedance or modulus or phase of admittance, wherein the resonator is made from a high quality factor crystal material including lithium niobate, lithium tantalate, quartz, aluminum nitride, zinc oxide, langasite; barium titanate, lead magnesium niobate-lead titanate crystal, lead zinc niobate-lead titanate crystal, or any other single crystal piezoelectric material.

4. The apparatus of claim 1 wherein the sensor comprises a crystal resonator member.

5. The apparatus of claim 4 wherein the crystal member comprises quartz on the order of 2 to 10 μm in thickness.

6. The apparatus of claim 4 wherein the crystal member comprises quartz on the order of micro-size in length and width.

7. The apparatus of claim 1 wherein the close proximity comprises on the order of 10 nm-1 mm.

8. The apparatus of claim 1 further comprising a sensor array comprising a plurality of said sensors at spaced apart positions.

9. The apparatus of claim 8 further comprising a reaction chamber array comprising a plurality of reaction chambers at spaced apart positions corresponding to the sensors in the sensor array, the sensor array and reaction chamber array positionable near each other.

10. The apparatus of claim 1, wherein an analyte disposed in the reaction chamber is in proximity to and not in contact with the sensor.

11. The apparatus of claim 1, wherein the close proximity of the reaction chamber from the sensor allows for effective coupling of heat to sensor and the small separation of the reaction chamber from the sensor allows for decoupling of a mass loading effect on the sensor for the detection of temperature change such that a shift of the resonance frequency is only from temperature change.

12. A method of temperature measurement comprising:
placing a temperature sensitive resonator-based calorimetric sensor having a resonant frequency that varies with temperature near a measurement location of a reaction chamber;
obtaining an output from an impedance or admittance circuit operatively connected to the sensor, the output being related to a characteristic of impedance or admittance of the sensor at a fixed reference frequency near the resonant frequency of the sensor; and
converting the obtained output to a temperature value based on the characteristic,
wherein the reaction chamber including the measurement location is disposed in close proximity to and not in contact with the sensor.

13. The method of claim 12, wherein the sensor comprises a piezoelectric crystal.

14. The method of claim 13, wherein the crystal comprises a Y-cut quartz resonator having a resonant frequency, the reference frequency is offset from the sensor resonant frequency, and the measurand comprises a component of complex impedance or admittance.

15. The method of claim 12 wherein the measurand comprises one of:
   a. impedance,
   b. phase of impedance,
   c. admittance,
   d. phase of admittance,
   e. the real or imaginary part of impedance,
   f. the real or imaginary part of admittance, and
   g. network analysis.

16. The method of claim 15 further comprising setting the reference frequency by:
   a. obtaining a plot of real and imaginary components of impedance or admittance for the sensor over a range of frequencies at and near resonant frequency of the sensor, the imaginary component comprising two inflection points;
   b. selecting a frequency between the two inflection points of the imaginary component.

17. The method of claim 12 further comprising a plurality of additional said sensors and simultaneously tracking the measurand and converting the measurand to a temperature value for each of the plurality of additional sensors, wherein the sensor and the plurality of additional sensors are fabricated in a sensor array, further comprising a plurality of additional reaction chambers, wherein the reaction chamber and the plurality of additional reaction chambers forming an array of a plurality of reaction chambers, where each said reaction chamber of the reaction chamber array is placed close to at least one sensor of the sensor array, such that:
   a. heat of reaction, specific heat changes, or calorimetric measurement of an analyte in each reaction chamber of a reaction in a said reaction chamber is derived by tracking the measurand with a said sensor at said reaction chamber
      i. by coupling of heat to the sensor including radiative transfer of energy; but
      ii. with sufficient separation between said sensor and said reaction chamber to allow for decoupling of any mass loading effect on the sensor;
      iii. to promote maximum energy transfer from the analyte to the sensor, and
   b. aligning the reaction chamber and sensor arrays for temperature sensing of plural analytes.

18. The method of claim 12, wherein
a small separation is between the reaction chamber and the sensor;
wherein the output is a component of complex impedance of the sensor; and
wherein there is radiative and gas-conduction coupling of heat or reaction between an event at the measuring location and the sensor without direct conductive coupling or mass loading factor between the sensor and the event for maximum temperature sensitivity.

19. The method of claim 18 wherein in close proximity comprises on the order of 10 nm-1 mm, wherein in close proximity allows direct detection of temperature change but the small separation allows decoupling of mass loading effect.

20. The method of claim 18 further comprising fabricating an array of a plurality of sensors and multiplexing signals from each sensor for analysis, recording, or other further use wherein method comprises fabricating small thermal mass quartz wafers for use in calorimetric sensors for temperature measurement comprising:
   a. applying at least one electrode to a first side of a quartz wafer of a first thickness and area;
   b. mounting the first side with applied electrodes to posts associated with a silicon wafer;
   c. modifying the second side of the quartz wafer to produce a second thickness for the quartz wafer, thinner than the first thickness;
   d. applying at least one electrode to the second side of the thinner quartz wafer;
   e. creating thermally isolated pixels of smaller area from the thinner quartz wafer;
   f. thus producing a free-standing, thermally insulated, silicon co-integrated small form factor quartz resonator element.

21. The method of claim 18 further comprising fabricating plural sensors in a micro-scale planar array, operatively electrically connecting the electrodes of each sensor to a measurement circuit; wherein the measurement circuit is adapted to track each resonator; the measurement circuit comprises a circuit to track near-resonance complex impedance of the sensor at a fixed frequency set around the resonant frequency of the sensor; and:
   a. a reaction chamber placed in proximity to the sensor;
   b. so that there is radiative and gas-conduction coupling of heat or reaction between an event at the measuring location without direct conductive coupling or mass loading factor between the sensor and the event for maximum sensitivity.

22. The method of claim 18 further comprising fabricating temperature sensor arrays comprising:
   a. fabricating an array of the sensors into a 2D array, each resonator comprising a miniaturized quartz member;
   b. integrating the array of sensors either with an array of corresponding reaction chambers or a chamber for all sensors;
   c. aligning and controlling placement and distance between the array of sensors and the reaction chamber or chambers.

23. The method of claim 18 further comprising fabricating temperature sensors comprising:
   a. producing a quartz resonator-based calorimetric sensor with a y-cut quartz having:
      i. a thermally thin cross-section compared to conventional sensors;
      ii. a high operating frequency compared to conventional sensors;
   b. wherein:
      i. the thermally thin cross section comprises on the order of 2 to 20 μm, and
      ii. the operating frequency comprises 80-1000 MHz.

* * * * *

UNITED STATES PATENT AND TRADEMARK OFFICE
CERTIFICATE OF CORRECTION

| | | |
|---|---|---|
| PATENT NO. | : 10,184,845 B2 | Page 1 of 1 |
| APPLICATION NO. | : 14/802127 | |
| DATED | : January 22, 2019 | |
| INVENTOR(S) | : Tadigadapa et al. | |

It is certified that error appears in the above-identified patent and that said Letters Patent is hereby corrected as shown below:

In the Specification

Column 1, at Approximately Lines 17-21:
DELETE: "This invention was made with government support under Grant No. ECCS0925438 awarded by the National Institutes of Health and under Contract No. W911 NF-07-1-0327, awarded by the Army Research Office. The government has certain rights in the invention."
INSERT: --This invention was made with government support under Grant No. ECCS0925438 awarded by the National Science Foundation and under Grant No. W911NF-07-1-0327 awarded by the U.S. Army/ARO. The Government has certain rights in the invention.--

Signed and Sealed this
Twenty-sixth Day of July, 2022

Katherine Kelly Vidal
*Director of the United States Patent and Trademark Office*